(12) United States Patent
Takata et al.

(10) Patent No.: US 8,134,286 B2
(45) Date of Patent: Mar. 13, 2012

(54) DISCHARGE TUBE, FERRULE, LIGHTING DEVICE, DISPLAY DEVICE AND TELEVISION RECEIVER

(75) Inventors: Yoshiki Takata, Suzuka (JP); Kenichi Iwamoto, Kobe (JP); Takaaki Kudo, Shibuya-ku (JP)

(73) Assignees: Sharp Kabushiki Kaisha, Osaka (JP); Japan Aviation Electronics Industry, Limited, Tokyo (JP)

( * ) Notice: Subject to any disclaimer, the term of this patent is extended or adjusted under 35 U.S.C. 154(b) by 464 days.

(21) Appl. No.: 12/358,303

(22) Filed: Jan. 23, 2009

(65) Prior Publication Data

US 2009/0134801 A1 May 28, 2009

Related U.S. Application Data

(63) Continuation of application No. 12/305,371, filed as application No. PCT/JP2007/060626 on May 24, 2007.

(30) Foreign Application Priority Data

Jun. 30, 2006 (JP) .................................. 2006-181873
Jan. 30, 2007 (JP) .................................. 2007-019854

(51) Int. Cl.
*H01J 5/50* (2006.01)
*H01J 5/48* (2006.01)

(52) U.S. Cl. ..................... 313/331; 313/318.12; 439/612

(58) Field of Classification Search ............... 313/49–51, 313/234, 331–335, 317–318.12; 439/226–224, 439/611–619, 890; 362/97.1–97.4
See application file for complete search history.

(56) References Cited

U.S. PATENT DOCUMENTS 3,961,216 A * 6/1976 Edwards .......................... 313/51
5,236,876 A * 8/1993 Van Hal et al. .................. 501/64

FOREIGN PATENT DOCUMENTS

JP 03261030 A * 11/1991

OTHER PUBLICATIONS

Translation of JP 3-261030, Baba et al.*
Takata et al., "Discharge Tube, Ferrule, Lighting Device, Display Device and Television Receiver," U.S. Appl. No. 12/768,896, filed Apr. 28, 2010.
Takata et al., "Relay Connector, Mounting Structure of Relay Connector and Chassis, and Mounting Structure of Relay Connector and Discharge Tube," U.S. Appl. No. 12/768,932, filed Apr. 28, 2010.

(Continued)

*Primary Examiner* — Nimeshkumar Patel
*Assistant Examiner* — Steven Horikoshi
(74) *Attorney, Agent, or Firm* — Keating & Bennett, LLP

(57) ABSTRACT

In a discharge tube, a conductive ferrule is provided on an end portion of a glass tube. The ferrule includes a body that is to be mounted to the outer circumference of the glass tube and has a contact portion to be electrically conductively fixed to a relay connector (or a bearing device). Further included is a conductive portion that extends from the body so as to have elastic contact with an outer lead. The outer lead will not be under load due to the weight of the discharge tube, but the conductive portion solely has elastic contact therewith. Thus, stress concentration on the outer lead can be prevented.

8 Claims, 46 Drawing Sheets

OTHER PUBLICATIONS

Takata et al.: "Discharge Tube, Ferrule, Lighting Device, Display Device and Television Receiver" U.S. Appl. No. 12/305,371, filed Dec. 18, 2008.

Takata et al.: "Backlight Module, Backlight Module Manufacturing Method, Lighting Device, Display Device and Television Receiver" U.S. Appl. No. 12/305,372, filed Dec. 18, 2008.

Takata et al.: "Relay Connector, Mounting Structure of Relay Connector and Chassis, and Mounting Structure of Relay Connector and Discharge Tube" U.S. Appl. No. 12/305,373, filed Dec. 18, 2008.

Takata et al.: "Discharge Tube, Ferrule, Lighting Device, Display Device and Television Receiver" U.S. Appl. No. 12/305,374, filed Dec. 18, 2008.

Takata et al.: "Power Board, On-Board Connector, Lighting Device, Display Device and Television Receiver" U.S. Appl. No. 12/305,377, filed Dec. 18, 2008.

Takata et al.: "Power Board, On-Board Connector, Lighting Device, Display Device and Television Receiver" U.S. Appl. No. 12/305,378, filed Dec. 18, 2008.

Takata et al., "Discharge Tube, Ferrule, Lighting Device, Display Device and Television Receiver," U.S. Appl. No. 12/642,194, filed Dec. 18, 2009.

Takata et al., "Discharge Tube, Ferrule, Lighting Device, Display Device and Television Receiver," U.S. Appl. No. 12/642,043, filed Dec. 18, 2009.

Takata et al., "Relay Connector, Mounting Structure of Relay Connector and Chassis, and Mounting Structure of Relay Connector and Discharge Tube," U.S. Appl. No. 12/642,297, filed Dec. 18, 2009.

Takata et al., "Discharge Tube, Ferrule, Lighting Device, Display Device and Television Receiver," U.S. Appl. No. 12/645,738, filed Dec. 23, 2009.

* cited by examiner

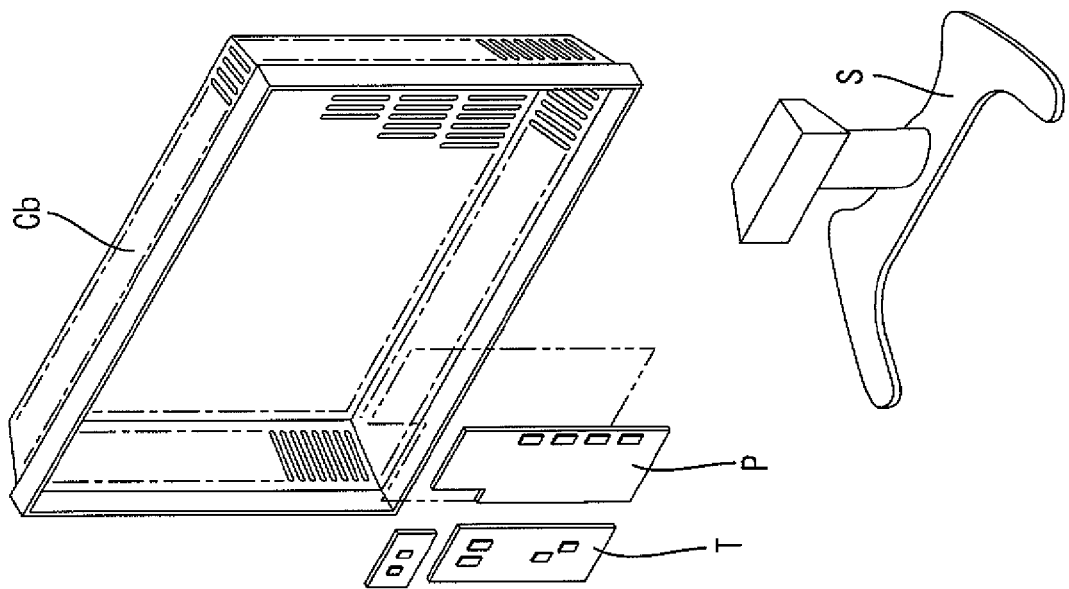
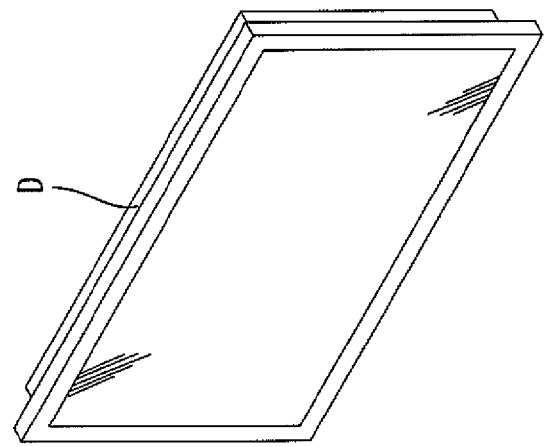
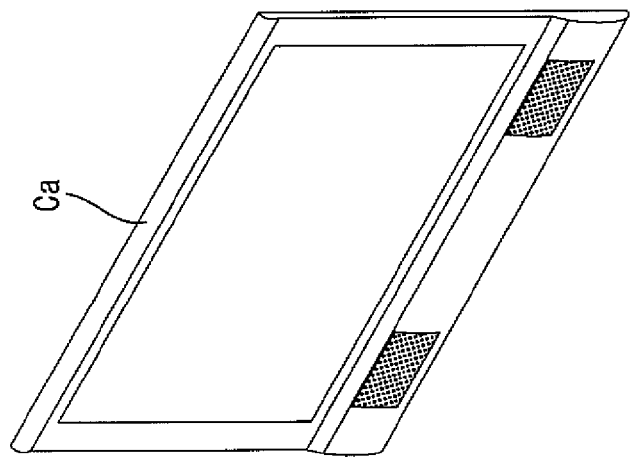
FIG.18

DISCHARGE TUBE, FERRULE, LIGHTING DEVICE, DISPLAY DEVICE AND TELEVISION RECEIVER

BACKGROUND OF THE INVENTION

1. Field of the Invention

The present invention relates to a discharge tube, a ferrule, a lighting device, a display device and a television receiver.

2. Description of the Related Art

An example of a lighting device capable of functioning as a backlight for a liquid crystal display device is disclosed in JP-A-2004-294592. The lighting device has a structure in which the end portions of a plurality of elongated discharge tubes are fixed to respective connecting members mounted to a substantially flat plate-shaped chassis, and power boards are also fixed to the respective connecting members. An outer lead projecting from the end portion of the discharge tube is connected to the power board via the connecting member.

In the discharge tube, the outer lead penetrates the end portion of the glass tube. The connecting member is fitted solely onto the outer lead, so as not to have contact with the glass tube. Therefore, stress is concentrated on the outer lead. The concentration of stress may yield a tiny gap formed between the glass tube and the penetrating outer lead. This will cause a phenomenon to slowly leak air from the glass tube, which is called a slow leak.

SUMMARY OF THE INVENTION

Preferred embodiments of the present invention were made in view of the foregoing circumstances, and prevent stress concentration on an outer lead.

A discharge tube according to a preferred embodiment of the present invention includes a glass tube, an outer lead arranged to project from an end portion of the glass tube and to be capable of receiving power supply from a power source, and a ferrule having a body and a conductive portion. The body is mounted to the outer circumference of the glass tube, and has a contact portion arranged to be electrically connected to the power source. The body is arranged to be supported by a bearing device. The conductive portion extends from the body, and is connected to the outer lead.

According to a preferred embodiment of the present invention, the body of the ferrule can be borne by the bearing device in order to support the discharge tube, and therefore the outer lead will not be under load due to the weight of the discharge tube. Thus, stress concentration on the outer lead can be prevented.

In the discharge tube according to a preferred embodiment of the present invention described above, a valley may be formed on the distal end edge of the conductive portion, so that the outer lead can be connected to the conductive portion while being fitted into the valley.

In this case, the conductive portion can be infallibly connected to the outer lead, because the outer lead is arranged to be fitted into the valley provided on the distal end of the conductive portion.

In the discharge tube according to a preferred embodiment of the present invention described above, the conductive portion can include a long portion continuous with the body, and a wide portion continuous with the distal end of the long portion, so that the wide portion has contact with the outer lead.

In this case, a large area of the wide portion along its width direction can be secured to have contact with the outer lead, resulting in infallible contact therebetween. On the other hand, the long portion that is immune to contact with the outer lead is preferably small in width and thereby is prone to elastic deflection. Consequently, contact pressure applied to the outer lead can be reduced.

In the discharge tube according to a preferred embodiment of the present invention described above, a protector portion may be provided on the body so as to be located on the sides of a proximal portion of the conductive portion.

In this case, deformation of the conductive portion caused by interference with foreign substances can be prevented due to the protector portion being provided.

In the discharge tube according to a preferred embodiment of the present invention described above, an elastic gripping portion may be provided on the body so as to have elastic contact with the outer circumference of the glass tube.

In this case, the elastic gripping portion is arranged so as to have elastic contact with the outer circumference of the glass tube, and thereby the ferrule can be prevented from rattling or radial movement relative to the glass tube, even if a large dimensional tolerance is set for the outer diameter of the glass tube.

In the discharge tube according to a preferred embodiment of the present invention described above, the glass tube can have a substantially cylindrical shape and the body can have a cylindrical shape that is substantially concentric with the glass tube, in which the contact portion may be formed along the circumferential direction of the body.

In this case, the contact portion is provided along the circumferential direction of the cylindrical body, and therefore connection to a relay connector can be achieved without considering the angle of the discharge tube about its axis.

In the discharge tube according to a preferred embodiment of the present invention described above, the glass tube can have a substantially cylindrical shape and the body can have a cylindrical shape substantially concentric with the glass tube, in which the contact portion may be formed of a rib-shaped protrusion provided continuously along the circumferential direction of the body, and a larger diameter portion having an outer diameter larger than that of the contact portion may be provided on the body.

When the discharge tube is put on a workbench or the like, the surface of the contact portion formed as a rib-shaped protrusion may get scratched due to contact with the workbench. However, according to the present construction, the large diameter portion, which is formed to have an outer diameter larger than that of the contact portion, can prevent the contact portion from being scratched.

In the discharge tube according to a preferred embodiment of the present invention described above, the glass tube can have a substantially cylindrical shape and the body can have a cylindrical shape substantially concentric with the glass tube, in which a plurality of elastic gripping portions capable of contact with the outer circumference of the glass tube may be provided on the body so as to be circumferentially spaced apart. A gap is formed between the outer circumference of the glass tube and the inner circumference of the body so as to extend over the substantially entire circumference.

In this case, the gap, i.e., airspace having a thermal conductivity lower than that of metal or synthetic resin, is provided between the outer circumference of the glass tube and the inner circumference of the body so as to extend over the substantially entire circumference. Thereby, heat transfer from the glass tube to the body side can be prevented and minimized, and consequently reduction in internal temperature of the glass tube can be prevented. The suppression of temperature reduction in the glass tube can prevent cohesion of mercury capable of being encapsulated in the glass tube. This enables retention of luminescent performance.

In the discharge tube according to a preferred embodiment of the present invention described above, the glass tube can have a substantially cylindrical shape and the body can have a cylindrical shape substantially concentric with the glass tube, in which a plurality of elastic gripping portions capable of contact with the outer circumference of the glass tube may be provided on the body so as to be circumferentially spaced apart. A gap is formed between the outer circumference of the glass tube and the inner circumference of the body so as to extend over the substantially entire circumference. The plurality of elastic gripping portions may be arranged to have contact with the outer circumference of the glass tube at a plurality of positions spaced along the axial direction of the body.

In this case, the elastic gripping portions have contact with the glass tube at the plurality of axially-spaced positions. Thereby, the body of the ferrule is secure from changing its orientation and consequently forming an angle with the axis of the glass tube.

In the discharge tube according to a preferred embodiment of the present invention described above, a cylindrical portion, which is circumferentially connected to the outer lead so as to surround it, may be provided on the conductive portion.

In this case, the conductive portion includes the cylindrical portion capable of circumferentially surrounding the outer lead, and thereby the conductive portion is prevented from disengaging from the outer lead. Consequently, the conductive portion can be infallibly connected to the outer lead.

As a means for achieving the above advantages, a ferrule according to a preferred embodiment of the present invention, which has conductivity and is to be mounted to a discharge tube that includes a glass tube having an outer lead projecting from an end portion thereof so as to be capable of receiving power supply from a power source on the outer lead, includes a body that is to be mounted to an end portion of the outer circumference of the glass tube and to be borne by a bearing device and has a contact portion to be electrically connected to the power source. Further included is a conductive portion that extends from the body and is to be connected to the outer lead.

According to a preferred embodiment of the present invention, the body of the ferrule can be borne by the bearing device in order to support the discharge tube, and therefore the outer lead will not be under load due to the weight of the discharge tube. Thus, stress concentration on the outer lead can be prevented.

In a ferrule according to a preferred embodiment of the present invention described above, a valley may be formed on the distal end edge of the conductive portion so that the valley of the conductive portion can be connected to the outer periphery of the outer lead.

In this case, the conductive portion can be infallibly connected to the outer lead, because the valley capable of being fitted onto the outer periphery of the outer lead is provided on the distal end of the conductive portion.

In a ferrule according to a preferred embodiment of the present invention described above, the conductive portion can include a long portion continuous with the body, and a wide portion continuous with the distal end of the long portion, so that the wide portion can have contact with the outer lead.

In this case, a large area of the wide portion along its width direction can be secured to have contact with the outer lead, resulting in infallible contact therebetween. On the other hand, the long portion immune to contact with the outer lead is formed so as to be small in width and thereby be prone to elastic deflection. Consequently, contact pressure to be applied to the outer lead can be reduced.

In a ferrule according to a preferred embodiment of the present invention described above, a protector portion may be formed on the body so as to be located on the sides of a proximal portion of the conductive portion.

In this case, deformation of the conductive portion caused by interference with foreign substances can be prevented due to the protector portion being formed.

In a ferrule according to a preferred embodiment of the present invention described above, an elastic gripping portion capable of elastic contact with the outer circumference of the glass tube may be located on the body.

In this case, the elastic gripping portion can have elastic contact with the outer circumference of the glass tube, and thereby the ferrule can be prevented from rattling or radial movement relative to the glass tube, even if a large dimensional tolerance is set for the outer diameter of the glass tube.

In a ferrule according to a preferred embodiment of the present invention described above, the body can have a cylindrical shape capable of being substantially concentric with the glass tube that has a substantially cylindrical shape, in which the contact portion may be formed along the circumferential direction.

In this case, the contact portion is provided along the circumferential direction of the cylindrical body, and therefore connection to a relay connector can be achieved without considering the angle of the discharge tube about its axis.

In a ferrule according to a preferred embodiment of the present invention described above, the contact portion can be formed of a rib-shaped protrusion provided continuously along the circumferential direction, and a large diameter portion having an outer diameter larger than that of the contact portion may be formed on the body.

When the discharge tube is put on a workbench or the like, the surface of the contact portion formed as a rib-shaped protrusion may get scratched due to contact with the workbench. However, according to the present construction, the large diameter portion, which is formed to have an outer diameter larger than that of the contact portion, can prevent the contact portion from being scratched.

In a ferrule according to a preferred embodiment of the present invention described above, the body can have a cylindrical shape capable of being substantially concentric with the glass tube that has a substantially cylindrical shape, in which a plurality of elastic gripping portions capable of contact with the outer circumference of the glass tube may be formed on the body so as to be circumferentially spaced apart. A gap can be formed between the outer circumference of the glass tube and the inner circumference of the body, in a state of being mounted to the glass tube, so as to extend over the substantially entire circumference.

In this case, the gap, i.e., airspace having a thermal conductivity lower than that of metal or synthetic resin, can be provided between the outer circumference of the glass tube and the inner circumference of the body so as to extend over the substantially entire circumference. Thereby, heat transfer from the glass tube to the body side can be prevented, and consequently reduction in internal temperature of the glass tube can be prevented. The suppression of temperature reduction in the glass tube can prevent cohesion of mercury capable of being encapsulated in the glass tube. This enables retention of luminescent performance.

In a ferrule according to a preferred embodiment of the present invention described above, the plurality of elastic gripping portions may be arranged to be capable of contact with the outer circumference of the glass tube at a plurality of positions spaced along the axial direction of the body.

In this case, the elastic gripping portions can have contact with the glass tube at the plurality of axially-spaced positions, and thereby the body of the ferrule is prevented from changing its orientation and consequently forming an angle with the axis of the glass tube.

In a ferrule according to a preferred embodiment of the present invention described above, a cylindrical portion, which is capable of being circumferentially connected to the outer lead so as to surround it, may be formed on the conductive portion.

In this case, the conductive portion includes the cylindrical portion capable of circumferentially surrounding the outer lead, and thereby the conductive portion can be prevented from disengaging from the outer lead. Consequently, the conductive portion can be infallibly connected to the outer lead.

A lighting device according to a preferred embodiment of the present invention includes a power source, a discharge tube according to a preferred embodiment of the present invention described above, and a chassis provided as a mounting base for the power source and the discharge tube.

A display device according to a preferred embodiment of the present invention includes the lighting device described above, and a display panel arranged on the front side of the lighting device.

A television receiver according to a preferred embodiment of the present invention includes the display device described above.

These and other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 18 is an exploded perspective view of a television receiver.

DETAILED DESCRIPTION OF THE PREFERRED EMBODIMENTS

Preferred Embodiment 1

A preferred embodiment 1 according to the present invention will be hereinafter explained with reference to FIGS. 1 to 18.

Overview of Display Device D

Figure 11:
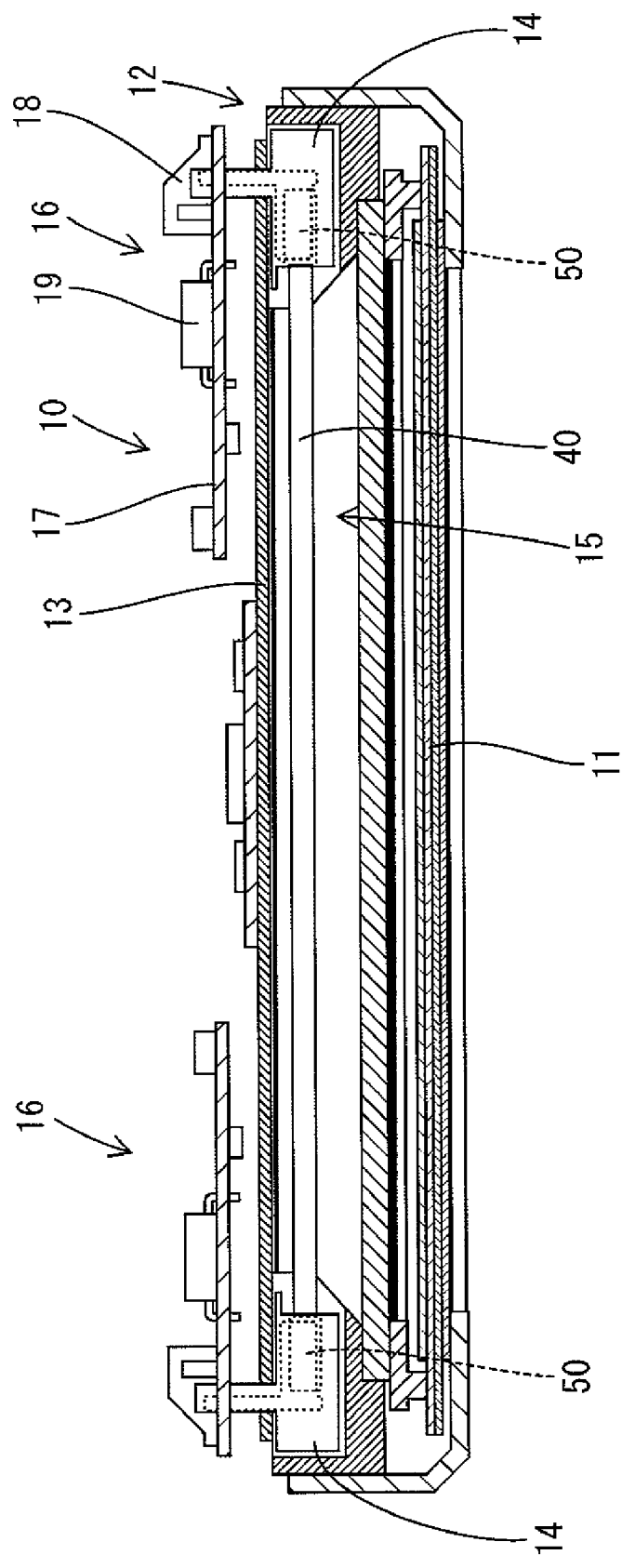
FIG. 11 is a horizontal sectional view of a display device.

FIG. 18 is an exploded perspective view of a television receiver TV. A display device D included in the television receiver TV is a so-called liquid crystal display device including a display panel 11 and a lighting device 10 as shown in FIG. 11, which preferably has a horizontally-elongated rectangular shape as a whole. The display panel 11 is disposed on the front side of the lighting device 10, so that the lighting device 10 as a backlight can illuminate the display panel 11 from the back side. As shown in FIG. 18, the television receiver TV includes the display device D, and front and back cabinets Ca and Cb capable of holding the display device D therebetween. Further included are a power source P other than a power board 16 (corresponding to a power source of the present invention) described below, a tuner T and a stand S. FIG. 11 schematically shows the display device D, and therefore the shapes of relay connectors 14, on-board connectors 18 and the like differ slightly from those in the other figures.

The display panel 11 has a well-known construction, in which liquid crystal as a material with an optical property that changes with applied voltage is disposed in the gap between a transparent TFT substrate and a transparent CF substrate. TFTs (Thin Film Transistors), as switching elements connected to a source wiring line and a gate wiring line running at right angles to each other, and pixel electrodes connected to the TFTs are provided on the TFT substrate. A color filter, on which color sections of three primary colors, i.e., Red (R), Green (G) and Blue (B), are arranged in a matrix, and a common electrode are provided on the CF substrate.

Overview of Lighting Device 10

The lighting device 10 includes a lamp unit 12 and power boards 16. The lamp unit 12 includes a metallic chassis 13, which preferably has a substantially horizontally-elongated rectangular plate shape and functions as a reflector plate. Further included are a plurality of discharge tubes 15 held in a horizontal position and vertically arranged on the front side of the chassis 13 so as to be parallel or substantially parallel to one another, and a plurality of relay connectors 14 (corresponding to a bearing device of the present invention) which are vertically arranged along the lateral edges of the chassis 13 so as to correspond to the discharge tubes 15. The power boards 16 are disposed on the back side of the chassis 13 so as to supply power to the discharge tubes 15 via the relay connectors 14.

Figure 14:
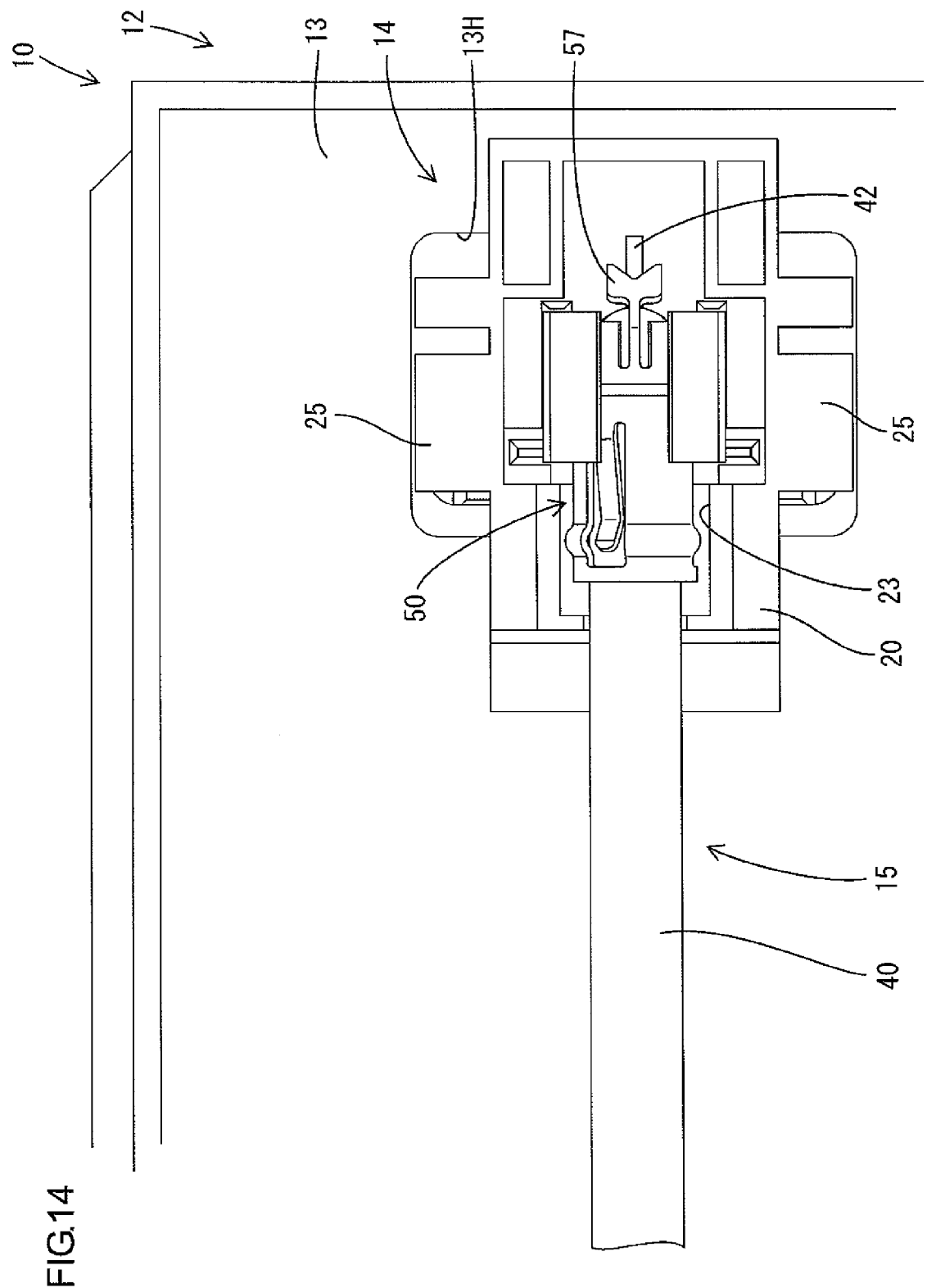
FIG. 14 is a partially-enlarged front view of the lighting device.
Figure 15:
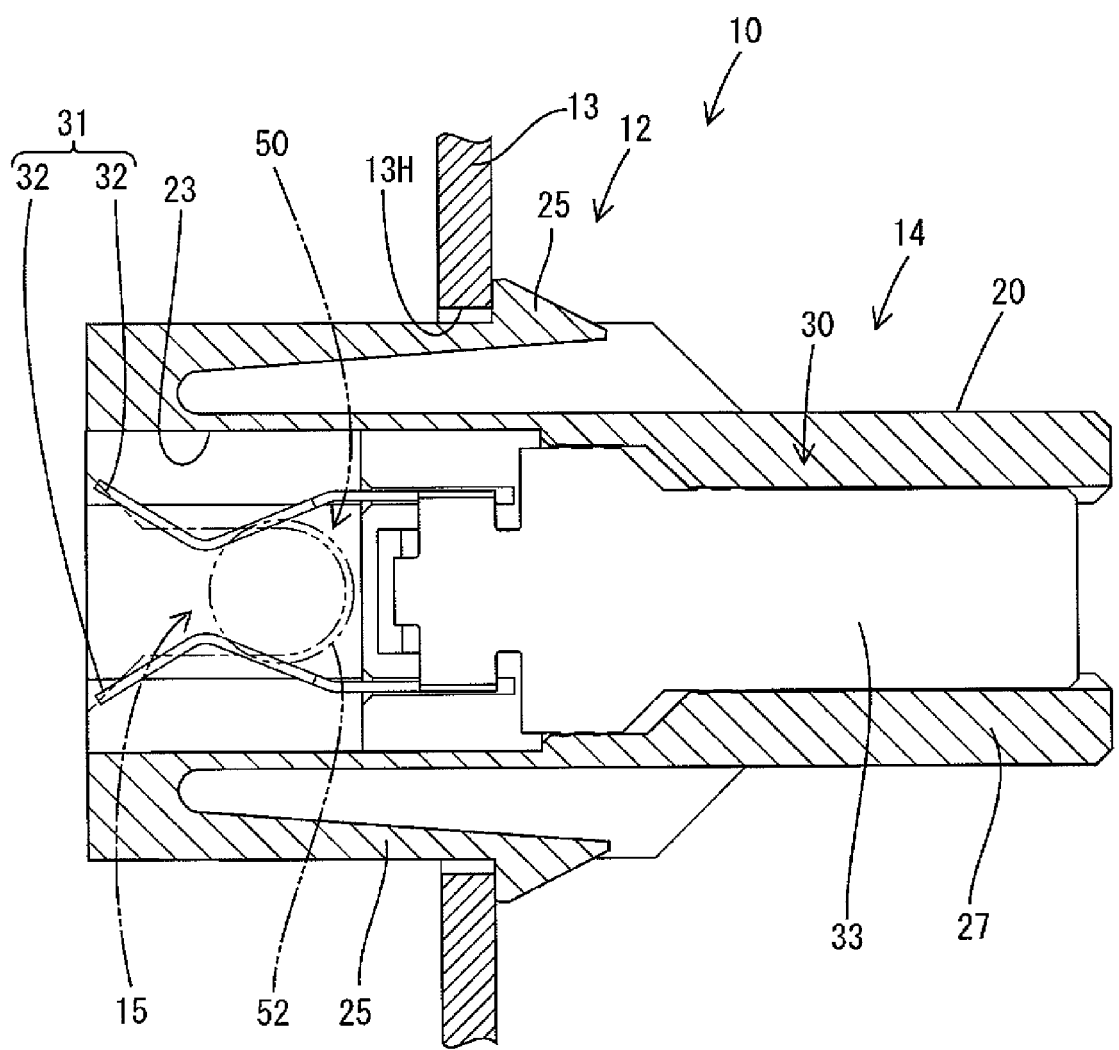
FIG. 15 is a sectional view of a relay connector.

As shown also in FIGS. 14 and 15, a plurality of mounting holes 13H corresponding to the ends of the discharge tubes 15 are formed through the chassis 13 so as to extend from the front side to the back side, and are vertically arranged so as to be level with the respective discharge tubes 15. The relay connectors 14 are mounted through the respective mounting holes 13H. Each relay connector 14 includes a holder 20 preferably made of synthetic resin, and a metallic relay terminal 30 housed in the holder 20 (See FIG. 16).

Figure 16:
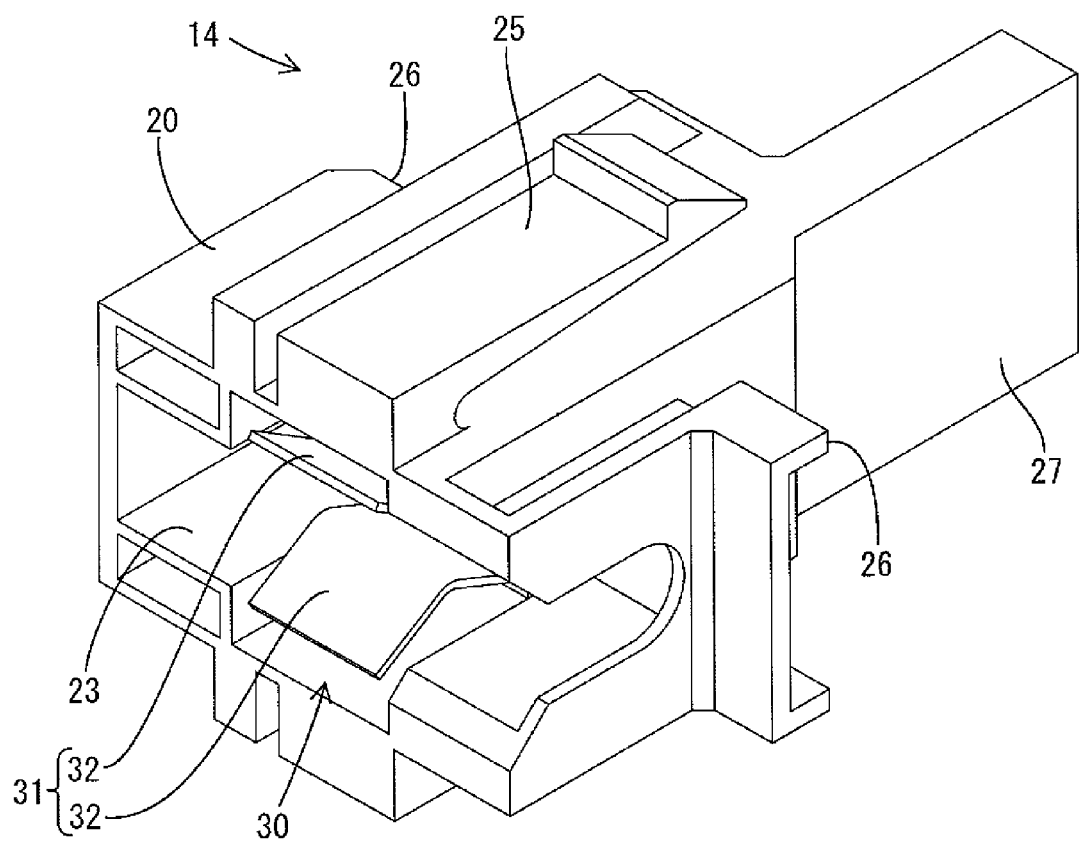
FIG. 16 is a perspective view of the relay connector.

As shown in FIGS. 14 to 16, a pair of upper and lower elastic retaining portions 25 and a pair of right and left engaging surfaces 26 are formed on the outer surface of the holder 20. The holder 20 is inserted into the mounting hole 13H from the front side of the chassis 13, and is fixed to the chassis 13 due to the engaging surfaces 26 in abutting contact with the opening edge of the mounting hole 13H on the front surface of the chassis 13 and due to the retaining protrusions of the elastic retaining portions 25 being locked by the opening edge of the mounting hole 13H on the back surface of the chassis 13. When attached to the chassis 13, the front end portion of the holder 20 projects to the front side of the chassis 13, while the back end portion of the holder 20 projects to the back side of the chassis 13. A container room 23 is formed in the projecting portion of the holder 20 on the front side of the chassis 13, by removing the front surface and one lateral surface thereof. A plate-shaped wall portion 27 is provided on the projecting portion of the holder 20 on the back side of the chassis 13. The relay terminal 30 is disposed in the holder 20.

The relay terminal 30, which can be formed by bending a metallic plate that is formed into a predetermined shape by punching, includes a tube connecting portion 31 having a pair of upper and lower elastic nipping portions 32 formed of plates having a substantially circular arc shape, and further includes a plate-shaped board connecting portion 33 projecting to the back side. The tube connecting portion 31 is disposed in the container room 23, while the board connecting portion 33 is arranged along the wall portion 27.

Figure 12:
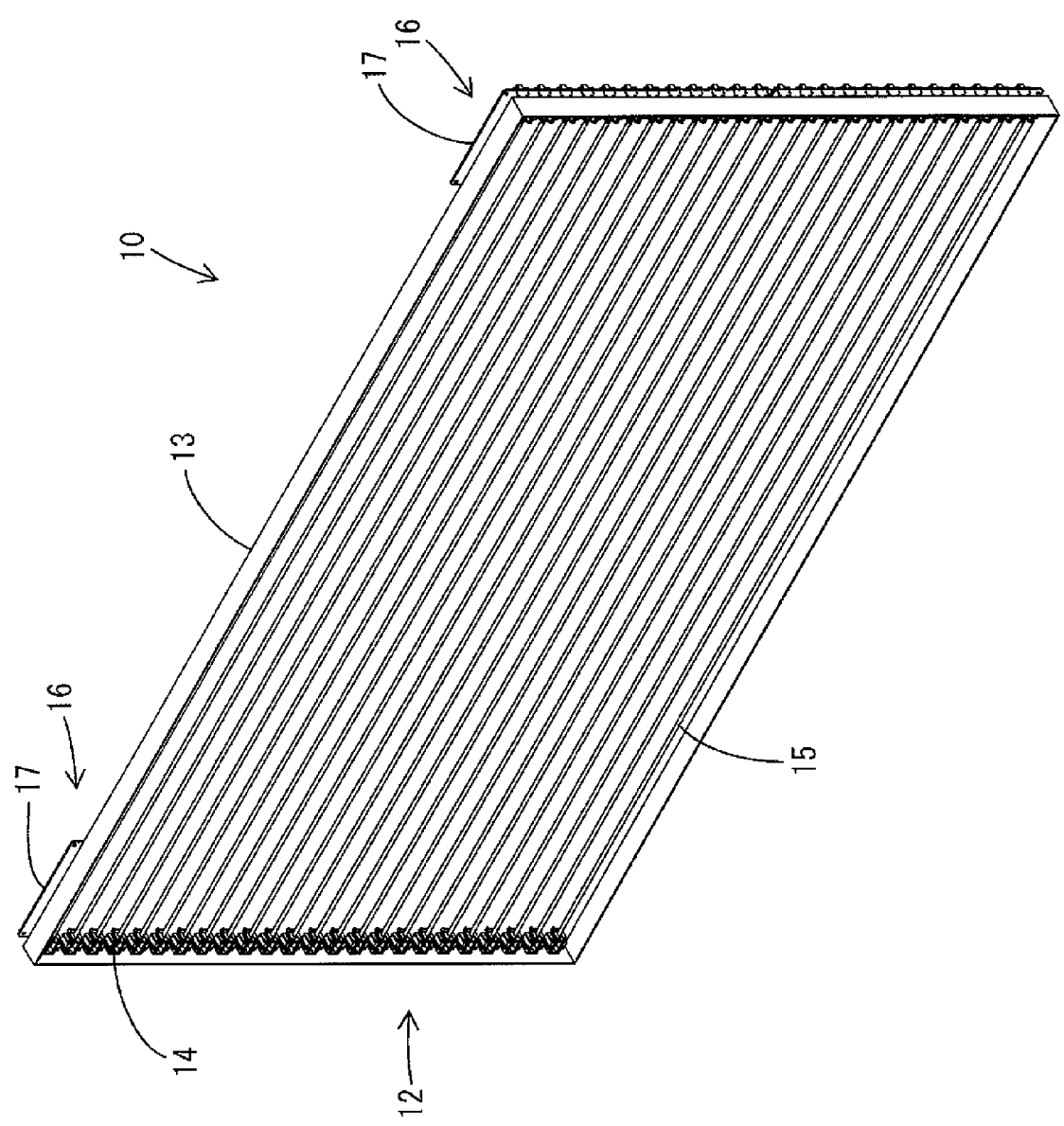
FIG. 12 is a perspective view of a lighting device.
Figure 13:
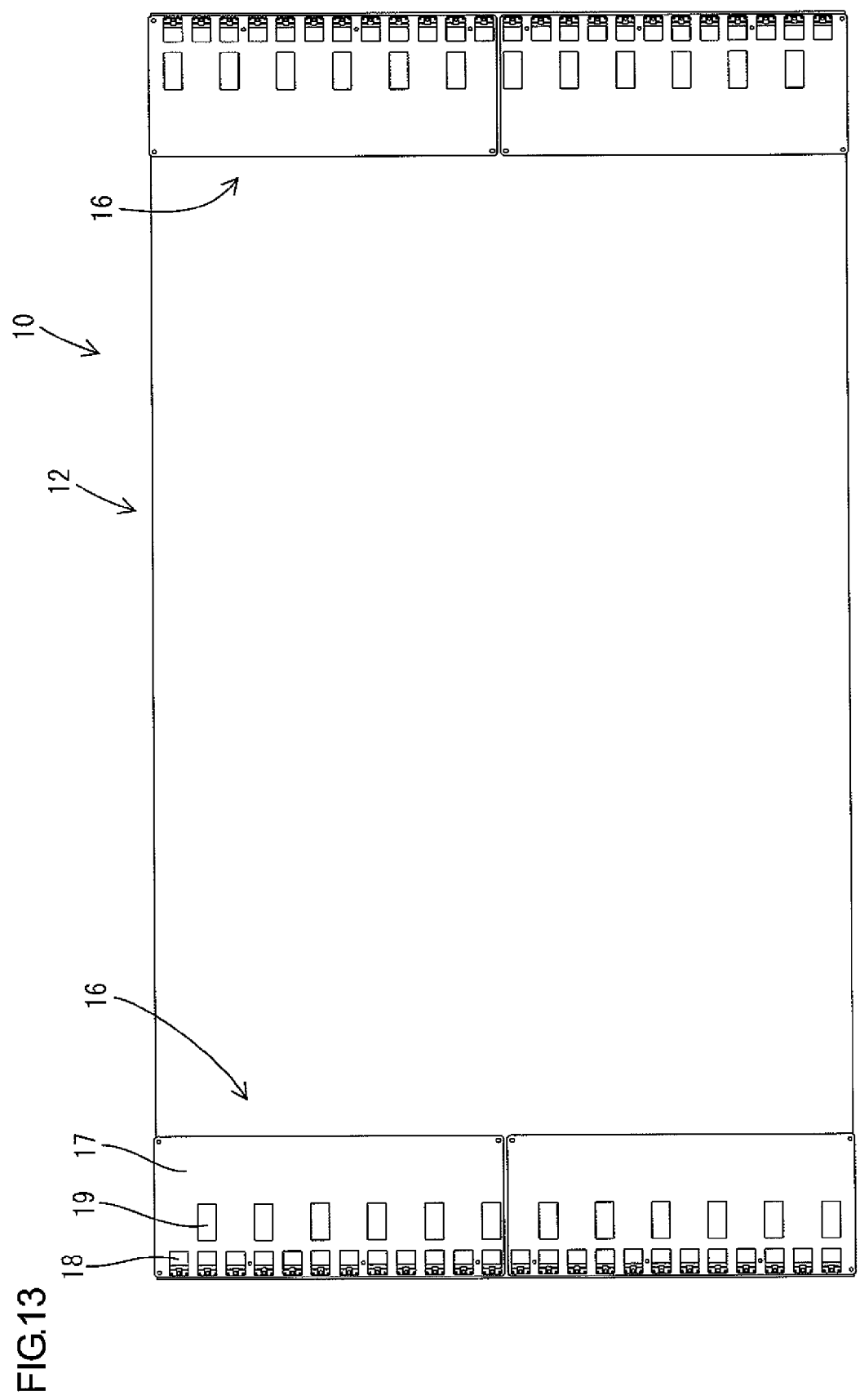
FIG. 13 is a rear view of the lighting device.

As shown in FIGS. 11 to 13, each power board 16 includes a circuit board 17 having a circuit formed on its back surface (i.e., the surface on the opposite side of the chassis 13), electronic components 19 mounted on the back surface of the circuit board 17, and a plurality of on-board connectors 18 mounted on the back surface of the circuit board 17.

Figure 17:
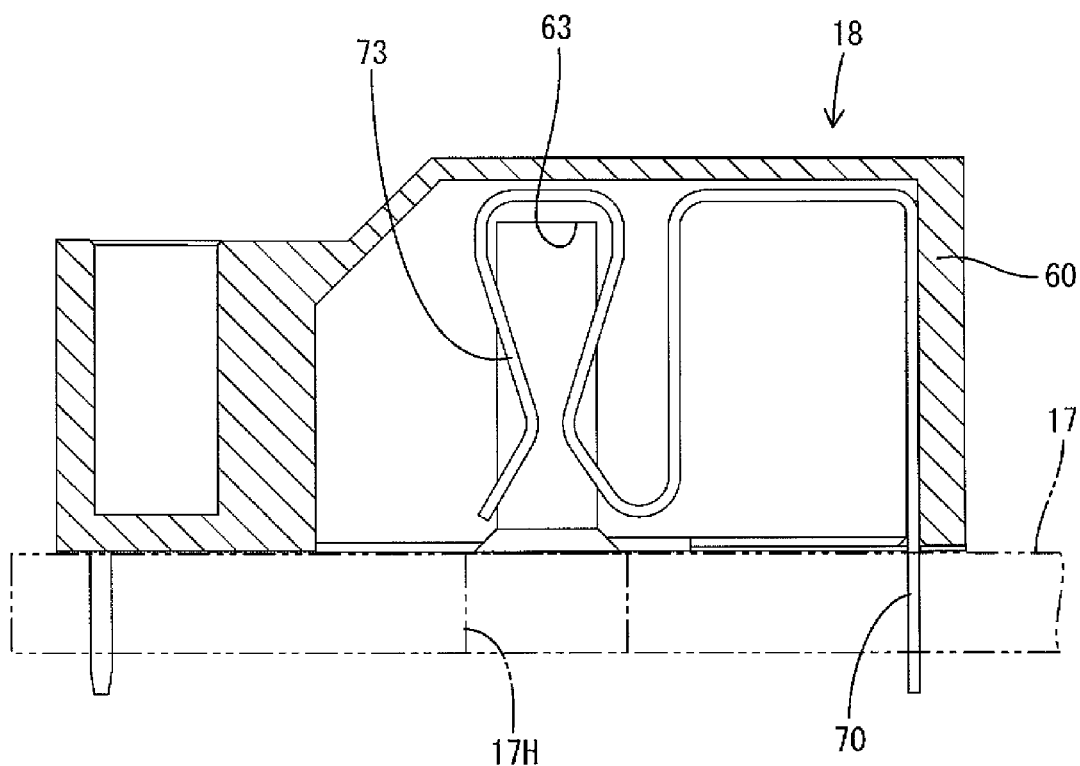
FIG. 17 is a sectional view of an on-board connector.
Figure 19:
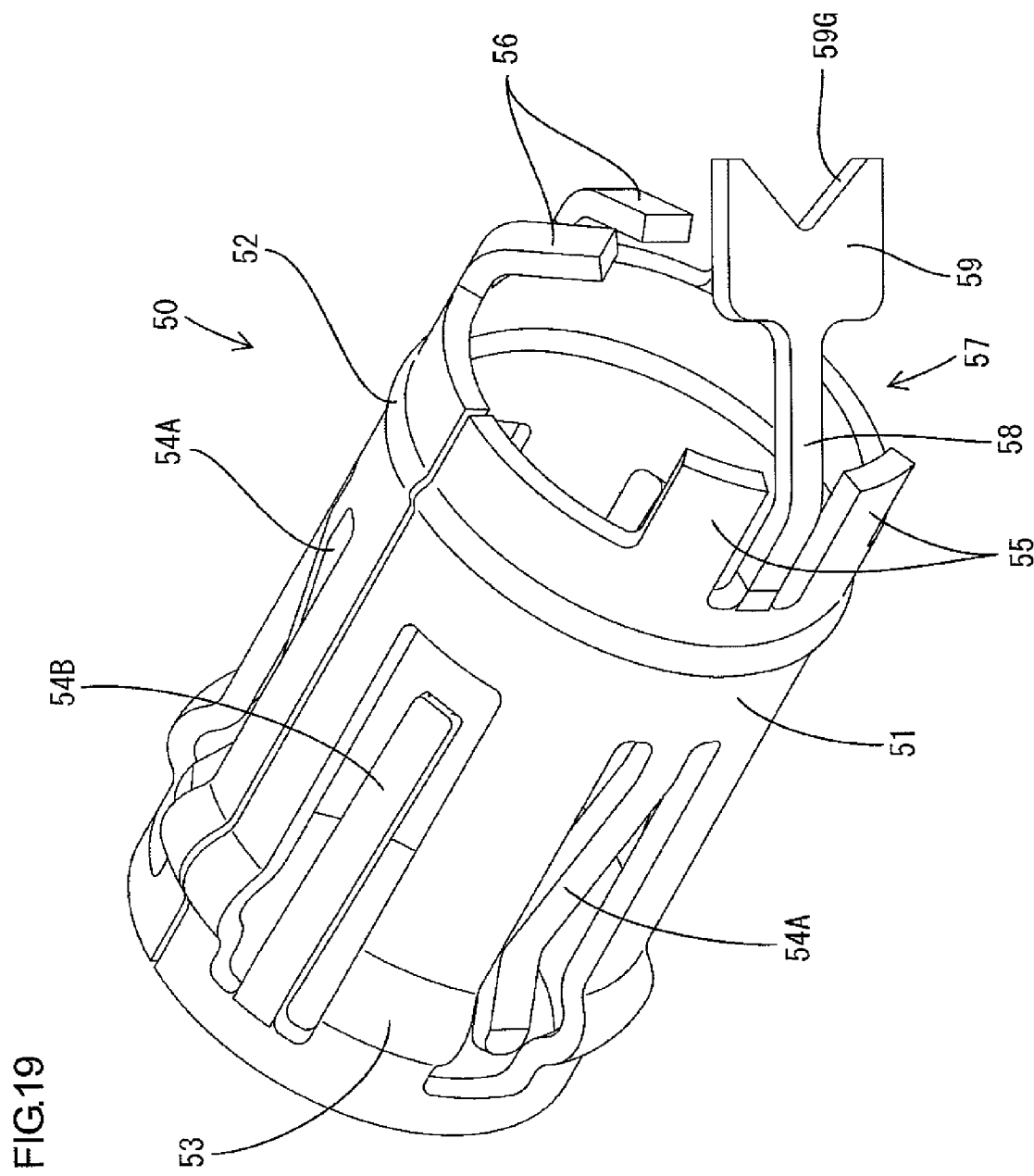
FIG. 19 is a perspective view of a ferrule according to preferred embodiment 2 of the present invention.
Figure 20:
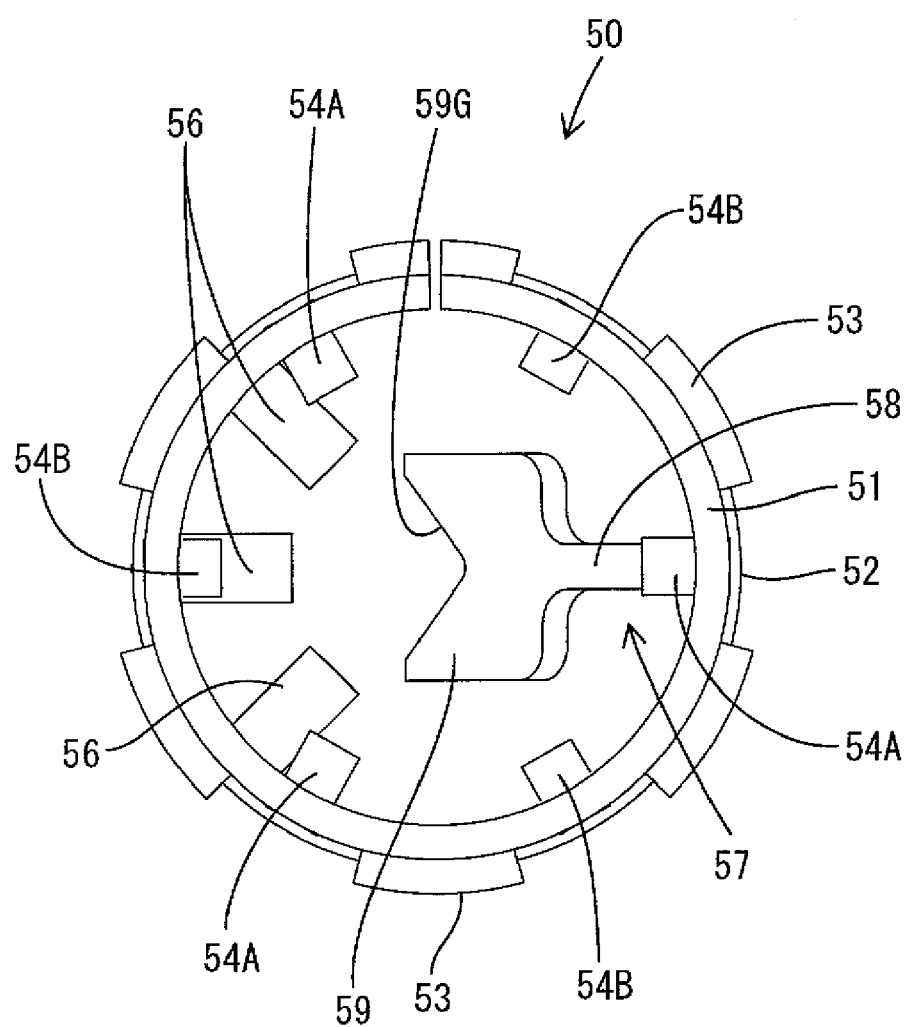
FIG. 20 is a side view of the ferrule.
Figure 21:
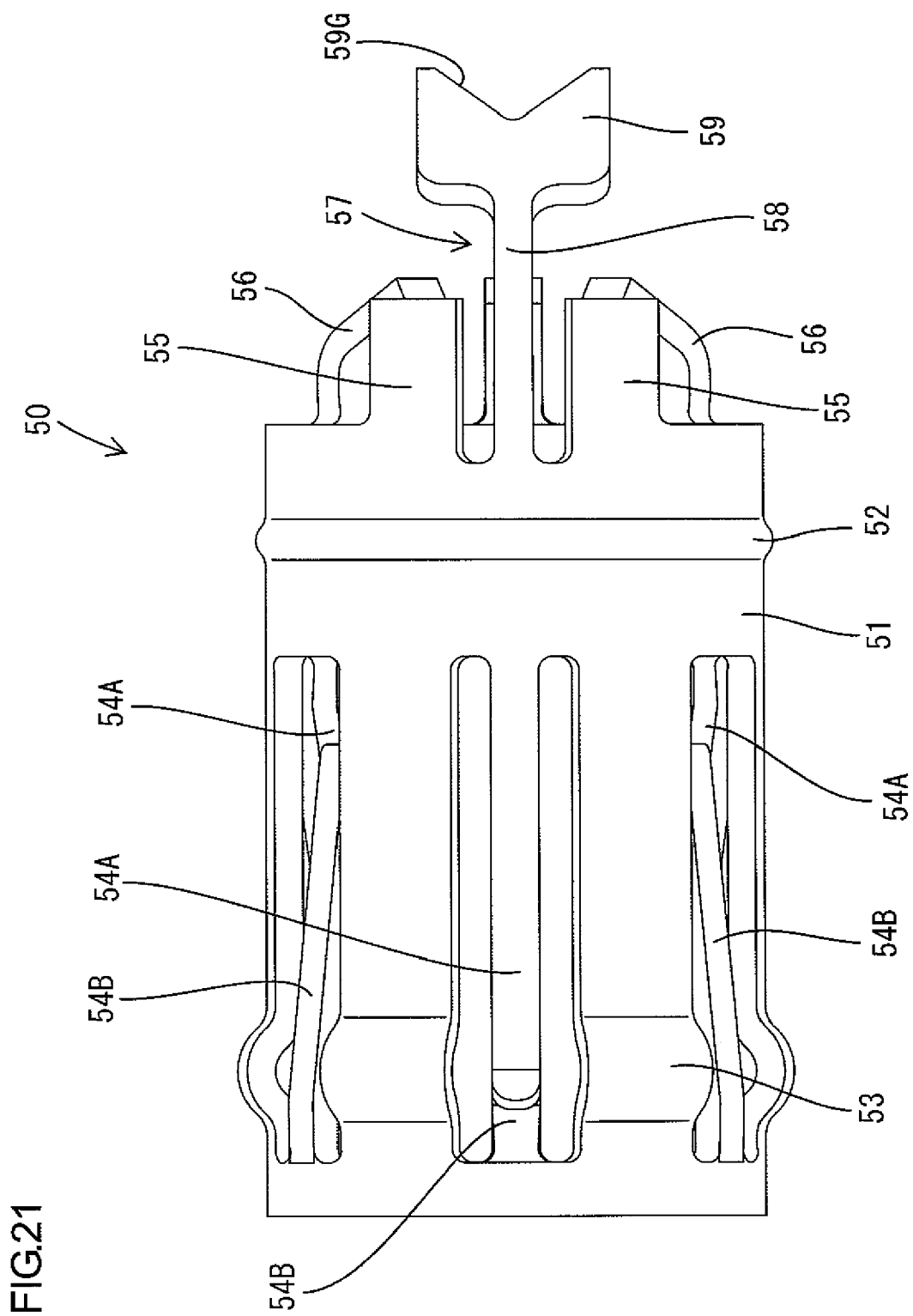
FIG. 21 is a front view of the ferrule.
Figure 22:
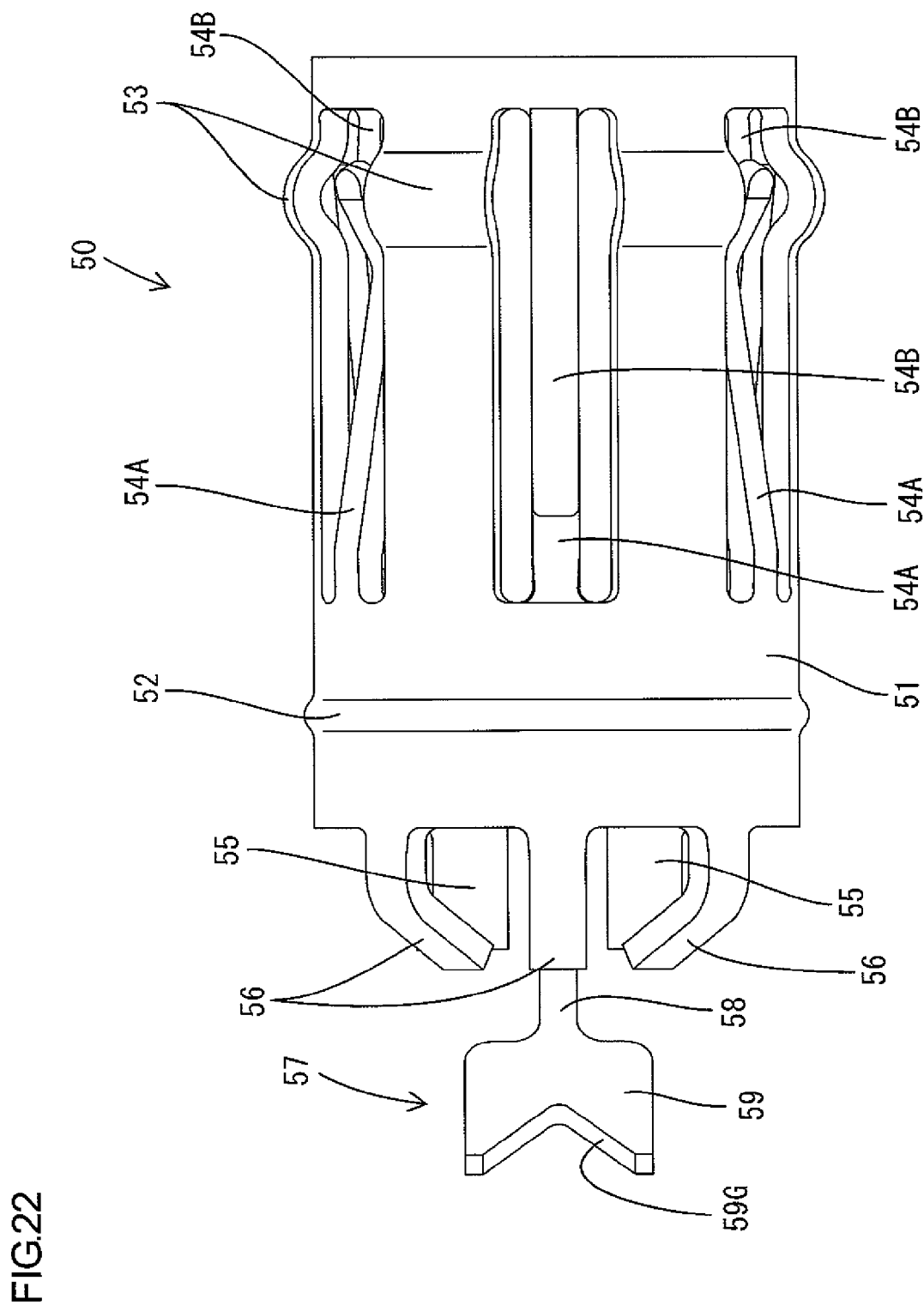
FIG. 22 is a rear view of the ferrule.
Figure 23:
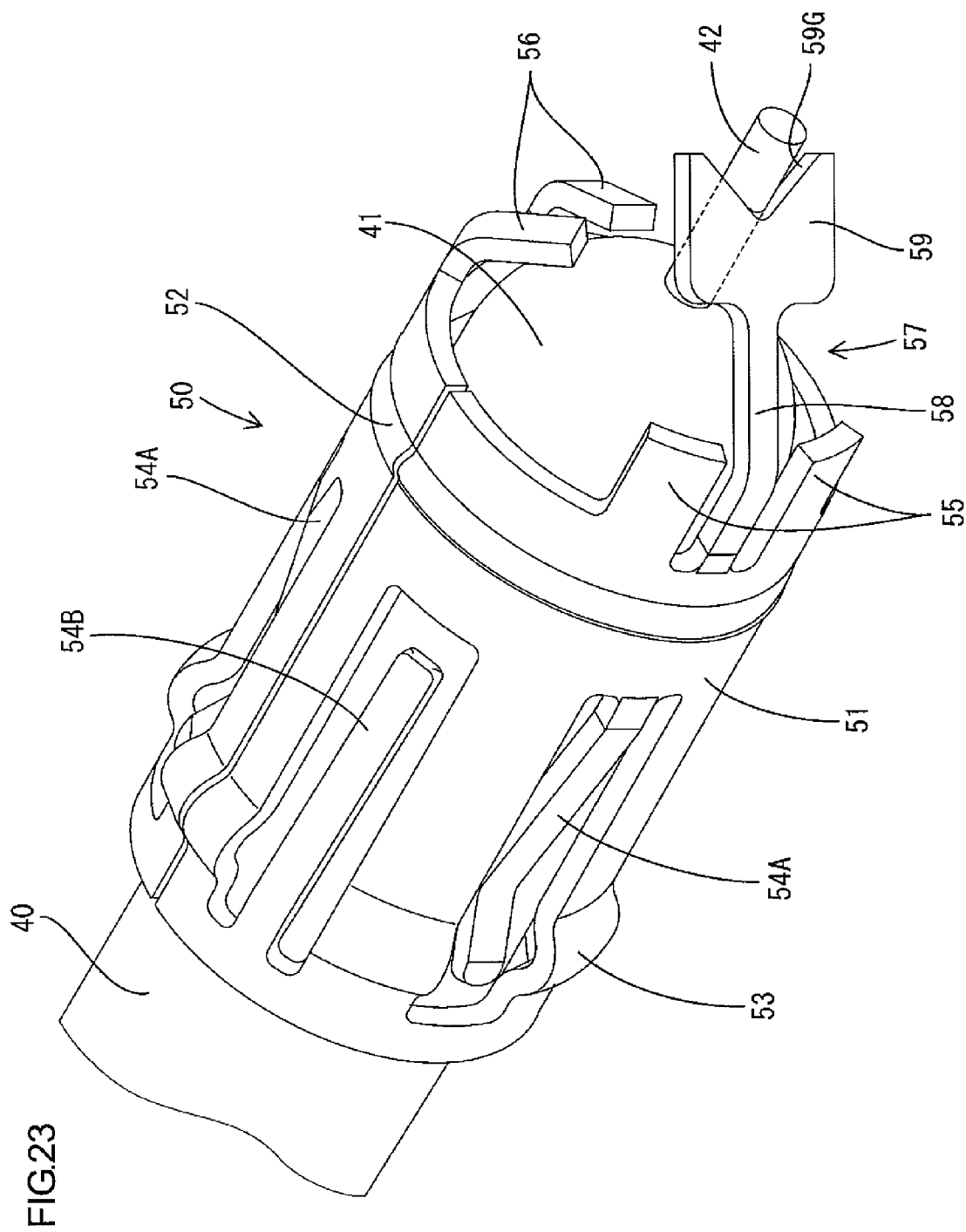
FIG. 23 is a perspective view of the ferrule attached to a glass tube.

The on-board connectors 18 are vertically arranged along the lateral side edge of the circuit board 17 so as to correspond to the respective relay connectors 14. As shown in FIG. 17, each on-board connector 18 includes a housing 60 made of synthetic resin, and a metallic output terminal 70 disposed in the housing 60. An engaging recess 63 with a vertically-elongated rectangular opening is formed on the front surface of the housing 60. The opening of the engaging recess 63 is aligned with a fitting hole 17H that is formed through the circuit board 17 so as to extend from the front side to the back side.

The output terminal 70, which can be formed by bending a metallic material that is formed into a predetermined shape by punching, includes a substantially U-shaped connecting portion 73 capable of elastic deflection. The connecting portion 73 is partly located in the engaging recess 63. The end portion of the output terminal 70 on the opposite side of the connecting portion 73 is connected to the circuit formed on the circuit board 17.

Discharge Tube 15

As shown in FIGS. 1 to 5, each discharge tube 15 used in the lighting device 10 preferably is formed of a cold cathode fluorescent tube that includes a generally elongated straight glass tube 40 having a circular cross section, elongated outer leads 42 which have a circular cross section and project linearly from the respective ends of the glass tube 40 and coaxially with the glass tube 40, and further includes ferrules 50 attached to the respective end portions 40a of the glass tube 40. Mercury is encapsulated in the glass tube 40. Each end portion 40a of the glass tube 40 is melted into a substantially hemispherical shape by heat, and thereby forms a domed portion 41. The outer lead 42 penetrates the domed portion 41.

Referring to FIGS. 6 to 10, each ferrule 50 preferably is a single-piece component, which can be formed by bending or hammering a metallic (e.g., copper alloy) plate that is gilded and formed into a predetermined shape by punching, for example. The ferrule 50 includes a body 51 and a conductive portion 57. The body 51 generally forms a cylindrical shape concentric with the glass tube 40. The inner diameter of the body 51 is preferably slightly larger than the outer diameter of the glass tube 40. A circumferential rib-shaped contact portion 52 is provided on an outer circumferential surface of the body 51, so as to bulge outward at a position slightly posterior to the anterior end edge thereof and form a circular shape concentric with the body 51. The contact portion 52 has a substantially semicircular cross section, so that the outer surface of the contact portion 52 can have line contact with the relay connector 14. A circumferential rib-shaped large diameter portion 53 is formed on the outer circumferential surface of the body 51, so as to bulge outward at a position slightly anterior to the posterior end edge thereof and form a circular shape concentric with the body 51. The large diameter portion 53 has a substantially semicircular cross section. The outer diameter of the large diameter portion 53 is preferably larger than the outer diameter of the contact portion 52. The contact portion 52 and the large diameter portion 53 are arranged respectively on the anterior end side and posterior end side of the body 51, so as to be spaced along the axial direction of the body 51.

Elastic gripping portions 54 are formed on the body 51 by making substantially U-shaped cuts in tangible portions thereof. Each elastic gripping portion 54 is generally formed as a cantilevered portion extending posteriorly (specifically, in an oblique direction slightly leaning radially inwardly), which is capable of elastic and radial deflection with a supported point on its proximal end (or anterior end). A curved portion 54a is formed on the distal end portion (or posterior end portion) of the elastic gripping portion 54, so as to curve in an oblique direction leaning radially outwardly. The outer surface of the curve (or inwardly facing surface) of the curved portion 54a can abut on the outer circumferential surface of the glass tube 40. Three elastic gripping portions 54 are formed at even intervals along the circumferential direction. An imaginary line that connects the curved portions 54*a* of the three elastic gripping portions 54 forms a circle concentric with the body 51. The diameter of the imaginary circle, when the elastic gripping portions 54 are not forced into elastic deflection or are in a free state, is preferably smaller than the outer diameter of the glass tube 40. The curved portions 54*a* of the elastic gripping portions 54 and the large diameter portion 53 are positioned in the axial direction of the body 51 to be substantially aligned with each other (i.e., both are positioned on the posterior end portion of the body 51). Therefore, the large diameter portion 53 is not circumferentially continuously provided, but breaks are provided so as to correspond to the elastic gripping portions 54.

On the body 51, a pair of protector portions 55 are formed as cantilevered portions protruding anteriorly from the anterior end edge thereof. The pair of protector portions 55 are circumferentially spaced apart, and extend linearly from the body 51 so as to be flush therewith. Further, on the body 51, preferably three front stoppers 56, for example, are formed as cantilevered portions protruding anteriorly from the anterior end edge thereof. The proximal end side (or posterior end side) of each of the three front stoppers 56 is flush with the body 51, while the distal end side (or anterior end side) thereof extends in an oblique direction leaning inwardly from a direction parallel or substantially parallel to the axis of the body 51. The three front stoppers 56 are positioned across the center of axis of the body 51 from the pair of protector portions 55.

The conductive portion 57 is formed as a cantilevered portion extending anteriorly from the anterior end edge of the body 51 and from between the pair of protector portions 55. The conductive portion 57 includes a long portion 58 continuous with the anterior end of the body 51, and a wide portion 59 that further projects anteriorly from the anterior end (or distal end) of the long portion 58, which results in an elastically deformable construction.

The proximal portion of the long portion 58 is continuous and flush with the body 51, and extends parallel or substantially parallel to the axis of the body 51. The distal portion of the long portion 58 extends in an oblique direction leaning inwardly toward the center of axis of the body 51, so that an imaginary line extending therefrom passes through the center of axis of the body 51 or its vicinity. The width of the long portion 58 is set to be sufficiently small for the length of the long portion 58. Therefore, the long portion 58 is capable of elastic deformation in the radial direction of the body 51, elastic deformation in a direction intersecting with the radial direction (and intersecting with the longitudinal direction of the long portion 58), and elastic torsional deformation around the long portion 58 itself as the axis. The anterior end edge portion of the body 51 corresponding to the area between the protector portions 55 is set to be posterior to the anterior end edge portion corresponding to the other area. Thereby, the proximal portion of the long portion 58 can be secured to be large in length. The proximal portion of the long portion 58 is circumferentially positioned to be sandwiched between the pair of protector portions 55. The anterior ends (or distal ends) of the protector portions 55 are positioned to be anterior to the anterior end (i.e., the distal-portion-connected curved portion) of the proximal portion of the long portion 58.

Figure 1:
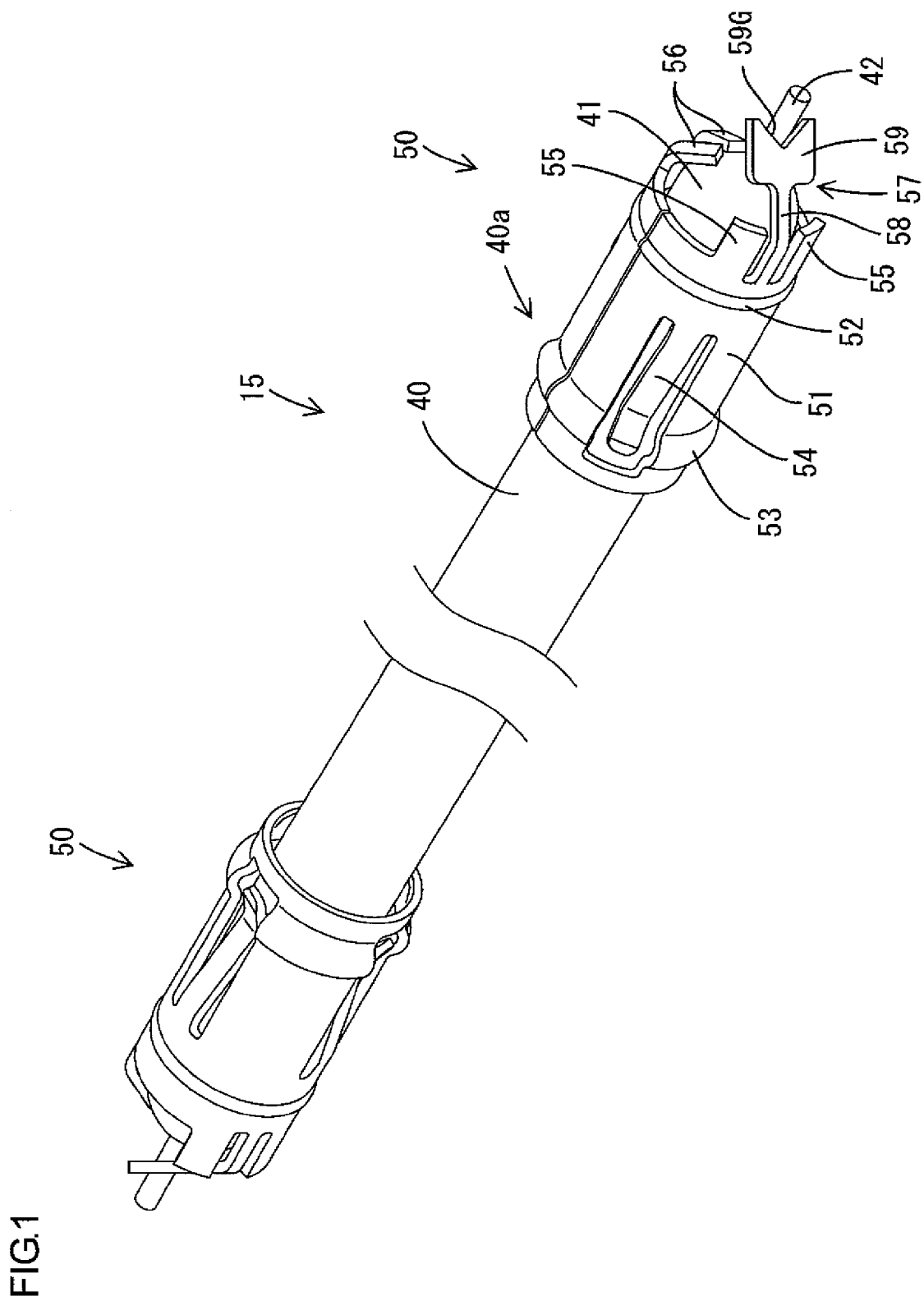
FIG. 1 is a perspective view of a discharge tube according to preferred embodiment 1 of the present invention.
Figure 2:
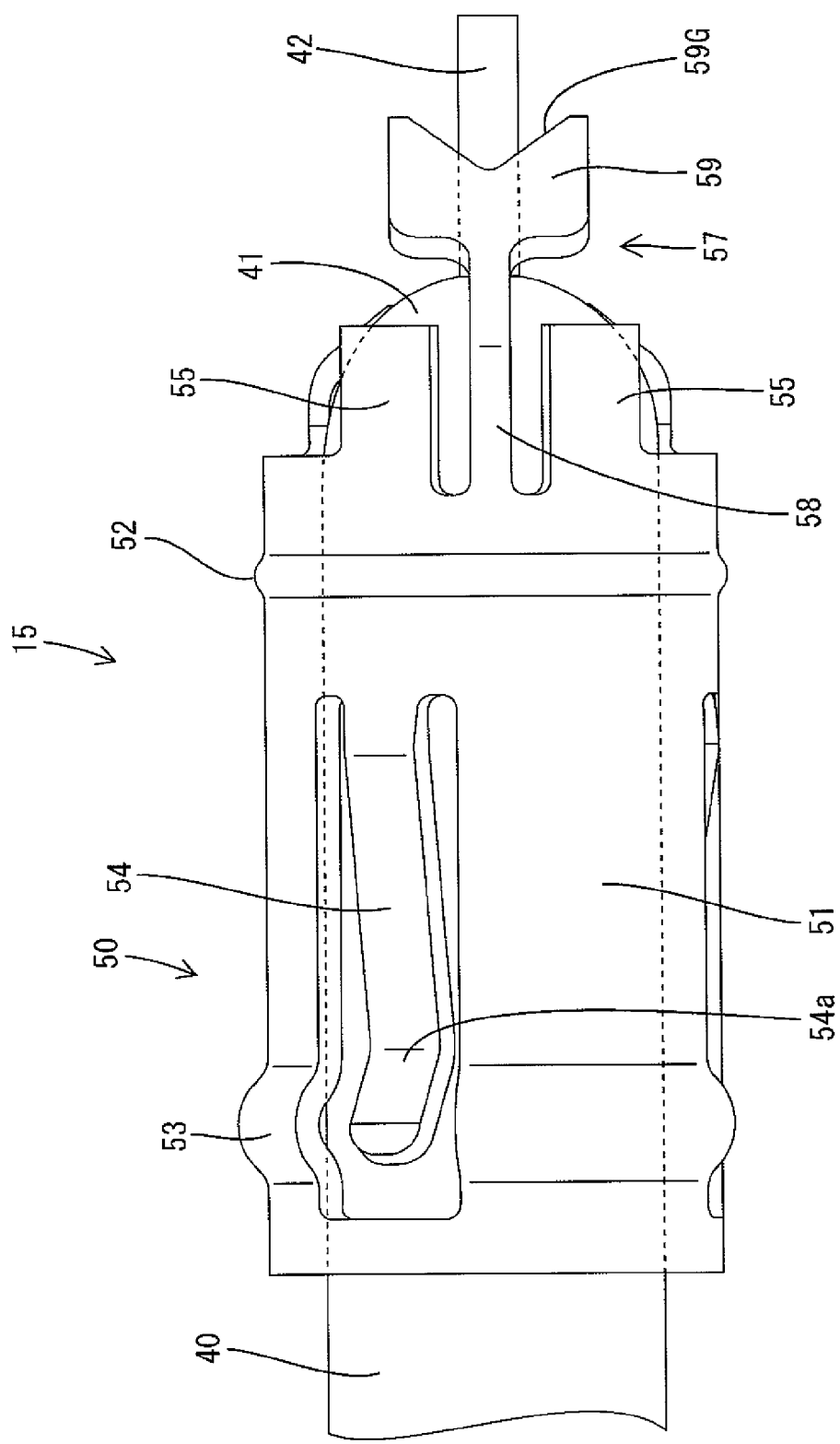
FIG. 2 is a partial front view of the discharge tube.
Figure 3:
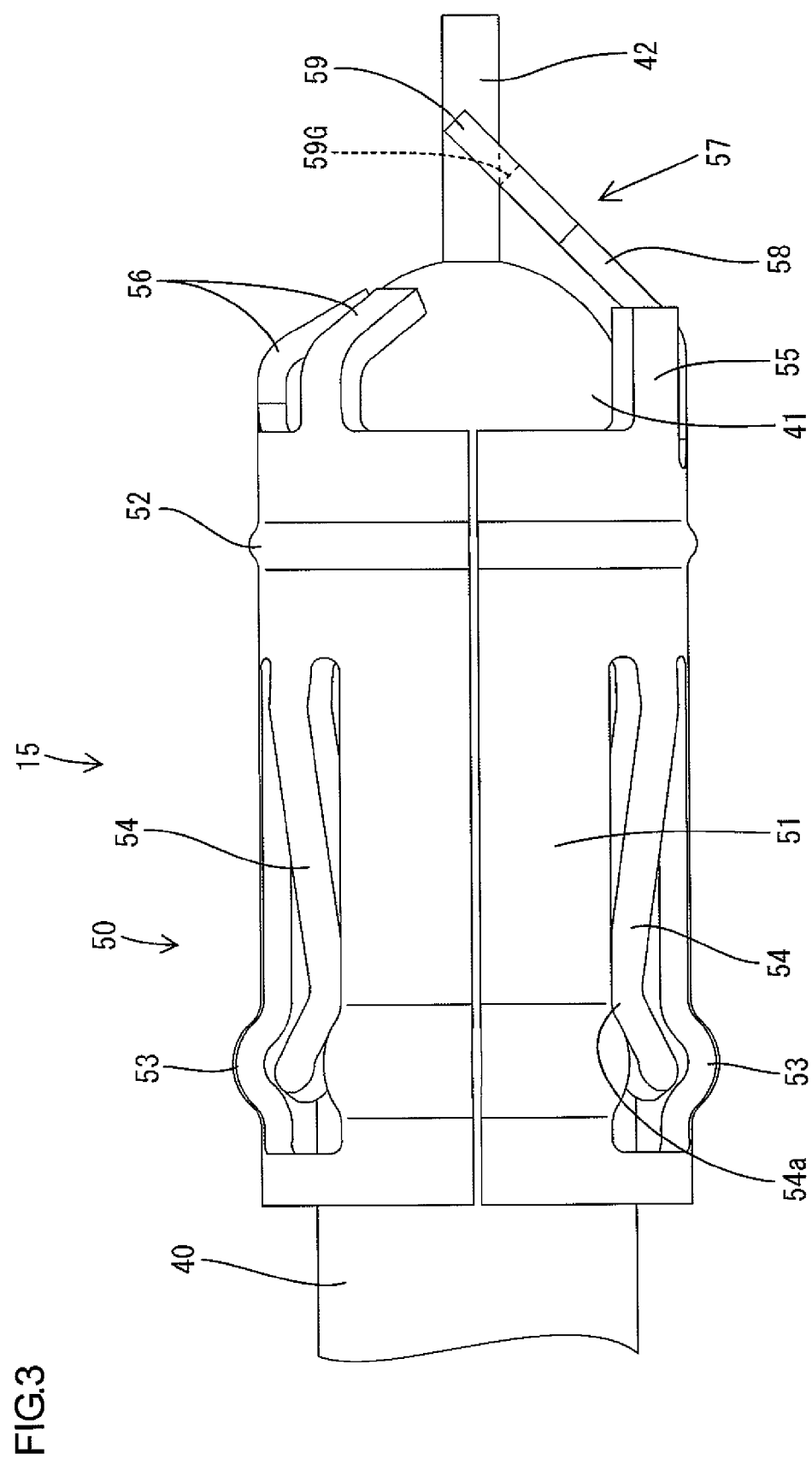
FIG. 3 is a partial plan view of the discharge tube.
Figure 4:
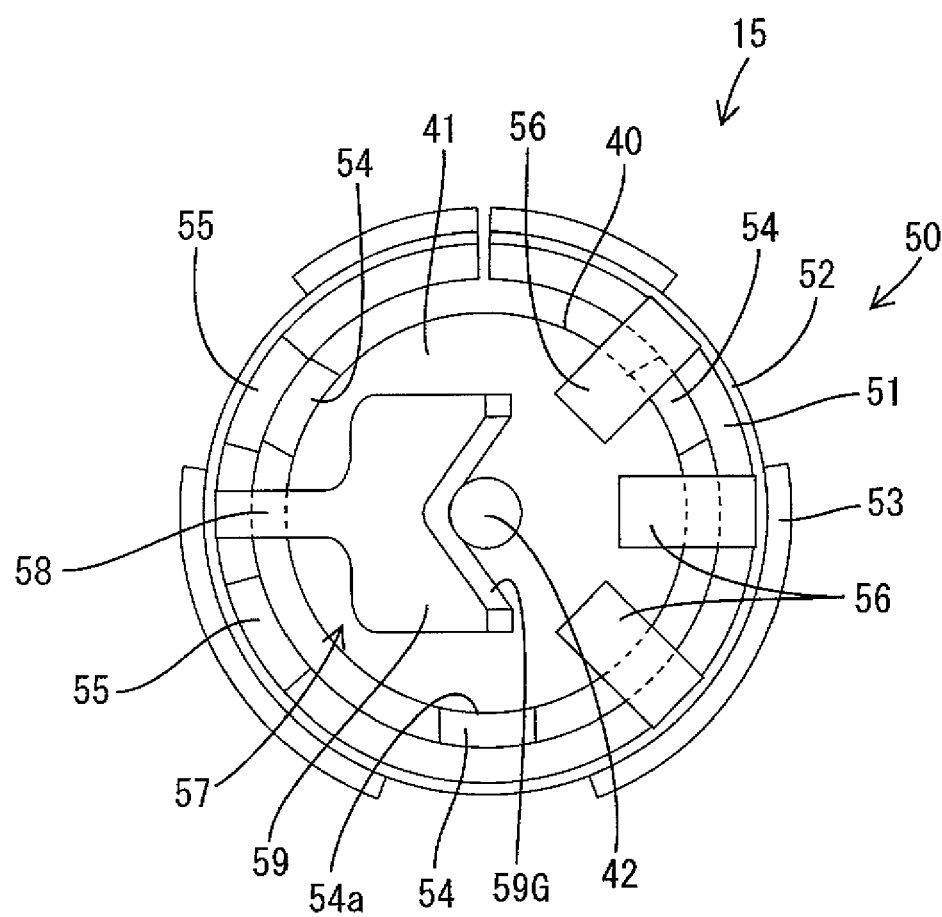
FIG. 4 is a side view of the discharge tube.
Figure 5:
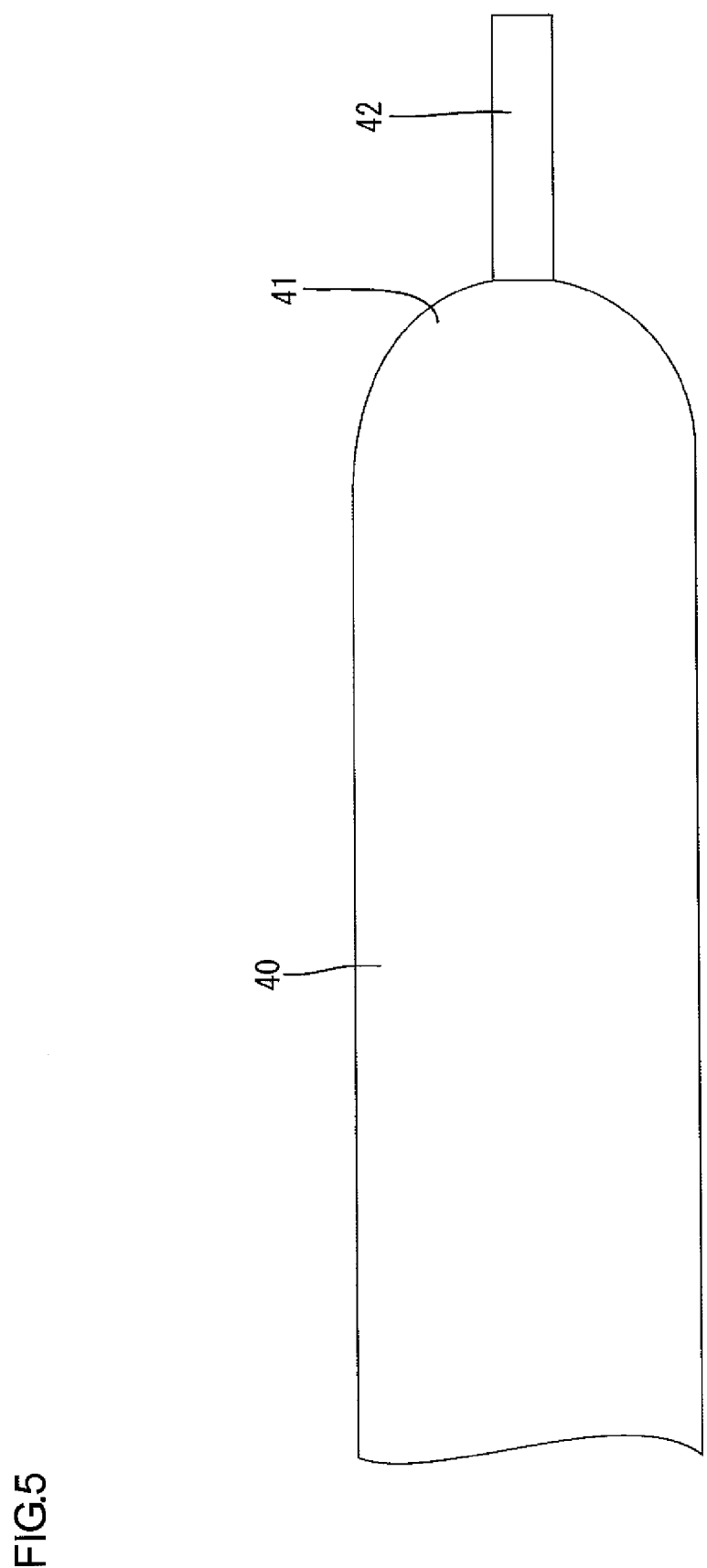
FIG. 5 is a partial front view of a glass tube.
Figure 6:
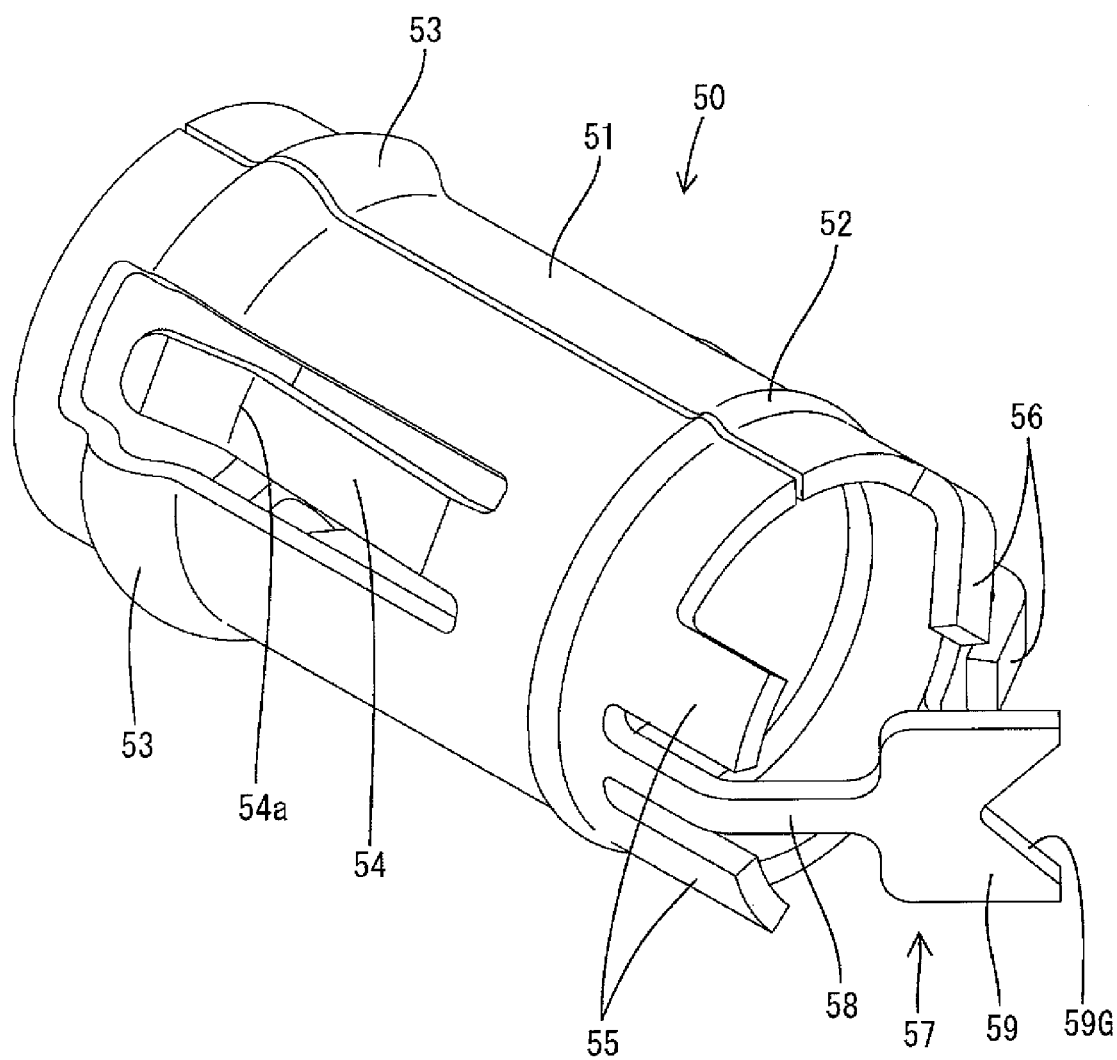
FIG. 6 is a perspective view of a ferrule.
Figure 7:
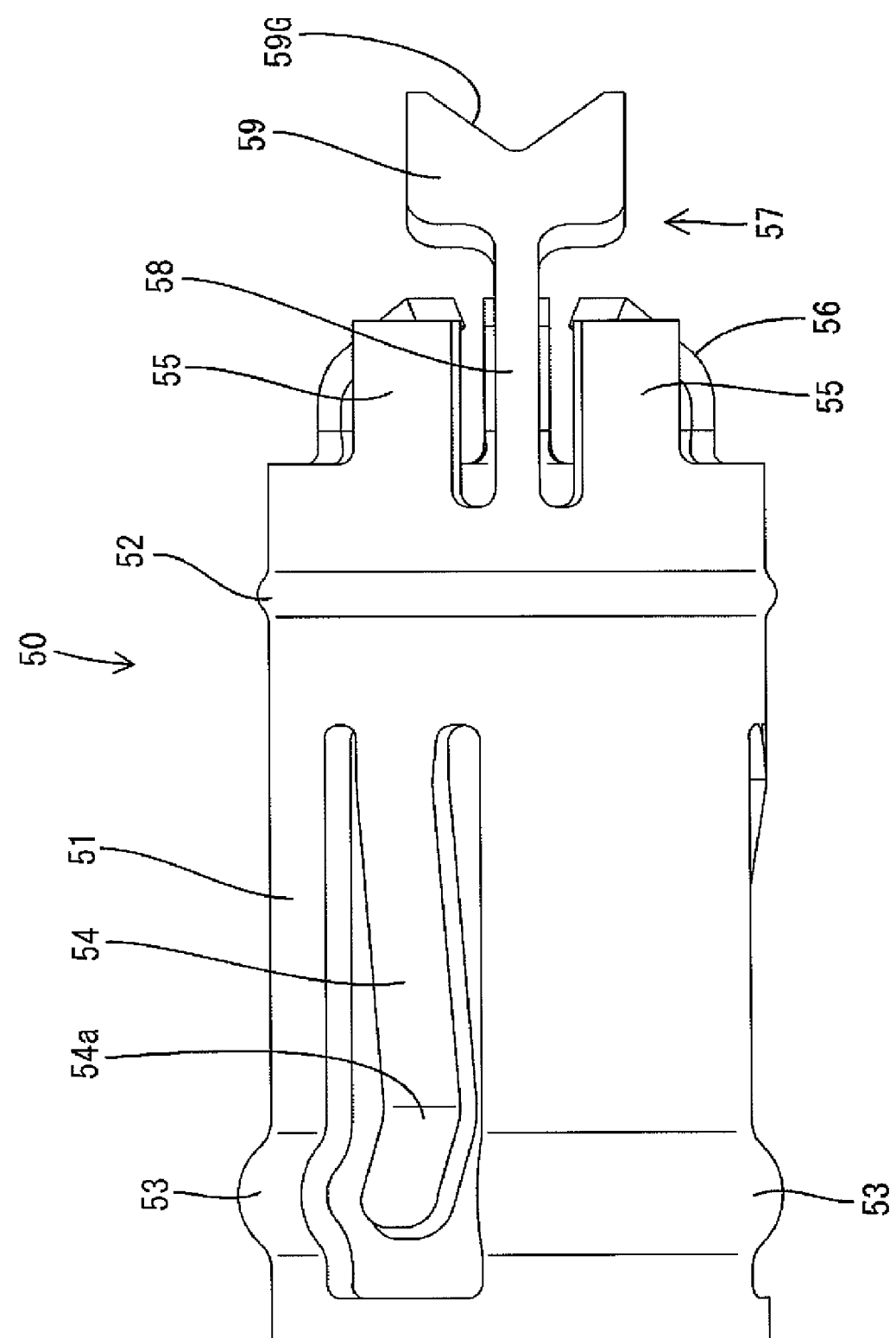
FIG. 7 is a front view of the ferrule.
Figure 8:
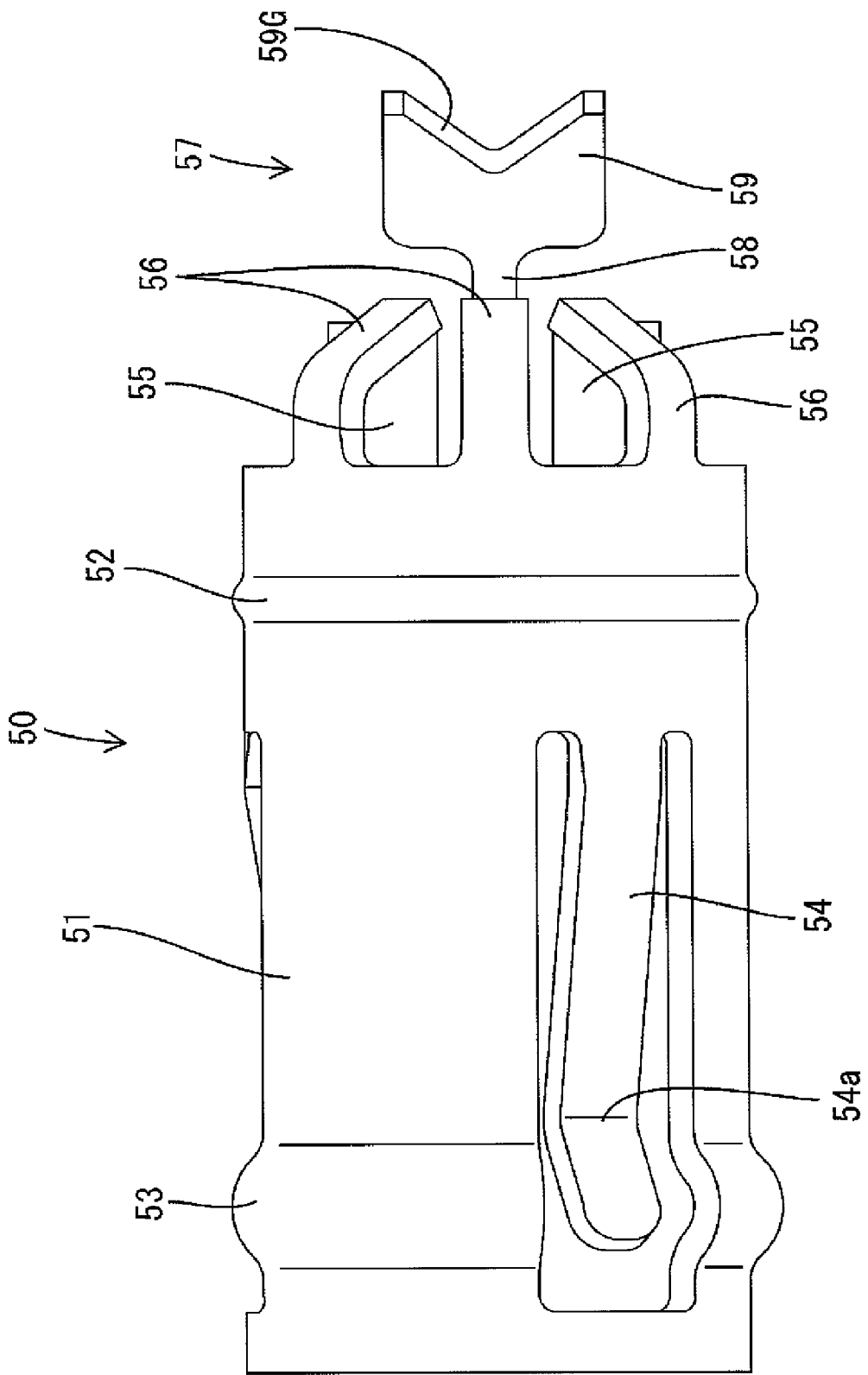
FIG. 8 is a rear view of the ferrule.
Figure 9:
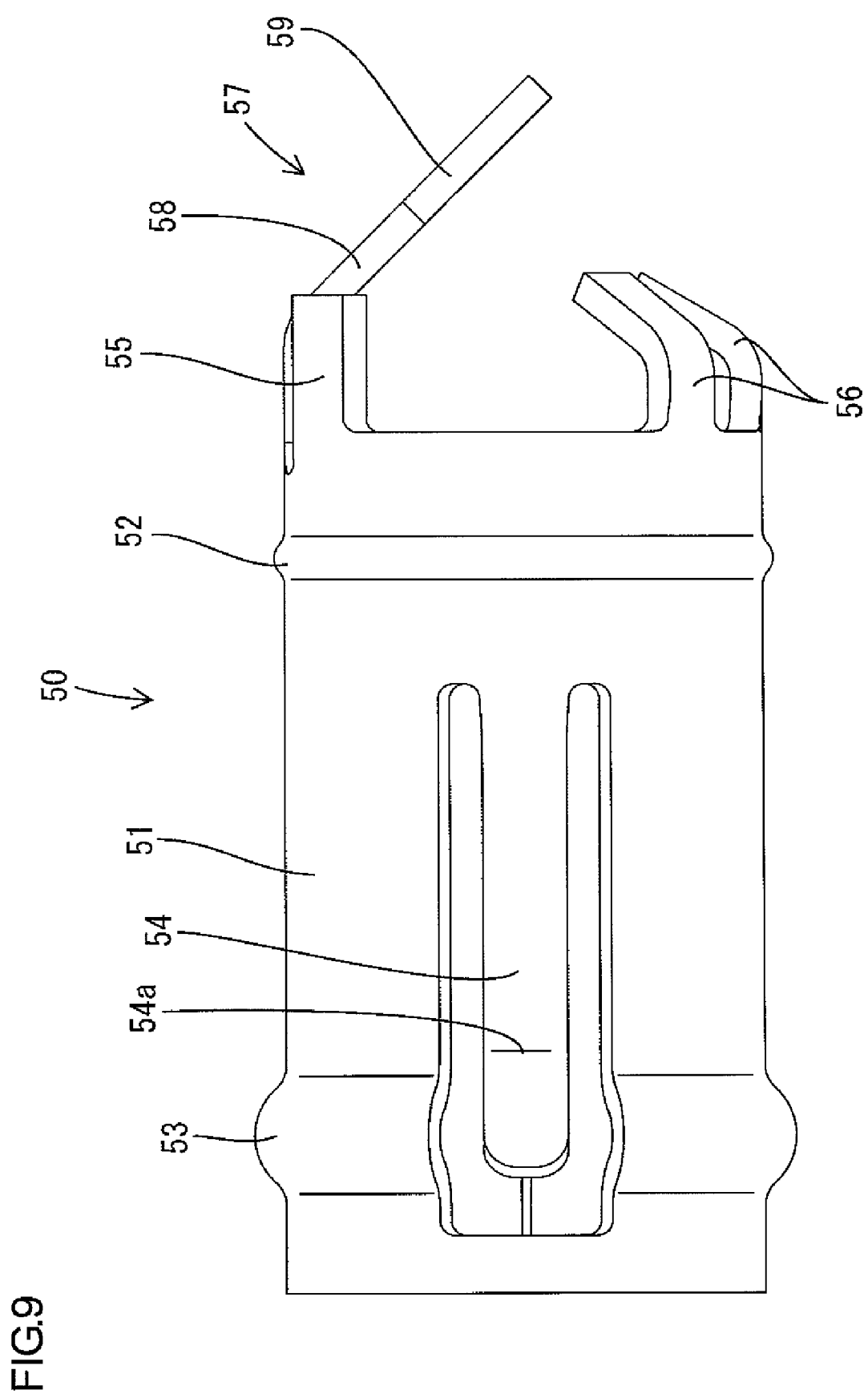
FIG. 9 is a bottom view of the ferrule.
Figure 10:
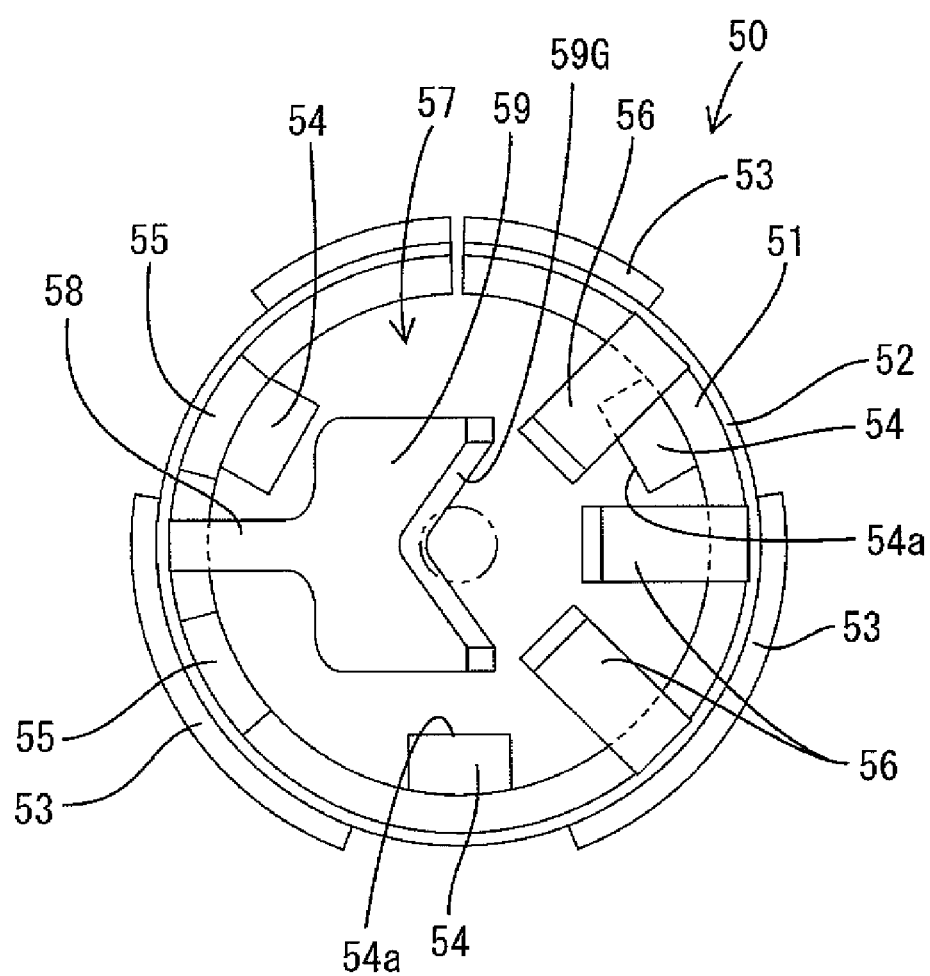
FIG. 10 is a side view of the ferrule.

The wide portion 59 is continuous and flush with the distal portion of the long portion 58. Therefore, the wide portion 59 extends in an oblique direction leaning inwardly toward the center of axis of the body 51. The wide portion 59 preferably has a substantially rectangular shape, which can be formed by widening the long portion 58 laterally and symmetrically so that the lateral edges are shifted outward, and on which a valley 59G is formed as a V-shaped cutout on the distal end edge (or anterior end edge) thereof. The valley 59G is laterally symmetrically formed so that its width gradually increases anteriorward. The maximum width of the valley 59G is set to be considerably larger than the outer diameter of the outer lead 42. The size and position of the wide portion 59, when the conductive portion 57 is not forced into elastic deformation or is in a free state, are set so that the outer lead 42 is partially overlapped with the wide portion 59 on a projection plane obtained when viewed along the axial direction of the body 51, as shown in FIG. 10.

Attachment of Ferrule 50 to Glass Tube 40

Next, an assembling process for attaching a ferrule 50 to a glass tube 40 will be explained.

During the assembling process, while a ferrule 50 and a glass tube 40 are held by respective holding devices (not shown), the ferrule 50 and the glass tube 40 are moved relatively and coaxially so as to approach each other. Thereby, the body 51 is fitted onto the glass tube 40. When the body 51 begins engagement, the curved portions 54*a* formed on the distal ends of the three elastic gripping portions 54 have elastic contact with the outer circumference of the glass tube 40. The curved potions 54*a* slide on the outer circumferential surface of the glass tube 40, as the assembling process proceeds.

When the tip of the outer lead 42 has passed through the body 51, the tip of the outer lead 42 has contact with the wide portion 59 of the conductive portion 57. Thereafter, as the assembling process proceeds, the outer lead 42 pushes the wide portion 59 anteriorward while the conductive portion 57 elastically deforms due to deflection of the long portion 58. During this time, the wide portion 59 is moved or displaced radially outward as well as anteriorward. Therefore, the outer lead 42 transfers to a state of contacting its outer periphery with the anterior end edge (or distal end edge) of the wide portion 59, when the assembling process is further advanced. At that time, the outer periphery of the outer lead 42 has contact with the sloped edge of the valley 59G provided on the anterior end edge of the wide portion 59, because the valley 59G is thus formed on the anterior end edge of the wide portion 59. Therefore, even if the outer lead 42 is arranged eccentrically with respect to the glass tube 40 due to radial displacement or is directed diagonally to the axis of the glass tube 40, the wide portion 59 moves in its width direction and relatively to the outer lead 42 due to guidance by the sloped edge of the valley 59G, resulting in the outer lead 42 necessarily fitted onto the far end of the valley 59G and thereby held deep therein.

When both of the holding devices have reached predetermined final positions after further progress in the assembling process, the ferrule 50 and the glass tube 40 are axially positioned in proper positions. Thereafter, the wide portion 59 is electrically conductively fixed to the outer lead 42 by welding, and consequently the ferrule 50 is integrated with the glass tube 40. Then, the assembling process terminates, and the discharge tube 15 is completed.

When the ferrule 50 is attached to the glass tube 40, the body 51 is coaxially held on the glass tube 40 due to the elastic holding function of the three elastic gripping portions 54. A gap (airspace) is secured between the outer circumference of the glass tube 40 and the inner circumference of the body 51, so as to extend over the substantially entire circumference. The front stoppers 56 are not in contact with the glass tube 40.

The discharge tube 15, thus assembled, is fixed to relay connectors 14. At the time of fixation, the discharge tube 15 held in a horizontal position is moved toward the front surface of the chassis 13, and the end portions and the ferrules 50 of the glass tube 40 are fitted into the container rooms 23 of the relay connectors from the front side. At that time, the pairs of elastic nipping portions 32 are pushed to open vertically due to elastic deflection, resulting in elastically pinching the bodies 51 of the ferrules 50. Consequently, the discharge tube 15 is held by the tube connecting portions 31 at its end portions, and is thus fixed to the chassis via the relay terminals 30 and the holders 20 provided as the relay terminal 30 mounting bases. When attached to the chassis 13, the weight of the discharge tube 15 is received solely by the chassis via the relay connectors 14. That is, the outer leads 42 will not be under load due to the weight of the discharge tube 15. Further, the pair of elastic nipping portions 32 can have contact with the contact portion 52 while elastically pinching it. Thereby, the outer lead 42 is electrically conductively connected to the relay terminal 30 via the ferrule 50.

Moreover, the power boards 16 are fixed to the back side of the chassis 13. At the time of fixation, the power board 16 is moved toward the chassis 13 while the circuit board 17 is kept parallel to the chassis 13, so that the wall portion 27 of each relay connector 14 and the board connecting portion 33 arranged along the wall portion 27 penetrate the circuit board 17 through the fitting hole 17H and are inserted into the engaging recess 63 of the on-board connector 18. The mounting direction of the on-board connectors 18 to the relay connectors 14 is directly opposite to the above-described mounting direction of the discharge tube 15 to the relay connectors 14. That is, the mounting directions are parallel or substantially parallel to each other. When the on-board connectors 18 have reached a proper state of being fitted onto the relay connectors 14, the power board 16 is screwed or otherwise fixed to the chassis 13.

When the on-board connector 18 is fitted onto the relay connector 14, the connecting portion 73 of the on-board connector 18 can have elastic contact with the plate-shaped board connecting portion 33 of the relay connector 14. Thereby, the output terminal 70 of the on-board connector 18 is electrically conductively connected to the relay terminal 30 of the relay connector 14. Thus, the power board 16 is connected to the discharge tube 15 via relay connectors 14, so that power from the power board 16 can be supplied to the discharge tube 15.

Operational Effects of the Present Preferred Embodiment

As described above, a discharge tube 15 of the present preferred embodiment is mounted to (or is borne by) relay connectors 14 via the bodies 51 of ferrules 50 attached to the end portions of the glass tube 40. Therefore, the outer leads 42 will not be under load due to the weight of the discharge tube 15. Further, the conductive portion 57 solely has elastic contact with the outer lead 42. Thus, stress concentration on the outer lead 42 can be prevented.

Moreover, the conductive portion 57 can infallibly have contact with the outer lead 42, because a valley 59G is formed on the distal end edge of the conductive portion 57 so that the valley 59G of the conductive portion 57 can be connected to the outer periphery of the outer lead 42.

The conductive portion 57 includes a long portion 58 continuous with the body 51, and a wide portion 59 continuous with the distal end of the long portion 58. Thus, the wide portion 59 is formed so as to have contact with the outer lead 42, and thereby a large area of the wide portion 59 along its width direction can be secured to have contact with the outer lead 42. Consequently, the contact therebetween can be ensured. On the other hand, the long portion 58 immune to contact with the outer lead 42 is preferably small in width and thereby be prone to elastic deflection. Consequently, contact pressure applied to the outer lead 42 can be reduced, resulting in reduction of stress on the outer lead 42.

The protruding protector portions 55 are formed on the body 51 so as to be positioned on the respective sides of the proximal portion of the conductive portion 57. Thereby, the proximal portion of the long portion 58 of the conductive portion 57 can be protected from interference with foreign substances, and consequently deformation of the conductive portion 57 caused by interference with foreign substances can be prevented.

The elastic gripping portions 54 are formed on the body 51 so as to have elastic contact with the outer circumference of the glass tube 40. Thereby, the ferrule 50 can be prevented from rattling or radial movement relative to the glass tube 40, even if a large dimensional tolerance is set for the outer diameter of glass tubes 40.

Focusing on the glass tube 40 having a substantially cylindrical shape, the body 51 preferably has a cylindrical shape substantially concentric with the glass tube 40, and the contact portion 52 is formed along the circumferential direction. Thereby, connection to the relay connector 14 can be achieved without considering the angle of the discharge tube 15 about its axis.

The contact portion 52 is formed as a rib-shaped protrusion provided continuously along the circumferential direction. Therefore, when the discharge tube 15 is put on a workbench or the like, the surface of the contact portion 52 formed as a rib-shaped protrusion may get scratched due to contact with the workbench. When a plurality of discharge tubes 15 are bundled together, the contact portion 52 may also get scratched due to contact with the outer circumferential surface of the body 51 attached on another discharge tube 15. However, in the present preferred embodiment, the large diameter portion 53, which is formed to have an outer diameter larger than that of the contact portion 52, can prevent the contact portion 52 from being scratched.

Further, when a plurality of discharge tubes 15, each of which has a large diameter portion 53 describe above, are bundled together, the large diameter portion 53 may hit the contact portion 52 attached on another discharge tube 15 if the discharge tubes 15 are displaced along the axial direction from each other. However, in the present preferred embodiment, the contact portion 52 and the large diameter portion 53 are formed respectively on the anterior and posterior end portions of the body 51, so as to be spaced along the axial direction from each other. Thereby, a large diameter portion 53 can be prevented from interference with a contact portion 52.

The plurality of elastic gripping portions 54, formed on the body 51 so as to be circumferentially spaced apart, can abut on the outer circumference of the glass tube 40. Thereby, a gap (i.e., an airspace having a thermal conductivity lower than that of metal or synthetic resin) is secured between the outer circumference of the glass tube 40 and the inner circumference of the body 51, so as to extend over the substantially entire circumference. Consequently, heat transfer from the glass tube 40 to the body 51 side can be prevented, and thereby reduction in internal temperature of the glass tube 40 can be prevented. The suppression of temperature reduction in the glass tube 40 can prevent cohesion of mercury encapsulated in the glass tube 40. This enables retention of luminescent performance.

Preferred Embodiment 2

Next, preferred embodiment 2 of the present invention will be explained with reference to FIGS. 19 to 23. In the present preferred embodiment 2, the constructions of elastic gripping portions 54A, 54B differ from those of preferred embodiment 1. The other constructions are similar to preferred embodiment 1. Therefore, the same constructions are designated by the same symbols, and explanations for the constructions, operations and effects thereof are omitted.

In preferred embodiment 2, preferably six elastic gripping portions 54A, 54B, for example, are formed on a body 51 by punching, for example. First elastic gripping portions 54A, i.e., three of the six elastic gripping portions are formed as cantilevered portions extending posteriorly as in preferred embodiment 1, and are arranged at even angular intervals (i.e., at intervals of 120°) along the circumferential direction. Second elastic gripping portions 54B, i.e., the other three of the six elastic gripping portions are formed as cantilevered portions extending anteriorly or reversely from the first elastic gripping portions 54A, and are arranged at even angular intervals (i.e., at intervals of 120°) along the circumferential direction. The first elastic gripping portions 54A and the second elastic gripping portions 54B are alternately arranged along the circumferential direction, so that circumferentially adjacent first and second elastic gripping portions 54A and 54B are spaced 60° apart.

The first elastic gripping portions 54A and the second elastic gripping portions 54B are positioned in the axial direction (or in the longitudinal direction) so as to be substantially aligned with each other. That is, the proximal end portions (or anterior end portions) of the first elastic gripping portions 54A and the distal end portions (or anterior end portions) of the second elastic gripping portions 54B are axially positioned so as to be substantially aligned with each other, while the distal end portions (or posterior end portions) of the first elastic gripping portions 54A and the proximal end portions (or posterior end portions) of the second elastic gripping portions 54B are axially positioned so as to be substantially aligned with each other. The distal end portions of the six elastic gripping portions 54A, 54B can have elastic contact with the outer circumference of the glass tube, similarly to the elastic gripping portions of preferred embodiment 1. Due to the elastic contact, the body 51 of the ferrule 50 is arranged concentrically with the glass tube 40 so that a cylindrical airspace extending substantially uniformly over the entire circumference is formed between the body 51 and the outer circumference of the glass tube 40. One of the three first elastic gripping portions 54A is positioned in the circumferential direction so as to correspond to the conductive portion 57.

According to preferred embodiment 2, the ferrule 50 can be stably held on the glass tube 40, due to the six elastic gripping portions 54A, 54B which are arranged at even angular intervals along the circumferential direction so as to abut on the glass tube 40. Further, the elastic gripping portions 54A, 54B have contact with the glass tube 40 respectively at the posterior and anterior positions spaced along the axial direction. Thereby, the body 51 of the ferrule 50 is prevented from changing its orientation and consequently forming an angle with the axis of the glass tube 40. The stable orientation of the ferrule 50 on the glass tube 40 prevents variation in elastic pressing force applied by the conductive portion 57 to the outer lead 42.

Preferred Embodiment 3

Next, preferred embodiment 3 of the present invention will be explained with reference to FIGS. 24 to 35. In preferred embodiment 3, the construction of a lighting device 110 differs from that of preferred embodiment 1. The other constructions are similar to preferred embodiment 1. Therefore, the same constructions are designated by the same symbols, and explanations for the constructions, operations and effects thereof are omitted.

Overview of Lighting Device 110

Figure 24:
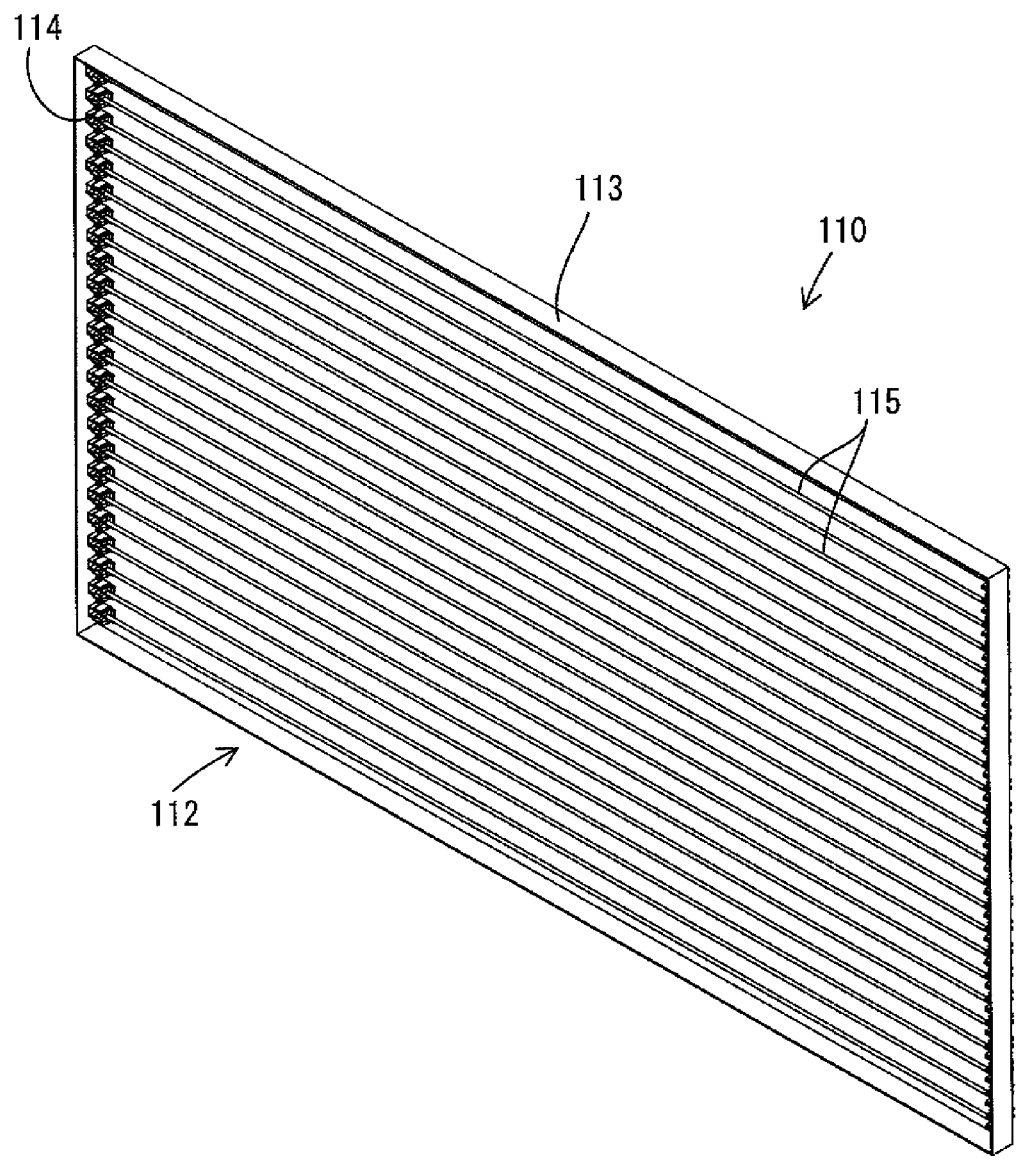
FIG. 24 is a front perspective view of a lighting device according to preferred embodiment 3 of the present invention.
Figure 25:
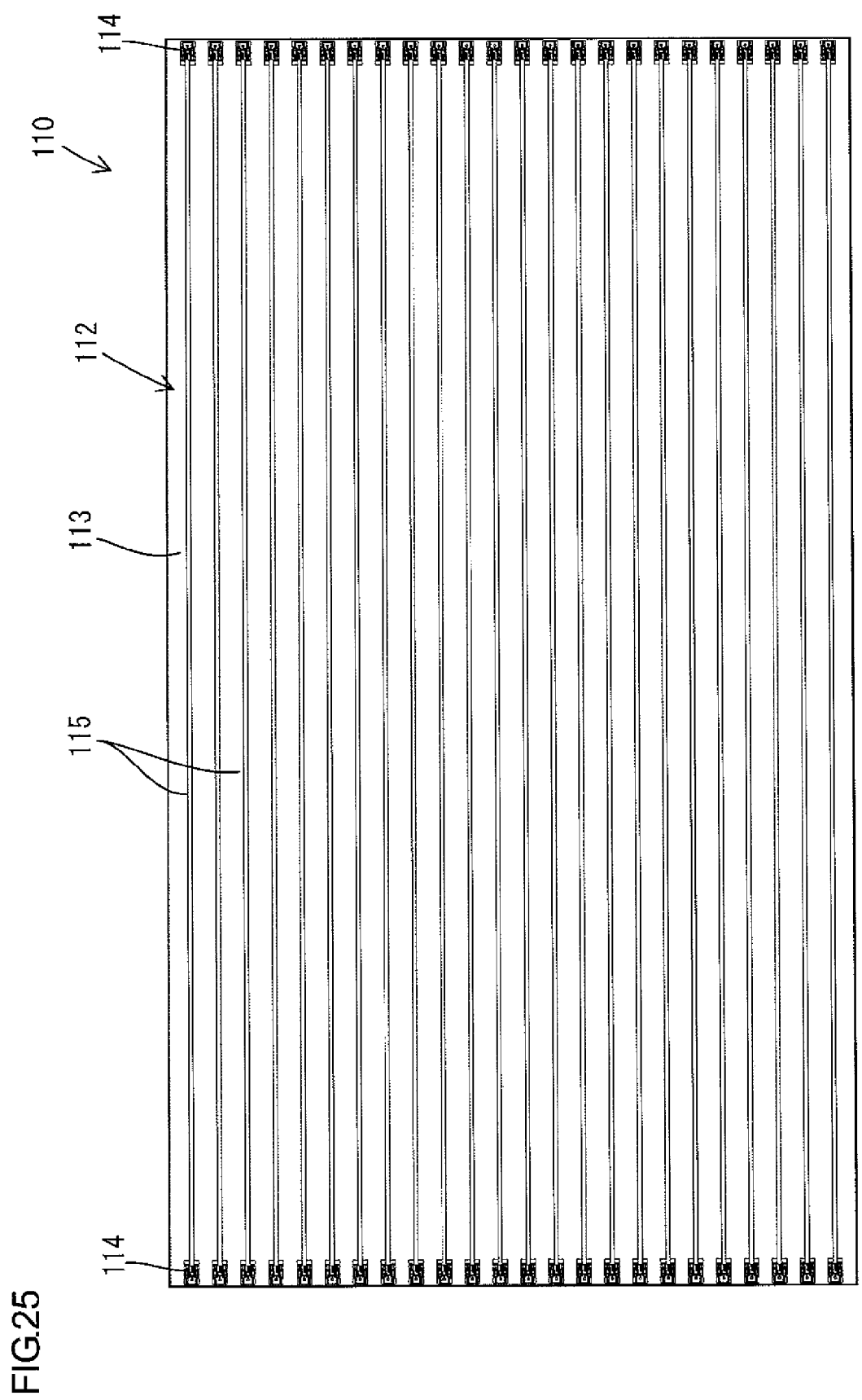
FIG. 25 is a front view of the lighting device.
Figure 26:
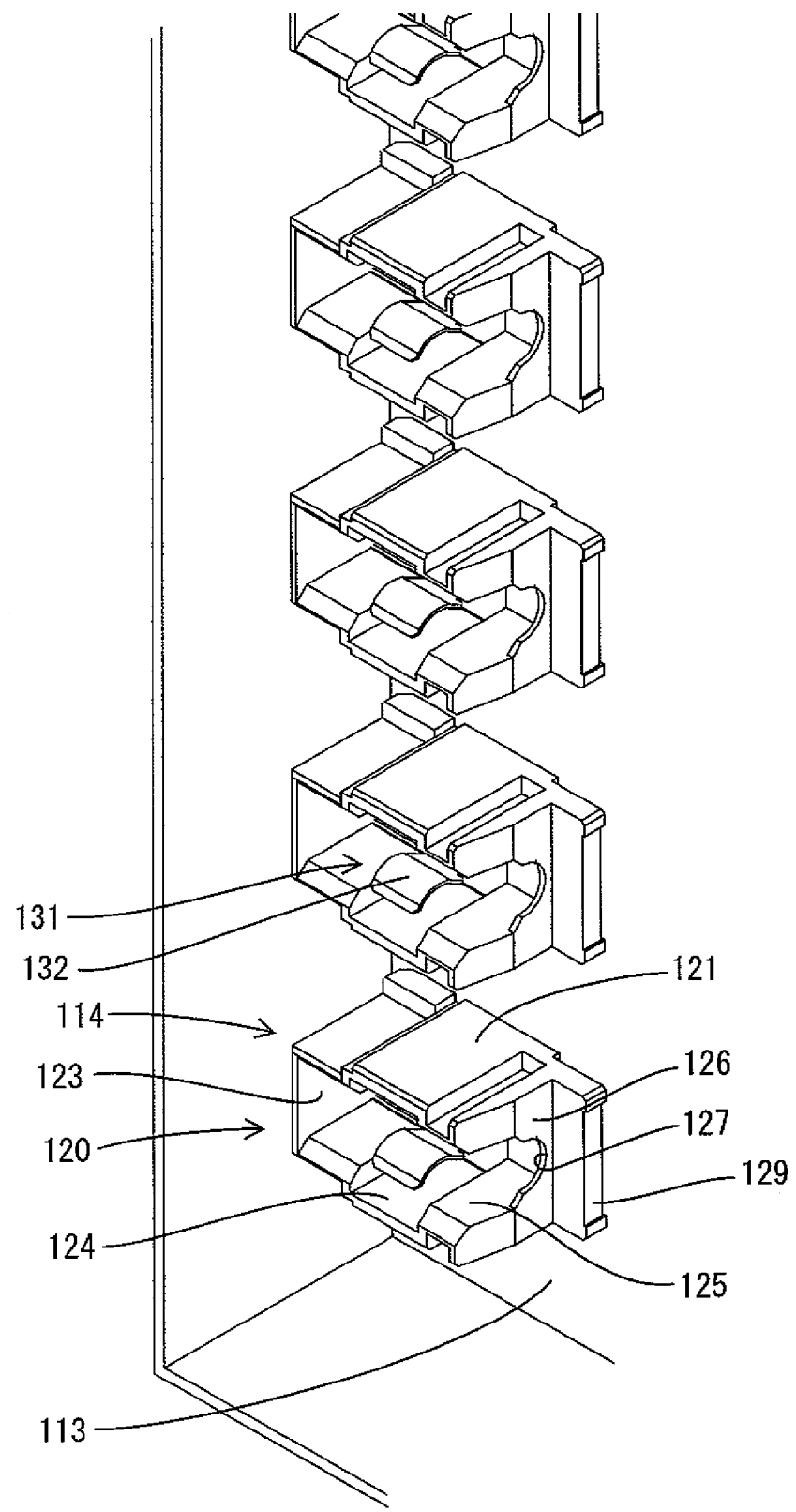
FIG. 26 is a perspective view of relay connectors.
Figure 27:
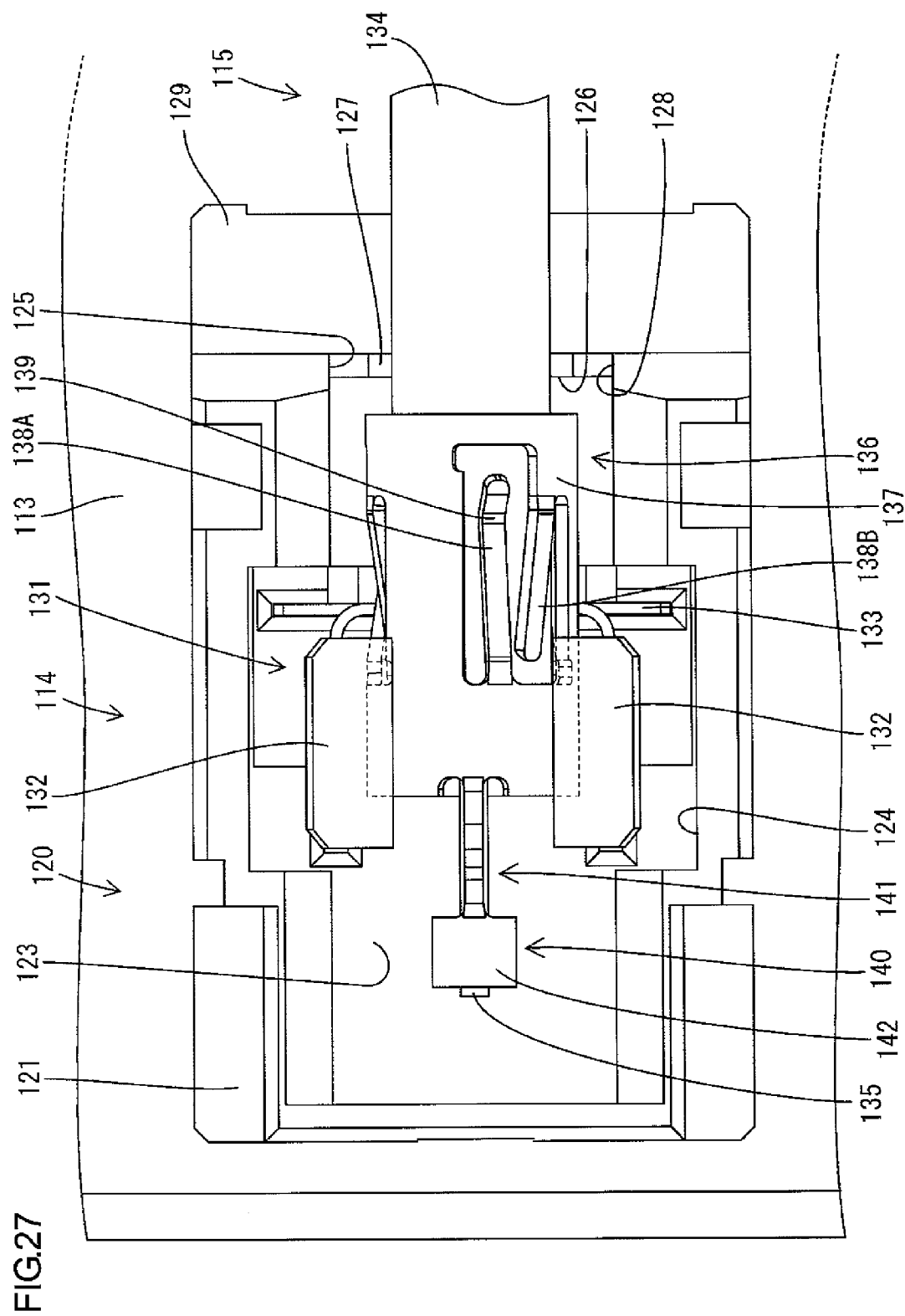
FIG. 27 is a partially-enlarged front view showing a connecting structure between a relay connector and a discharge tube.
Figure 28:
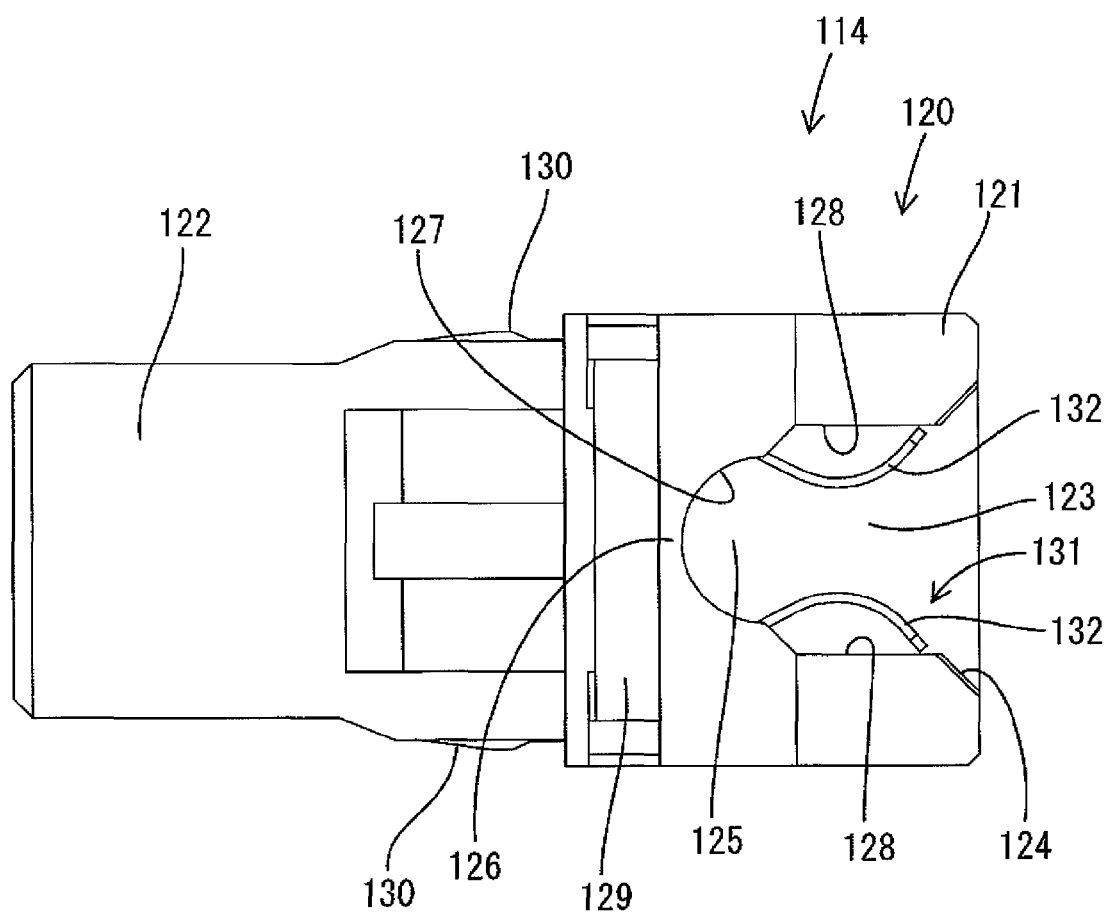
FIG. 28 is a side view of a relay connector.
Figure 35:
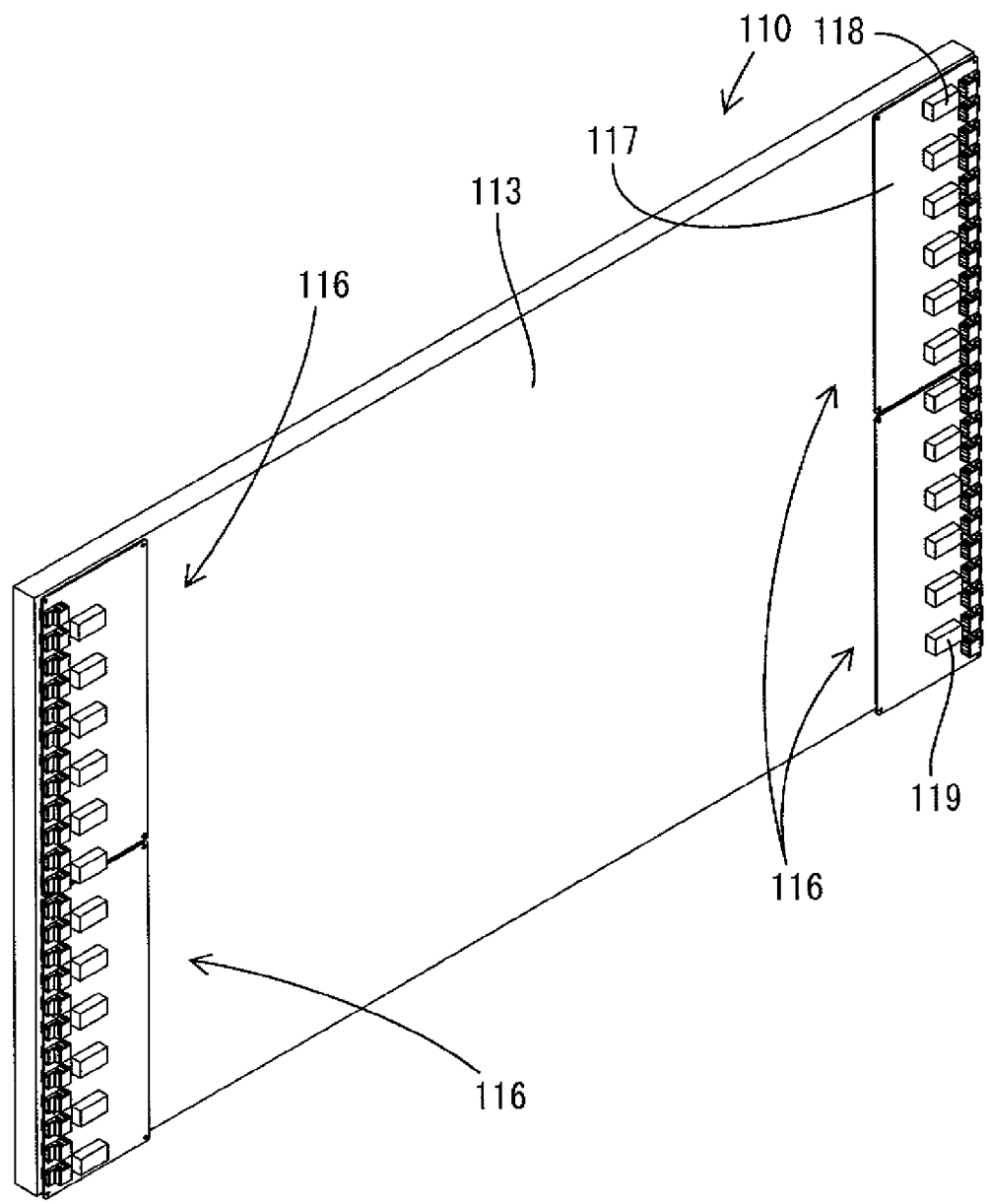
FIG. 35 is a rear perspective view of the lighting device.

The lighting device 110 includes a lamp unit 112 and power boards 116, as shown in FIGS. 24, 25 and 35. The lamp unit 112 includes a metallic chassis 113, which preferably has a substantially horizontally-elongated rectangular plate shape and functions as a reflector plate. Further included are a plurality of discharge tubes 115 held in a horizontal position and vertically arranged on the front side of the chassis 113 so as to be parallel or substantially parallel to one another, and a plurality of relay connectors 114 which are vertically arranged along the lateral edges of the chassis 113 so as to correspond to the discharge tubes 115. The power boards 116 are disposed on the back side of the chassis 113 so as to supply power to the discharge tubes 115 via the relay connectors 114.

Figure 29:
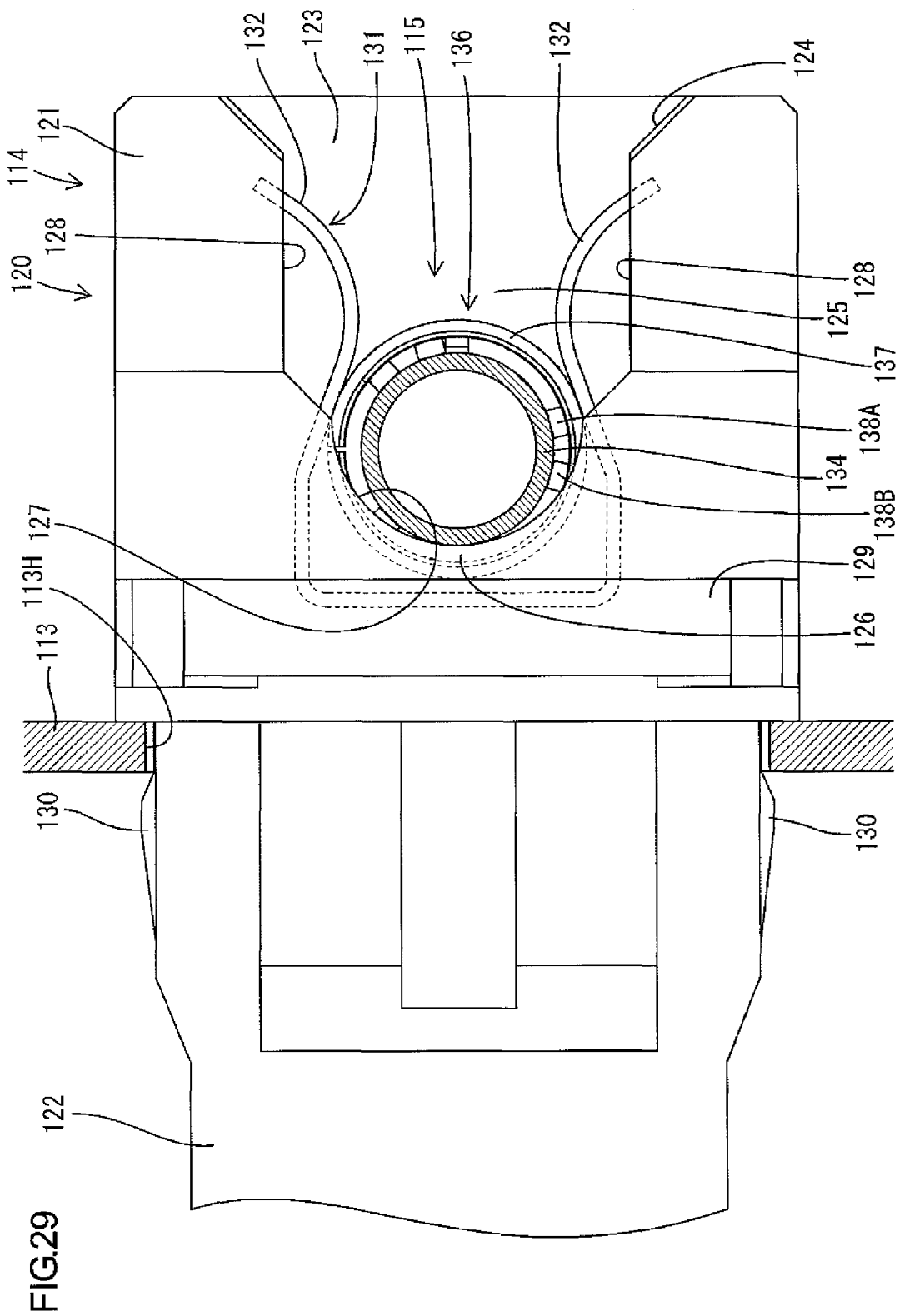
FIG. 29 is a sectional view showing that a ferrule on a discharge tube is capable of engaging with a stopper.
Figure 30:
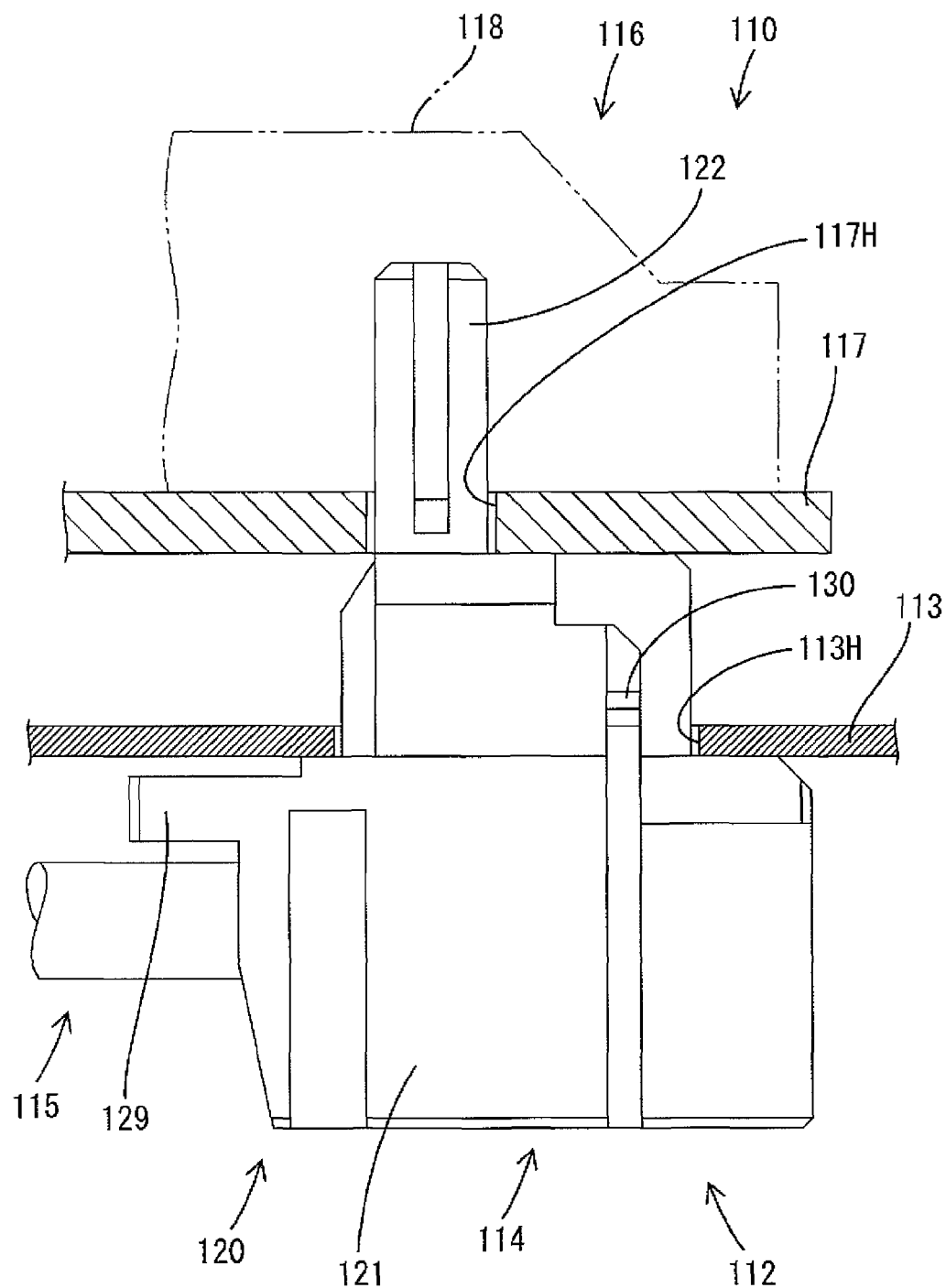
FIG. 30 is a sectional view showing a connecting structure between a relay connector and a power board.

As shown in FIGS. 29 and 30, a plurality of substantially rectangular mounting holes 113H corresponding to the ends of the discharge tubes 115 are formed through the chassis 113 so as to extend from the front side to the back side, and are vertically arranged to be level with the respective discharge tubes 115. The relay connectors 114 are mounted through the respective mounting holes 113H.

Relay Connector 114

As shown in FIGS. 26 to 30, each relay connector 114 includes a holder 120 preferably made of synthetic resin, and a relay terminal 131 that is housed in the holder 120 and preferably made of metal (e.g., stainless steel).

The holder 120 includes a box-shaped portion 121 that forms a block-shaped configuration as a whole, and further includes a wall portion 122 that projects backward from the back surface of the box-shaped portion 121.

A container room 123 is formed in the box-shaped portion 121, so as to have an opening extending from the front side to the lateral side (i.e., the lateral side on the opposite side of the lateral edge portion of the chassis 113). The front opening portion of the opening of the container room 123 is provided as a receiving opening 124, into which an end portion (or ferrule 136) of the discharge tube 115 is fitted from the front side. The lateral opening portion is provided as an escape opening 125 for preventing interference with the glass tube 134 when the end portion of the discharge tube 115 is held in the container room 123. A stopper 126 is formed on the escape opening 125, so as to bulge inward from the opening edge and form a plate-shaped configuration. Due to the stopper 126, the escape opening 125 is narrowed so as to form a substantially U-shaped opening. The vertical size of the substantially U-shaped escape opening 125 is preferably smaller than the inner diameter of the body 137 of the ferrule 136 and be equal to or slightly larger than the outer diameter of the glass tube 134 of the discharge tube 115. On the escape opening 125, a concave portion 127 having a semicircular shape is formed on the far end portion of the opening edge. The radius of curvature of the concave portion 127 is set to be equal to or slightly larger than the radius of curvature of the outer circumference of the glass tube 134. On the escape opening 125, a pair of upper and lower guiding portions 128 are formed on areas of the opening edge on the front side of the concave portion 127.

On the box-shaped portion 121, an extended portion 129 extending parallel or substantially parallel to the chassis 113 is formed on the lateral surface of the box-shaped portion 121 that includes the escape opening 125. The extended portion 129 extends so as to separate the front surface of the chassis 113 from the escape opening 125. A pair of upper and lower retaining protrusions 130 are formed on the outer surface (i.e., upper surface and lower surface) of the box-shaped portion 121.

The relay terminal 131 is held within the holder 120. The relay terminal 131 can be formed by bending a metallic plate that is formed into a predetermined shape by punching, for example. The relay terminal 131 includes a pair of vertically symmetrical elastic pressing portions 132 formed of curved plates, and further includes a board connecting portion 133 formed as a flat plate-shaped portion that projects to the back side. The pair of elastic pressing portions 132, which are housed in the container room 123, can deflect elastically and vertically so as to increase distance therebetween. The vertical distance between the elastic pressing portions 132 is shortest at a position corresponding to the front side of the concave portion 127 of the stopper 126. The minimum distance between the elastic pressing portions 132, when the elastic pressing portions 132 are not forced into elastic deflection or are in a free state, is set to be smaller than the outer diameter of the body 137 of the ferrule 136 attached on the discharge tube 115. On the other hand, the board connecting portion 133 projects from the back surface of the box-shaped portion 121 so as to be exposed to the outside of the holder 120, and extends backwards along the wall portion 122.

When the relay connector 114 is mounted to the chassis 113, the wall portion 122 of the holder 120 is inserted into a mounting hole 113H from the front side of the chassis 113. Thereby, the outer surface of the box-shaped portion 121 comes in contact with the opening edge of the mounting hole 113H on the front surface of the chassis 113, while the retaining protrusions 130 are locked by the opening edge of the mounting hole 113H on the back surface of the chassis 113. Thus, the chassis 113 is sandwiched between the outer surface of the box-shaped portion 121 on the front side and the retaining protrusions 130 on the back side. Thereby, the holder 120 is fixed to the chassis 113 so that its movement in the mounting direction (i.e., the through direction of the mounting hole 113H) is restricted. Then, the mounting of the relay connector 114 to the chassis 113 is completed. When the relay connector 114 is attached to the chassis 113, the box-shaped portion 121 as the front end portion of the holder 120 projects (or is exposed) to the front side of the chassis 113 while the wall portion 122 as the back end portion of the holder 120 projects (or is exposed) to the back side of the chassis 113.

Discharge Tube 115

Figure 31:
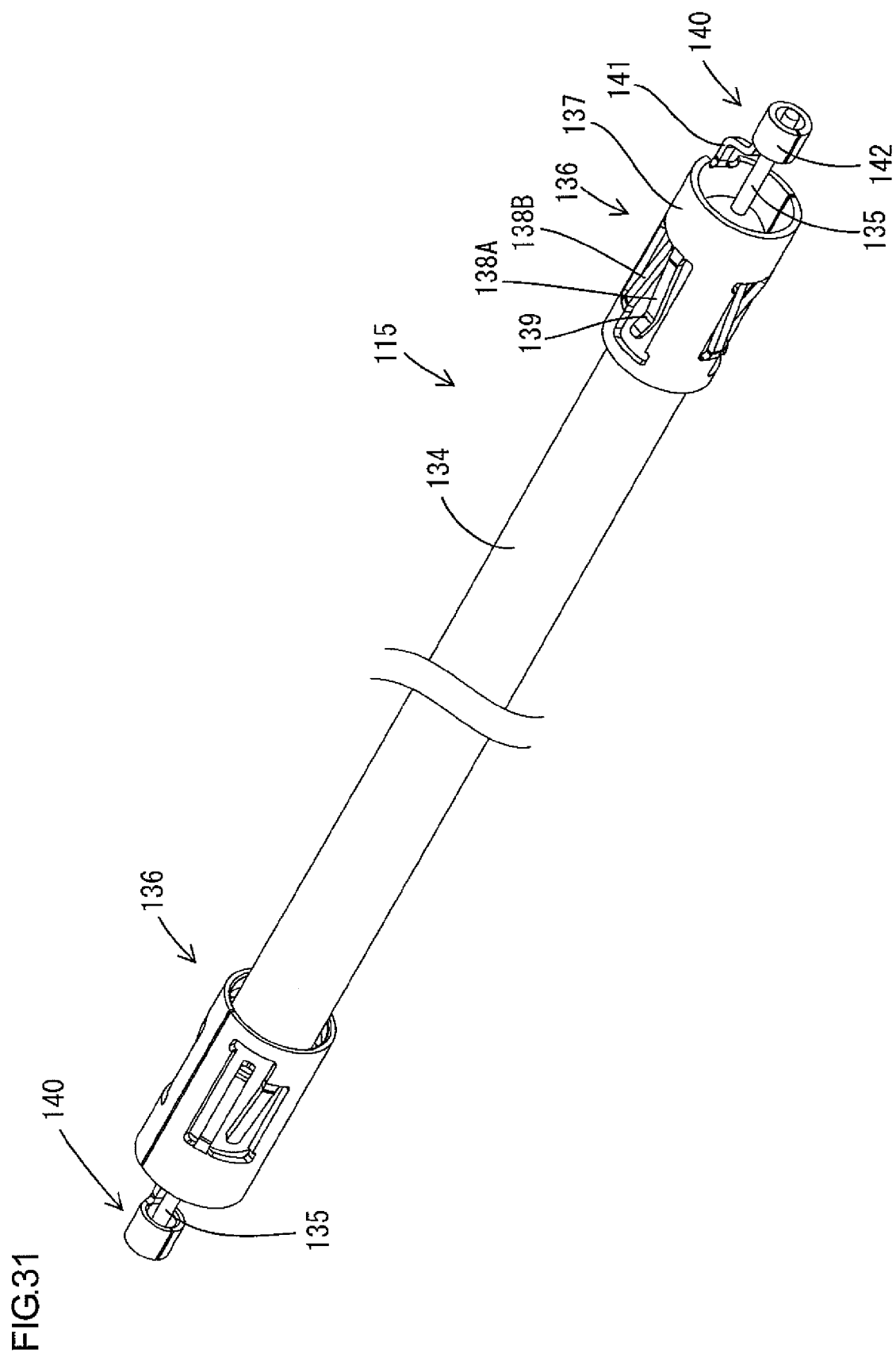
FIG. 31 is a perspective view of a discharge tube.

Referring to FIG. 31, each discharge tube 115 is formed of a cold cathode fluorescent tube that includes a generally elongated straight glass tube 134 having a circular cross section, and elongated metallic (e.g., nickel or cobalt metal) outer leads 135 which have a circular cross section and project linearly from the respective ends of the glass tube 134 and coaxially with the glass tube 134. Further included are ferrules 136 attached to the respective end portions of the glass tube 134. Mercury is encapsulated in the glass tube 134. Each end portion of the glass tube 134 is melted into a substantially hemispherical shape by heat, and thereby forms a domed portion. The outer lead 135 penetrates the domed portion.

Figure 32:
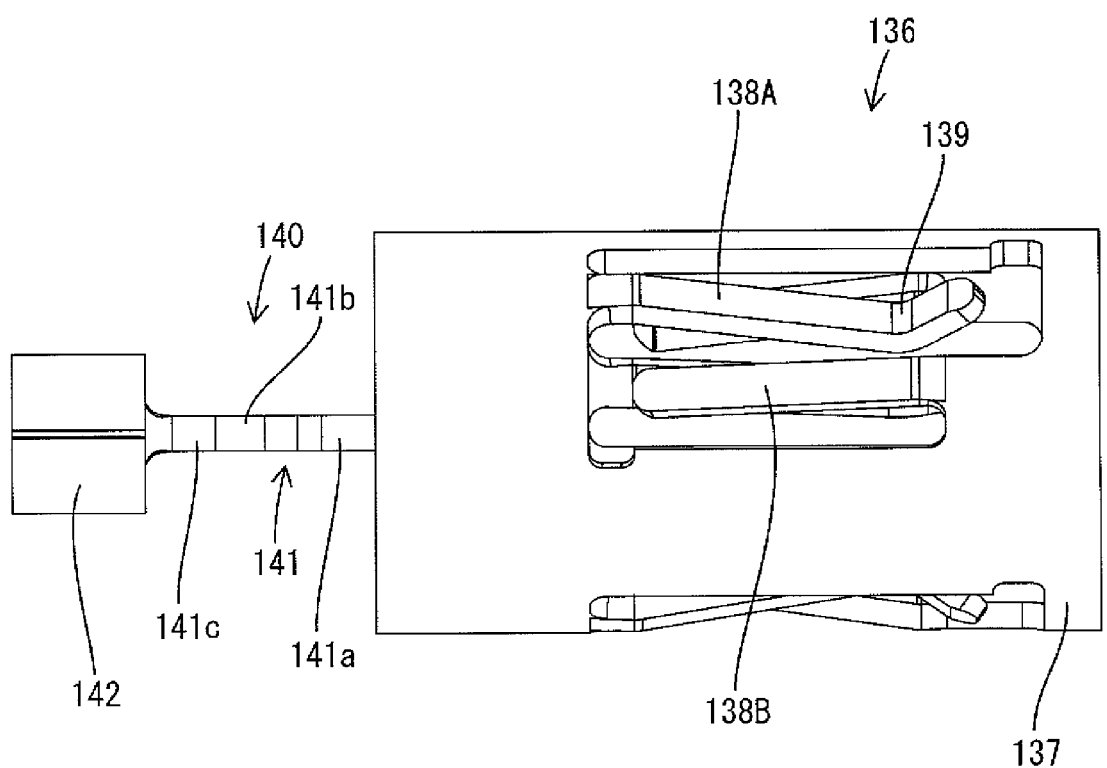
FIG. 32 is a rear view of a ferrule.
Figure 33:
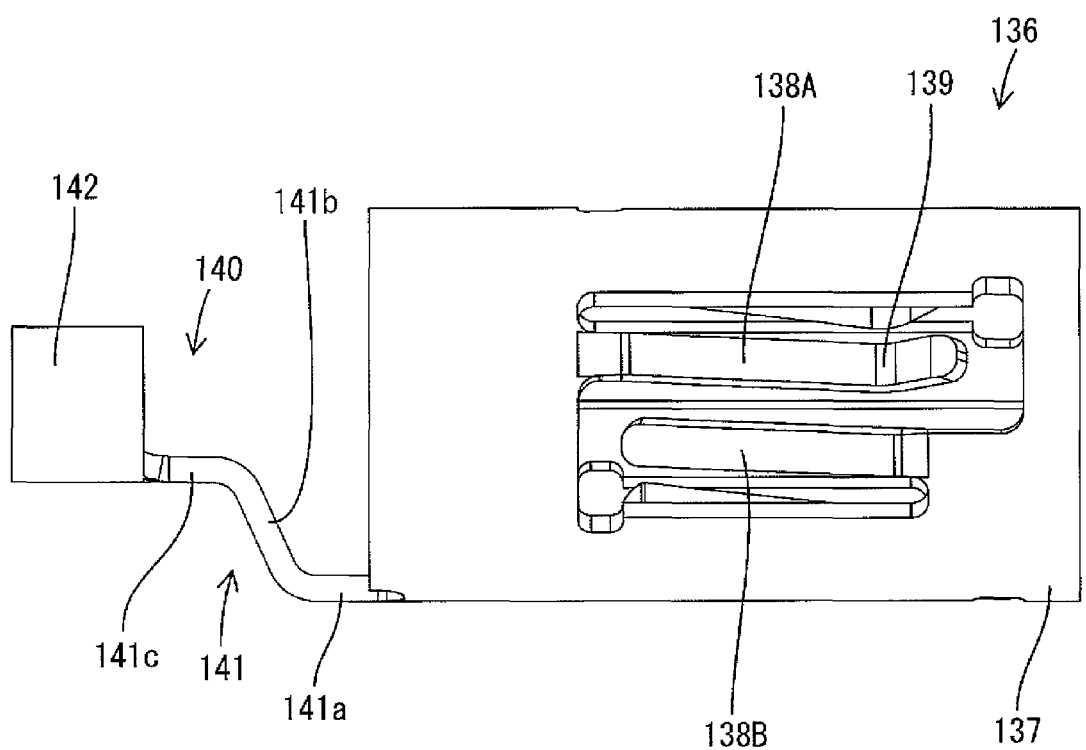
FIG. 33 is a plan view of the ferrule.
Figure 34:
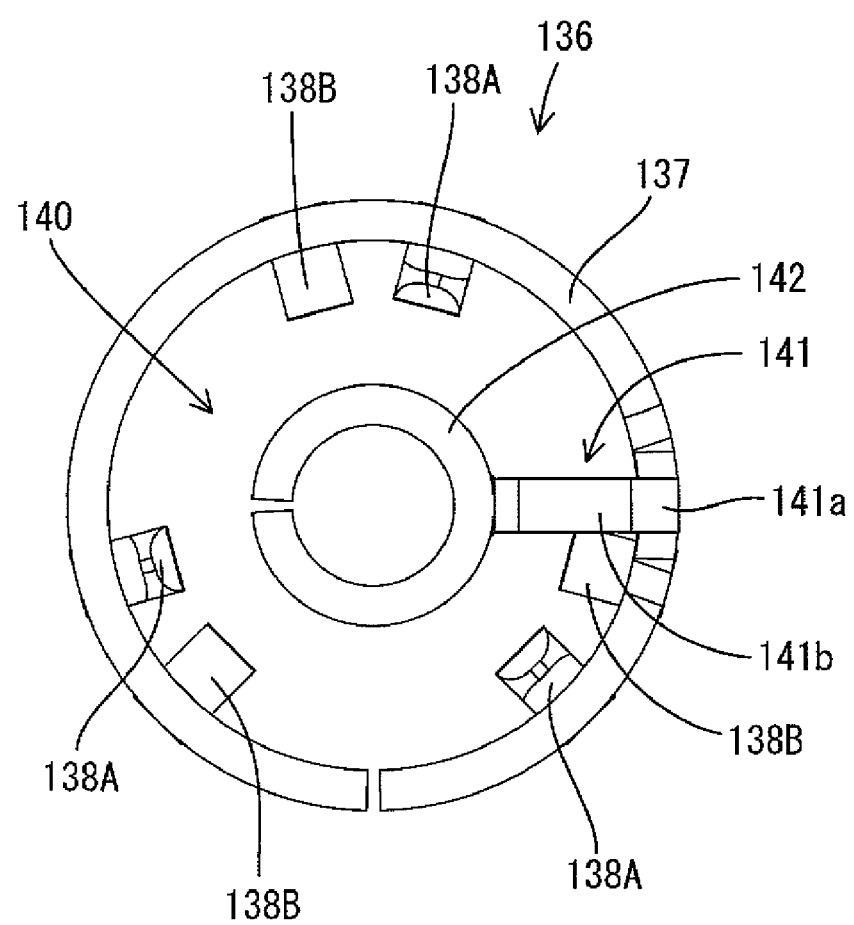
FIG. 34 is a side view of the ferrule.

Each ferrule 136 preferably is a single-piece component, which can be formed by bending or hammering a metallic (e.g., stainless steel) plate that is formed into a predetermined shape by punching, for example. As shown in FIGS. 32 to 34, the ferrule 136 includes a body 137 and a conductive portion 140. The body 137 preferably has a substantially cylindrical shape concentric with the glass tube 134. The inner diameter of the body 137 is preferably slightly larger than the outer diameter of the glass tube 134.

Three pairs of elastic gripping portions 138A, 138B are formed on the body 137 preferably by making slit-shaped cuts in portions thereof, which are arranged at even angular intervals along the circumferential direction.

A first elastic gripping portion 138A, i.e., one of a pair of elastic gripping portions 138A, 138B, is generally formed as a cantilevered portion extending posteriorly (specifically, in an oblique direction slightly leaning radially inwardly), which is capable of elastic and radial deflection with a supported point on its proximal end (or anterior end). A curved portion 139 is formed on the distal end portion (or posterior end portion) of the first elastic gripping portion 138A, so as to curve in an oblique direction leaning radially outwardly. The outer surface of the curve (or inwardly facing surface) of the curved portion 139 is provided as a contact point when abutting on the outer circumferential surface of the glass tube 134. The imaginary line that connects the contact points provided on the three first elastic gripping portions 138A forms a circle concentric with the body 137. The diameter of the imaginary circle, when the first elastic gripping portions 138A are not forced into elastic deflection or are in a free state, is set to be smaller than the outer diameter of the glass tube 134.

A second elastic gripping portion 138B, i.e., the other of the pair of elastic gripping portions 138A, 138B, is arranged circumferentially adjacent to the first elastic gripping portion 138A, and is generally formed as a cantilevered portion extending anteriorly or reversely from the first elastic gripping portion 138A (specifically, in an oblique direction slightly leaning radially inwardly), which is capable of elastic and radial deflection with a supported point on its proximal end (or posterior end). The distal end of the second elastic gripping portion 138B is provided as a contact point when abutting on the outer circumferential surface of the glass tube 134. The imaginary line that connects the contact points provided on the three second elastic gripping portions 138B forms a circle concentric with the body 137. The diameter of the imaginary circle, when the second elastic gripping portions 138B are not forced into elastic deflection or are in a free state, is preferably smaller than the outer diameter of the glass tube 134.

On the body 137, a pair of protector portions are formed as cantilevered portions protruding anteriorly from the anterior end edge thereof. The pair of protector portions are arranged circumferentially spaced apart, and extend linearly from the body 137 so as to be flush therewith. The conductive portion 140 is provided as a cantilevered portion that extends anteriorly from between the pair of protector portions. The conductive portion 140 includes a long portion 141 continuous with the anterior end of the body 137, and a cylindrical portion 142 that further projects anteriorly from the anterior end (or distal end) of the long portion 141.

The long portion 141 includes a proximal portion 141a that extends from the body 137 so as to be flush with the body 137 and parallel or substantially parallel to the axis thereof, and further includes an intermediate portion 141b that extends radially inwardly from the distal end of the proximal portion 141a toward the axis of the body 137. Further included is a distal portion 141c that extends from the distal end of the intermediate portion 141b and parallel or substantially parallel to the axis of the body 137. The cylindrical portion 142 is connected to the distal end of the distal portion 141c. The width of the long portion 141 is set to be sufficiently small for the length of the long portion 141. Therefore, the long portion 141 is capable of elastic deformation in the radial direction of the body 137, elastic deformation in a direction intersecting with the radial direction (and intersecting with the longitudinal direction of the long portion 141), and elastic torsional deformation around the long portion 141 itself as the axis.

The cylindrical portion 142, which can be formed by bending a portion laterally extending from the distal end of the long portion 141 into a cylindrical shape, is arranged substantially coaxially with the body 137. The cylindrical portion 142 is capable of displacement around the axis of the ferrule 136 and radial displacement, due to elastic deflection of the long portion 141.

Attachment of Ferrule 136 to Glass Tube 134

Next, an assembling process for attaching a ferrule 136 to a glass tube 134 will be explained.

During the assembling process, while a ferrule 136 and a glass tube 134 are held by respective holding devices (not shown), the ferrule 136 and the glass tube 134 are moved relatively and coaxially so as to approach each other. Thereby, the body 137 is fitted onto the glass tube 134. When the body 137 begins engagement, the contact points provided on the distal end portions of the three pairs of elastic gripping portions 138A, 138B have elastic contact with the outer circumference of the glass tube 134. The contact points slide on the outer circumferential surface of the glass tube 134, as the assembling process proceeds. Then, the tip of the outer lead 135 having passed through the body 137 begins to enter the hollow of the cylindrical portion 142. When both of the holding devices have thereafter reached predetermined final positions, the ferrule 136 and the glass tube 134 are axially positioned in proper positions, resulting in the tip end portion of the outer lead 135 circumferentially surrounded by the cylindrical portion 142. At that time, the tip end portion of the outer lead 135 will not greatly protrude from the anterior end of the cylindrical portion 142. That is, it slightly protrudes out of the cylindrical portion 142, or is aligned with the anterior end of the cylindrical portion 142, or alternatively it is located within the cylindrical portion 142.

Thereafter, the cylindrical portion 142 is clamped so as to deform with diameter reduction. After being clamped, the cylindrical portion 142 is electrically conductively fixed to the outer lead 135 by welding, and consequently the ferrule 136 is integrated with the glass tube 134. Then, the assembling process terminates, and the discharge tube 115 is completed.

When the ferrule 136 is attached to the glass tube 134, the body 137 is concentrically held on the glass tube 134 due to the elastic holding function of the three pairs of elastic gripping portions 138A, 138B. A gap (airspace) is secured between the outer circumference of the glass tube 134 and the inner circumference of the body 137, so as to extend over the substantially entire circumference.

Figure 43:
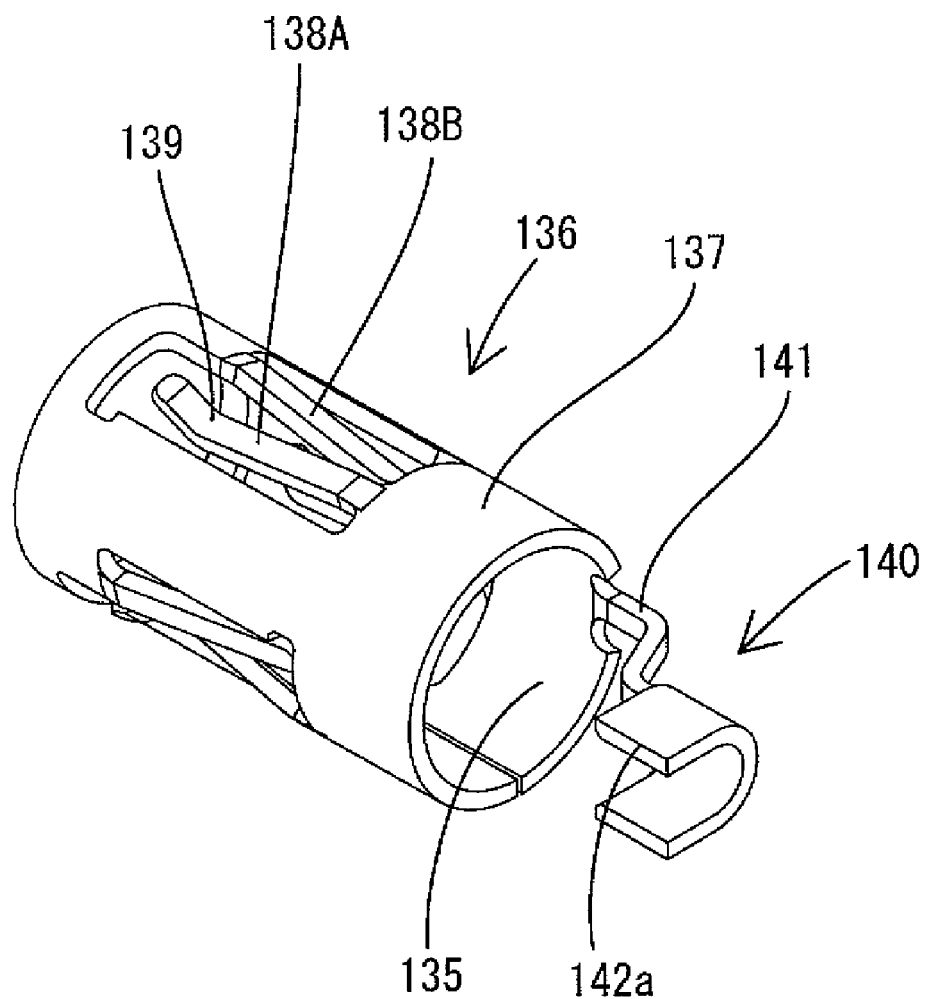
FIG. 43 is a perspective view showing a modification of a ferrule.
Figure 44:
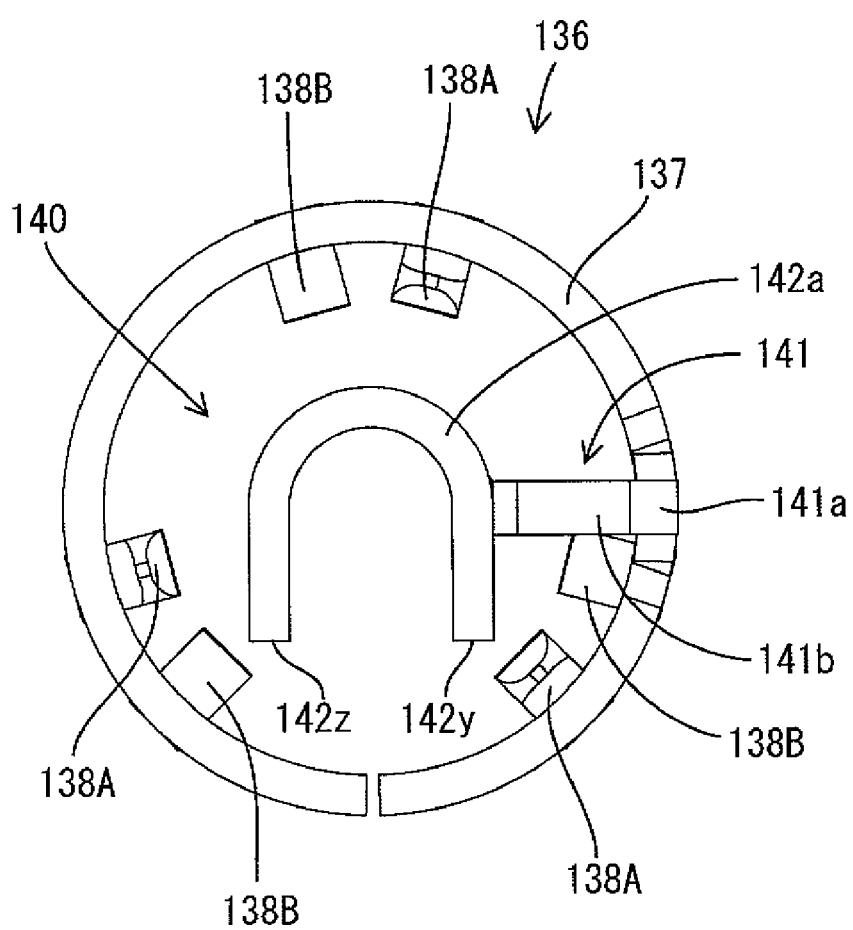
FIG. 44 is a side view of FIG. 43.

Instead of the cylindrical portion 142, a U-shaped connecting portion 142a may be provided as shown in FIGS. 43 and 44. In this case, after a glass tube 134 is fitted into a ferrule 136, the U-shaped connecting portion 142a is bended so as to hug the outer lead 135, in order to achieve electrical connection between the outer lead 135 and the connecting portion 142a. According to the present preferred embodiment thus including the bendable U-shaped connecting portion 142a, electrical connectivity with the outer lead 135 can be further improved.

Mounting of Discharge Tube 115 to Relay Connectors 114

The discharge tube 115, thus assembled, is fixed to relay connectors 114. At the time of fixation, the discharge tube 115 held in a horizontal position is moved toward the front surface of the chassis 113, and the end portions and the ferrules 136 of the glass tube 134 are fitted into the container rooms 123 of the relay connectors 114 from the front side. At that time, the pair of elastic pressing portions 132 are pushed by the body 137 of the ferrule 136 so as to open vertically due to elastic deflection. After the body 137 has passed through the shortest-distance portions of the elastic pressing portions 132, the body 137 is pulled deep into the container room 123 due to elastic restoring forces of the elastic pressing portions 132, resulting in the body 137 abutting on the bottom of the container room 123. Then, the mounting of the discharge tube 115 is completed.

The discharge tube 115 thus mounted is held by the pairs of elastic pressing portions 132 at its end portions, and thereby is fixed to the chassis 113 via the relay terminals 131 and the holders 120 provided as the relay terminal 131 mounting bases. At that time, the weight of the discharge tube 115 is received solely by the chassis 113 via the relay connectors 114. That is, the outer leads 135 will not be under load due to the weight of the discharge tube 115.

The pair of elastic pressing portions 132 can have elastic contact with the outer circumferential surface of the body 137, and thereby the outer lead 135 is electrically conductively connected to the relay terminal 131 via the ferrule 136. Further, the glass tube 134 is held due to elastic restoring forces of the pair of elastic pressing portions 132, so as to be pressed against the concave portion 127 of the stopper 126. Therefore, when viewed along the axial direction of the discharge tube 115, the body 137 appears to be positioned so as to partially overlap with the stopper 126. That is, the end edge of the body 137 on the opposite side of the conductive portion 140 is axially positioned in proximity to the stopper 126 so as to be partially faced therewith.

The extended portion 129 is formed on the outer surface of the holder 120, which is perpendicular to the surface of the chassis 113 and includes the escape opening 125 of the container room 123, so as to protrude from between the chassis 113 and the escape opening 125 and extend along the surface of the chassis 113. This results in a long creepage distance from the inside of the container room 123 to the front surface of the chassis 113. Thereby, a leak, from the discharge tube 115 held in the container room 123 to the chassis 113 outside the holder 120, can be prevented.

Overview of Power Board 116

Each power board 116 includes a circuit board 117 having a circuit formed on its back surface (i.e., the surface on the opposite side of the chassis 113), electronic components 119 mounted on the back surface of the circuit board 117, and a plurality of on-board connectors 118 mounted on the back surface of the circuit board 117.

The circuit board 117 preferably has a vertically-elongated rectangular shape as a whole, and is formed using a phenolic paper-base copper-clad laminated board (known as a phenolic paper). A plurality of fitting holes 117H having a vertically-elongated rectangular shape are formed through the circuit board 117 so as to extend from the front side to the back side. The plurality of fitting holes 117H are arranged vertically along the lateral side edge of the circuit board 117 so as to correspond to the above-described relay terminals 131 (or relay connectors 114). Each on-board connector 118 includes a housing made of synthetic resin, and an output terminal (not shown) that is completely contained in the housing and made of metal (e.g., nickel silver). The on-board connectors 118 are arranged along the lateral side edge of the circuit board 117 so as to correspond to the respective fitting holes 117H. A fitting space (not shown) is provided on the outer surface of the housing so as to correspond to the fitting hole 117H, and the output terminal is partly exposed to the fitting space.

While the circuit board 117 is kept parallel or substantially parallel to the chassis 113, the power board 116 is moved toward the chassis 113 from the back side and is fixed thereto. At the time of fixation, the wall portions 122 of the relay connectors 114 and the board connecting portions 133 arranged along the wall portions 122 penetrate the circuit board 117 through the fitting holes 117H and are inserted into the fitting spaces of the on-board connectors 118. Thereby, the on-board connectors 118 are fitted onto the relay connectors 114, and the output terminals are conductively connected to the relay terminals 131.

Operational Effects of Preferred Embodiment 3

In preferred embodiment 3, when a discharge tube 115 is supported on relay connectors 114, the stoppers 126 lock the ferrules 136. Therefore, the discharge tube 115 is secure from axial movement relative to the relay connectors 114. That is, if a force is applied to the discharge tube 115 so as to cause movement to the right, the stopper 126 catches the left-adjacent ferrule 136 attached on the left end portion of the discharge tube 115 so that the movement of the discharge tube 115 to the right is restricted. If a force is applied to the discharge tube 115 so as to cause movement to the left, the stopper 126 catches the right-adjacent ferrule 136 attached on the right end portion of the discharge tube 115 so that the movement of the discharge tube 115 to the left is restricted. Thus, the axial movement of the discharge tube 115 to either right or left is restricted, and therefore the tip of the outer lead 135 is prevented from hitting the wall of the container room 123 on the opposite side of the escape opening 125.

The stopper 126 can engage with and lock the end edge of the ferrule 136, and therefore a hole that can engage with the stopper 126 is not required to be formed on the outer circumference of the ferrule 136. As a result, processing cost can be reduced, and reduction in strength of the ferrule 136 can be prevented.

In the case of a construction in which a stopper 126 can engage with the end edge of a ferrule 136 on the side of the conductive portion 140, the conductive portion 140 extending from the end edge of the ferrule 136 may preclude the end edge of the ferrule 136 from engaging with the stopper 126, when the ferrule 136 is attached at some angle about its axis. However, in preferred embodiment 3, the stopper 126 is arranged to engage with the end edge on the opposite side of the conductive portion 140. Therefore, the conductive portion 140 will not preclude the ferrule 136 from engaging with the stopper 126, and consequently the ferrule 136 can infallibly engage with the stopper 126.

The conductive portion 140 includes a cylindrical portion 142, which can be circumferentially connected to the outer lead 135 so as to surround it. Thereby, the conductive portion 140 can be prevented from disengaging from the outer lead 135. That is, the cylindrical portion 142 will not disengage from the outer lead 135 when the cylindrical portion 142 is clamped. Therefore, the conductive portion 140 can be infallibly connected to the outer lead 135.

The margin for engagement of a ferrule 136 with a stopper 126 corresponds to half of the dimensional difference between the outer diameters of the glass tube 134 and the ferrule 136. In preferred embodiment 3, ferrules 136 are concentrically held on a glass tube 134 due to the elastic gripping portions 138A, 138B. Therefore, if the ferrule 136 is set to be large, a large dimensional difference can be secured between the inner diameter thereof and the outer diameter of the glass tube 134. Thereby, the margin for engagement of the ferrule 136 with the stopper 126 can be increased, resulting in reliable restriction of movement of the discharge tube 115.

The concave portion 127 is formed on a stopper 126, so as to abut on the outer circumference of a glass tube 134 when the ferrule 136 engages with the stopper 126. Further, the pair of elastic pressing portions 132 capable of pressing the discharge tube 115 toward the concave portion 127 side are provided in the relay connector 114. Specifically, the pair of elastic pressing portions 132 press the discharge tube 115 toward the concave portion 127 side, obliquely from above and obliquely from below, i.e., vertically symmetrically. Thereby, the glass tube 134 is prevented from disengaging from the concave portion 127, and therefore the engagement of the ferrule 136 with the stopper 126 can be reliably maintained.

The relay connector 114 is formed by mounting a relay terminal 131 in a holder 120 made of synthetic resin. In preferred embodiment 3, the stopper 126 is formed on the synthetic-resin holder 120. That is, a stopper is not required to be formed on the relay terminal 131, and therefore the material for manufacturing the relay terminals 131 can be reduced. Considering that the material cost for synthetic resin is generally lower than that for metal, the material cost for relay connectors 114 can be reduced according to preferred embodiment 3.

Preferred Embodiment 4

Next, preferred embodiment 4 of the present invention will be explained with reference to FIGS. 36 to 42. In preferred embodiment 4, the constructions of devices for supporting a discharge tube 115 differ from those of preferred embodiment 3. The other constructions are similar to preferred embodiment 3. Therefore, the same constructions are designated by the same symbols, and explanations for the constructions, operations and effects thereof are omitted.

Overview of Grounding Member 150

Figure 36:
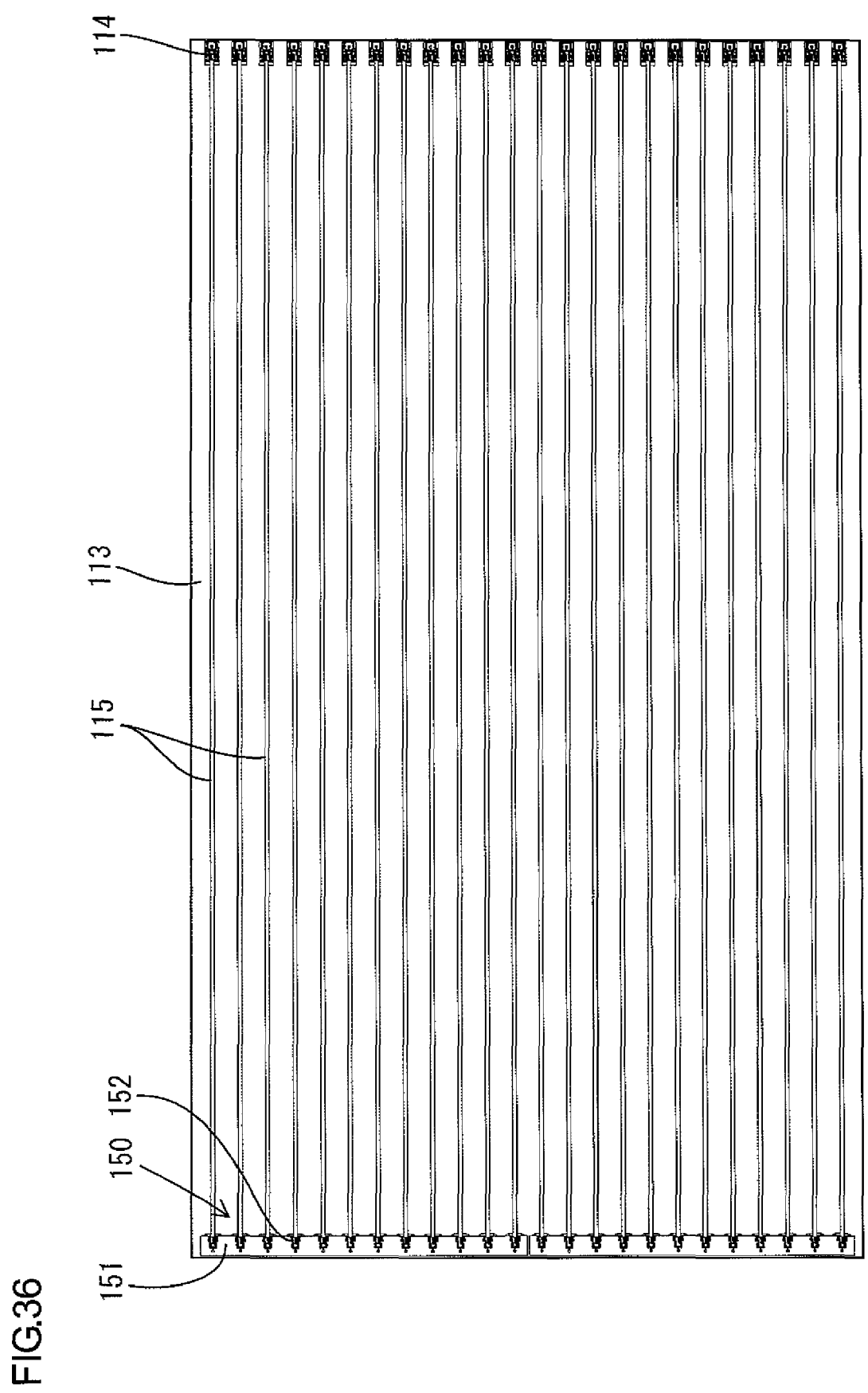
FIG. 36 is a front view of a lighting device according to preferred embodiment 4 of the present invention.
Figure 37:
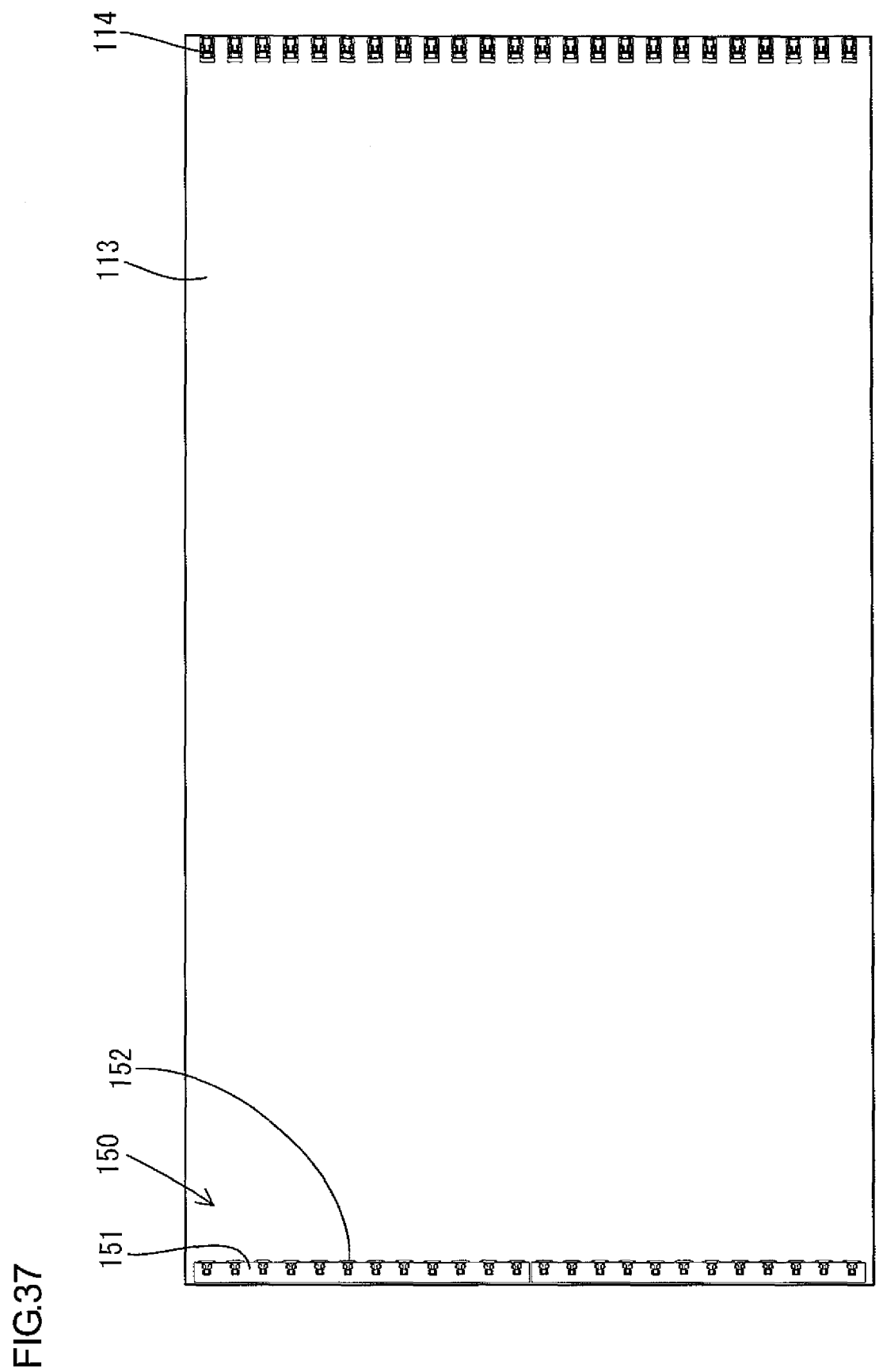
FIG. 37 is a front view of the lighting device, from which discharge tubes are detached.
Figure 38:
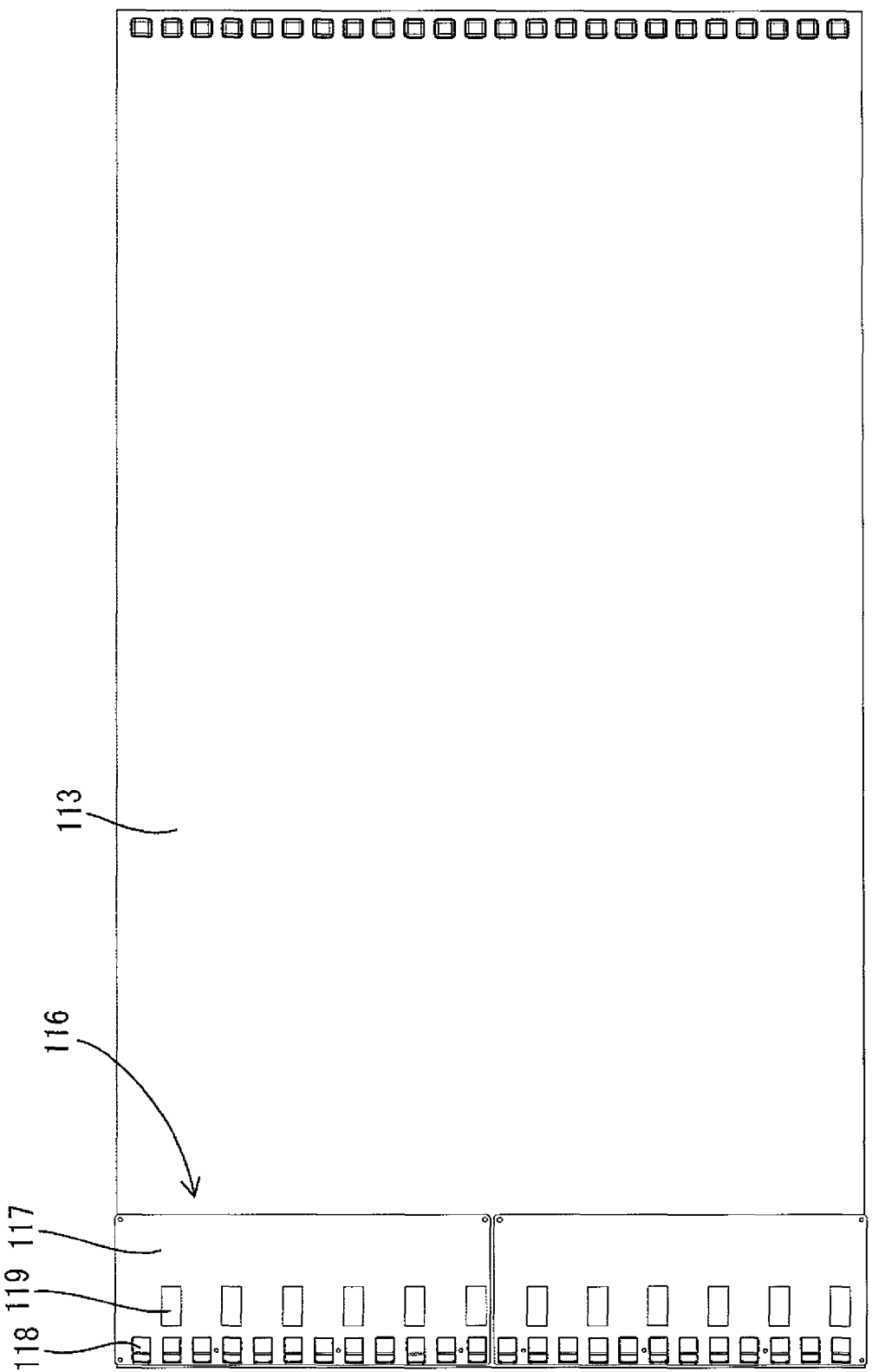
FIG. 38 is a rear view of the lighting device.

In preferred embodiment 3, the end portions of a discharge tube 115 are supported by relay connectors 114, each of which includes a holder 120 and a relay terminal 131. In preferred embodiment 4, as shown in FIGS. 36 to 38, one of the end portions of a discharge tube 115 is supported by the same relay connector 114 as preferred embodiment 3, while the other end portion of the discharge tube 115 is supported by a grounding member 150.

Figure 39:
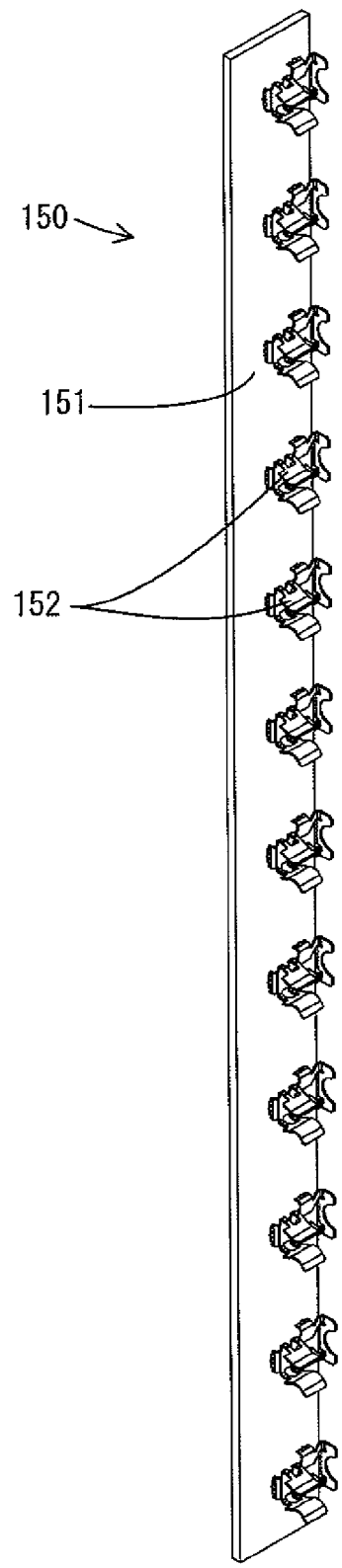
FIG. 39 is a perspective view of a grounding member.
Figure 41:
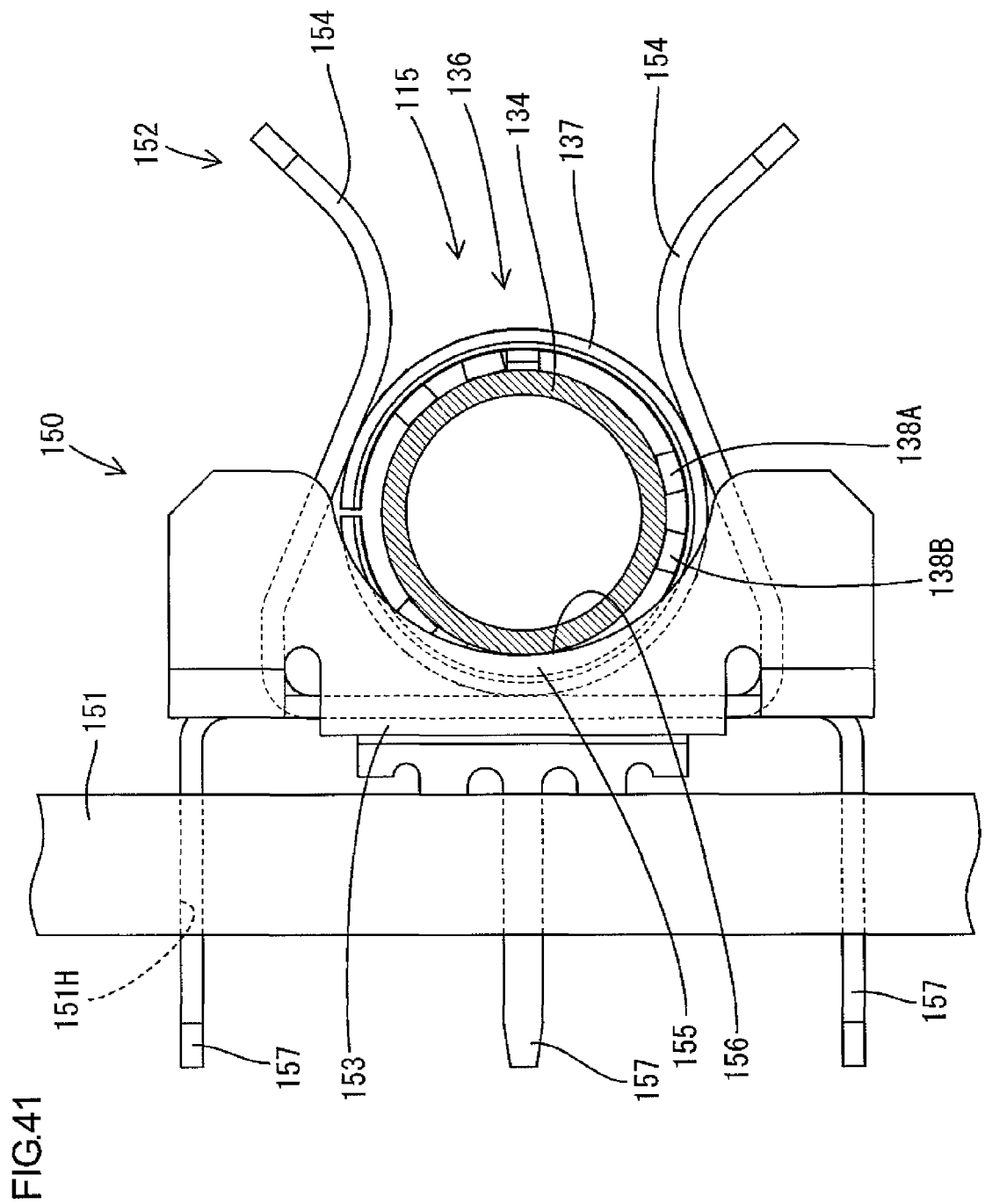
FIG. 41 is a sectional view showing that a ferrule on a discharge tube is capable of engaging with a stopper.

As shown in FIG. 39, the grounding member 150 includes an elongated support plate 151 fixed to the chassis 113 so as to be along one of the lateral edge portions thereof, and further includes a plurality of grounding terminals 152 conductively mounted on the front surface of the support plate 151. As shown in FIG. 41, mounting holes 151H are formed through the support plate 151 so as to correspond three-to-one with the grounding terminals 152. The support plate 151 is formed of a substrate or a metallic plate.

Figure 40:
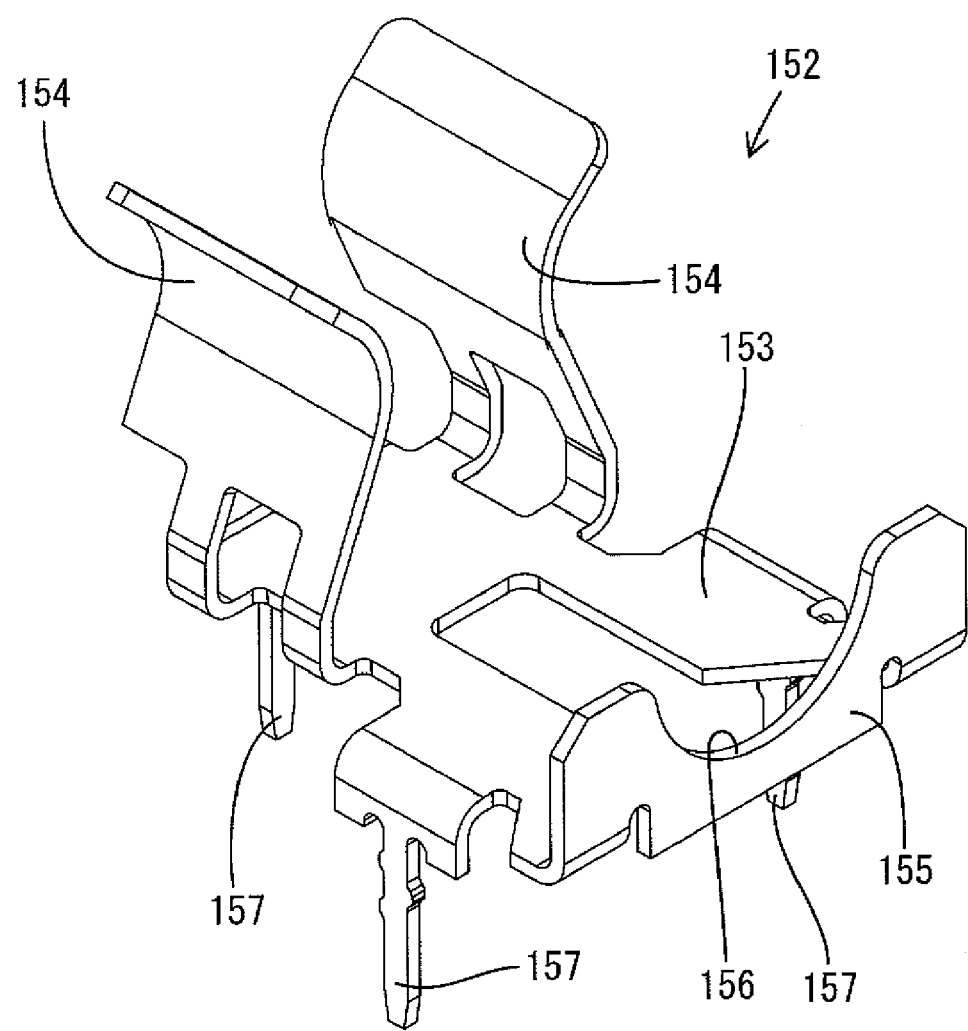
FIG. 40 is a perspective view of a grounding terminal.

On the other hand, as shown in FIG. 40, each grounding terminal 152, which can be formed by bending a metallic (e.g., nickel silver) plate that is formed into a predetermined shape by punching, includes a base portion 153 and a pair of elastic pressing portions 154 which extend vertically symmetrically from the respective upper and lower edge portions of the base portion 153 to the front side. Further included is a stopper 155 that extends from one of the lateral edge portions of the base portion 153 to the front side.

The pair of elastic pressing portions 154 are provided on the lateral edge portion on the opposite side of the stopper 155, so as to form bulging curves toward each other. The elastic pressing portions 154 are capable of elastic deflection so as to increase the distance therebetween. The minimum distance between the pair of elastic pressing portions 154, when the elastic pressing portions 154 are free from elastic deflection, is preferably smaller than the outer diameter of the glass tube 134 of a discharge tube 115.

The stopper 155 is raised from the base portion 153, so as to form a right angle with the axis of the discharge tube 115. A concave portion 156 is formed on the stopper 155, so as to sag in a substantially circular arc. On a relay connector 114 of preferred embodiment 3, a pair of guiding portions 128 are raised from the respective upper and lower sides of the concave portion 127 of the stopper 126. However, in preferred embodiment 4, the heights of portions raised from the respective upper and lower sides of the concave portion 156 of the base portion 153 are reduced to be short. That is, elements corresponding to the guiding portions 128 of preferred embodiment 3 are not provided. Therefore, the metallic material required for grounding terminals 152 can be reduced, compared to including guiding portions.

Three leg portions 157 are further formed on the base portion 153, so as to be integrated therewith. Two of the three leg portions 157 are provided between the elastic pressing portions 154 and the stopper 155, so as to project from the respective upper and lower edge portions of the base portion 153 to the opposite side of the elastic pressing portions 154 or the stopper 155 (i.e., to the back side). The remaining one of the leg portions 157 is provided on the lateral edge of the base portion 153 on the opposite side of the stopper 155, so as to project from the intermediate position between the elastic pressing portions 154 to the opposite side of the elastic pressing portions 154 or the stopper 155 (i.e., to the back side).

Figure 42:
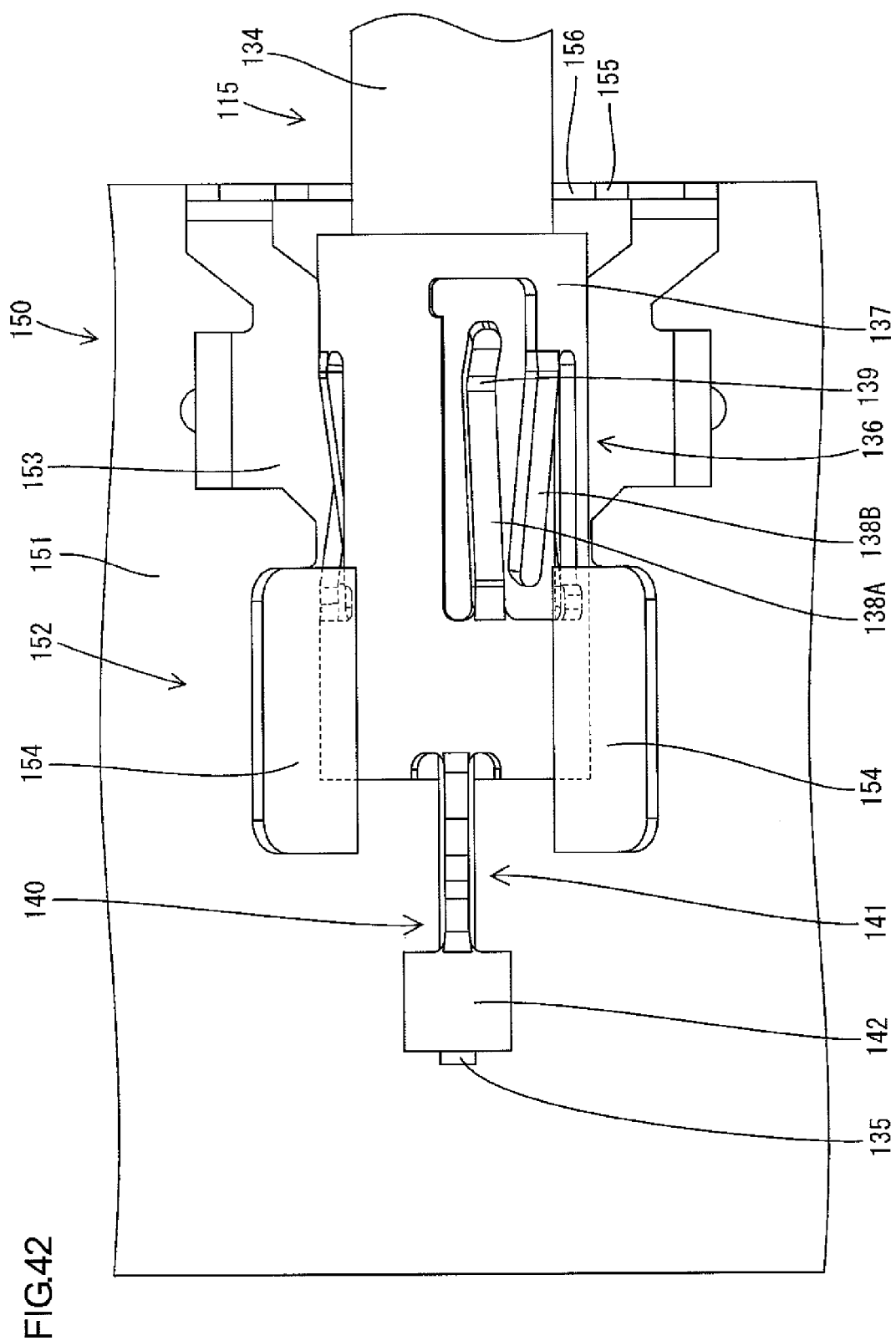
FIG. 42 is a partially-enlarged front view showing a connecting structure between a grounding terminal and a discharge tube.

The grounding terminal 152 is not housed in a member such as a plastic housing, i.e., barely provided, and is conductively fixed to the support plate 151 by soldering or the like so that its leg portions 157 penetrate through the mounting holes 151H (See FIG. 42). Thus, the plurality of grounding terminals 152 are mounted to the common support plate 151, and thereby are conductively connected to one another via the support plate 151. Power boards are not connected to the grounding members 150, and the support plate 151 is conductively connected to the chassis.

Mounting of Discharge Tube 115 to Grounding Terminal 152

When a discharge tube 115 is fixed to a grounding terminal 152, the discharge tube 115 held in a horizontal position is moved toward the front surface of the chassis 113, and the end portion and the ferrule 136 of the glass tube 134 are fitted between the pair of upper and lower elastic pressing portions 154 from the front side. At that time, the pair of elastic pressing portions 154 are pushed by the body 137 of the ferrule 136 so as to open vertically due to elastic deflection. After the body 137 has passed through the shortest-distance portions of the pair of elastic pressing portions 154, the body 137 is pulled toward the base portion 153 side due to elastic restoring forces of the elastic pressing portions 154, resulting in the body 137 abutting on the base portion 153. Then, the fixation of the discharge tube 115 is completed. The other end portion of the discharge tube 115 is fixed to a relay connector 114 in a similar manner to preferred embodiment 3.

The discharge tube 115 thus mounted is supported by the relay connector 114 and the grounding member 150 at its respective end portions. The pairs of elastic pressing portions 132, 154 can have elastic contact with the outer circumferential surfaces of the bodies 137 of the ferrules 136, and thereby the outer leads 135 are electrically conductively connected to the relay terminal 131 and the grounding terminal 152 via the ferrules 136. Further, the glass tube 134 is held due to elastic restoring forces of the pairs of elastic pressing portions 132, 154, so as to be pressed against the concave portions 127, 156 of the stoppers 126, 155. Therefore, when viewed along the axial direction of the discharge tube 115, the body 137 appears to be positioned so as to partially overlap with the stopper 126 or 155. That is, the end edge of the body 137 on the opposite side of the conductive portion 140 is axially positioned in proximity to the stopper 126 or 155 so as to be partially faced therewith.

Figure 45:
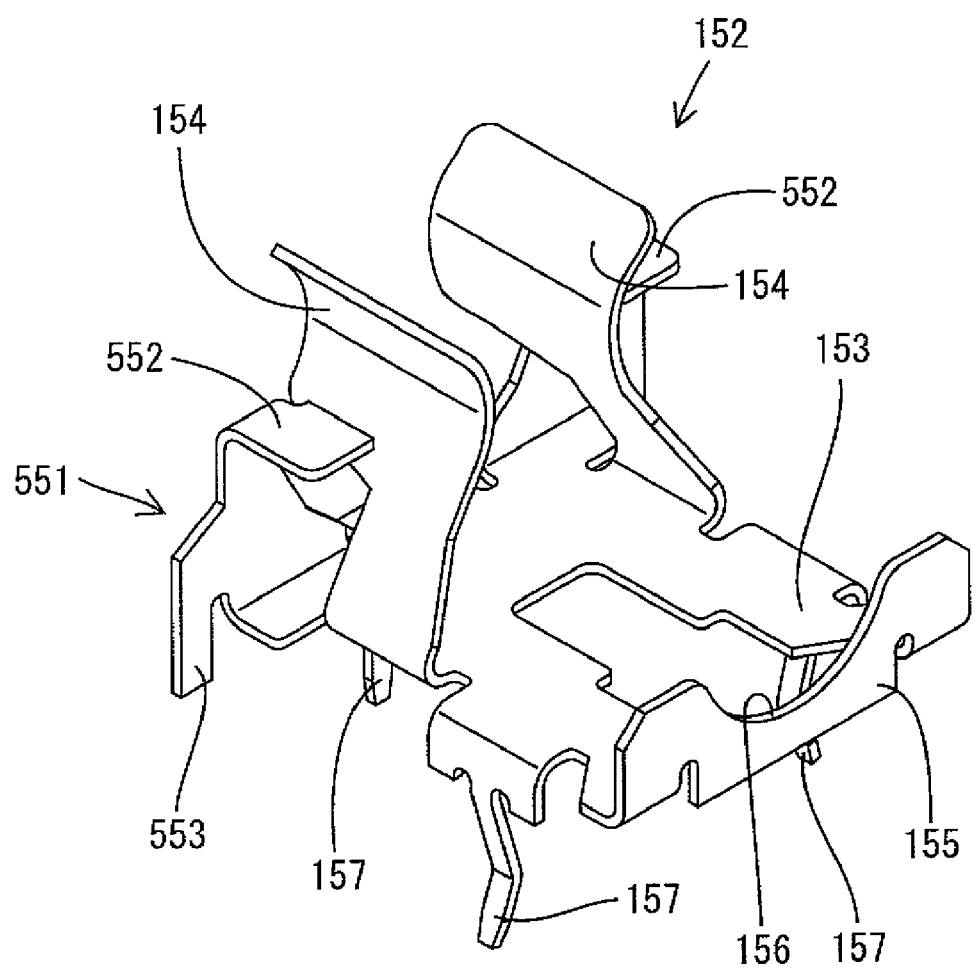
FIG. 45 is a perspective view of a grounding terminal.
Figure 46:
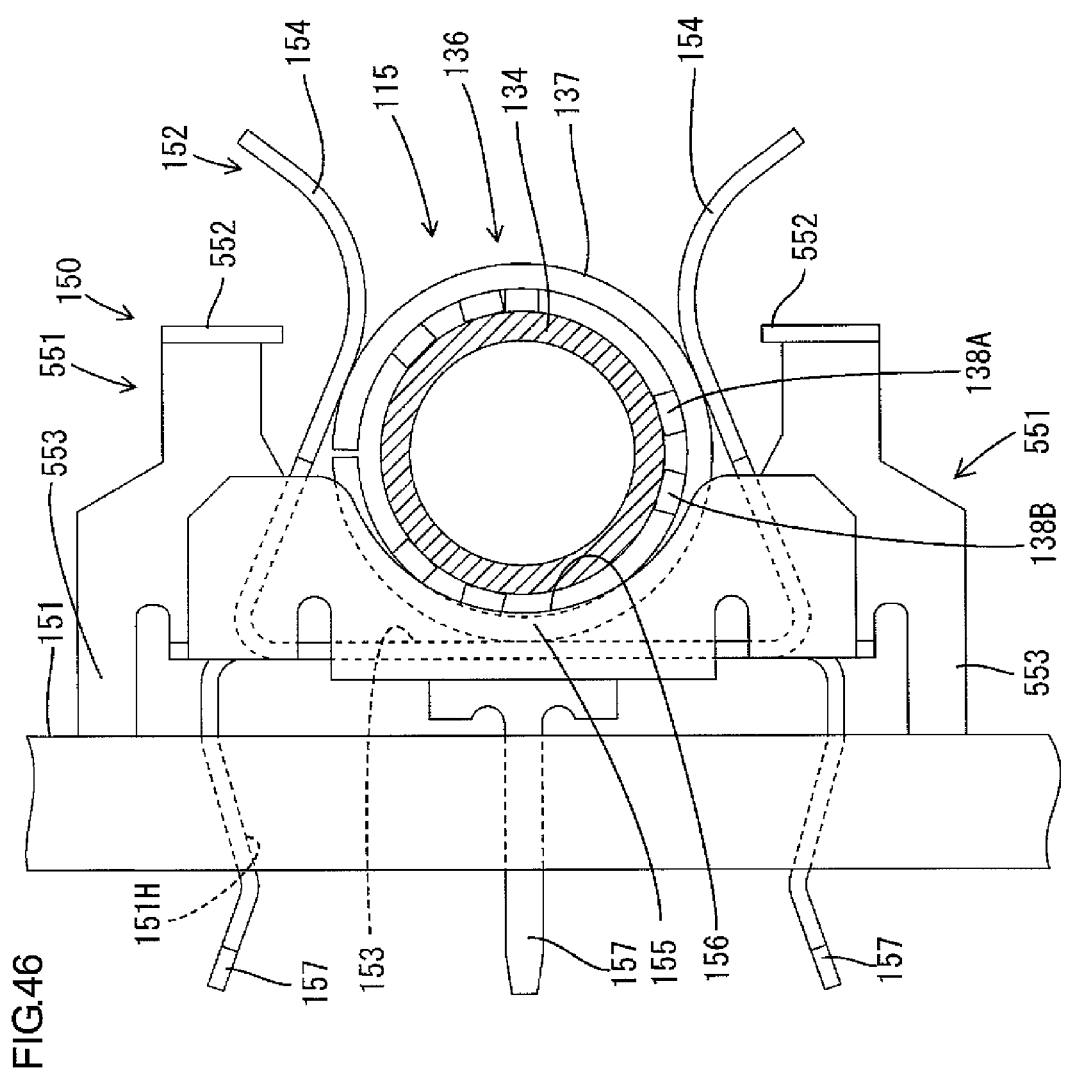
FIG. 46 is a sectional view showing a connection between a grounding terminal shown in FIG. 45 and a ferrule.

As shown in FIGS. 45 and 46, protector portions 551 may be provided on the grounding terminal 152. Each protector portion 551 includes a restricting portion 552 for an elastic pressing portion, and further includes an abutting portion 553 for abutting on the support plate. When the grounding terminal 152 is mounted and fixed to the support plate 151, the abutting portions 553 abut on or are located close to the support plate 151. If some kind of external force is applied to the elastic pressing portions 154 so that they are pushed to open, they first become in contact with the restricting portions 552 during the course of opening. The abutting portions 553 serve as supports for preventing the protector portions 551 from collapsing, when an additional load is thereafter applied. The protector portions 551 are connected to the feet of the elastic pressing portions 154, and therefore the abutting portions 553 should be formed lateral to the connection portion in order that the abutting portions 553 work. Note that abutting portions 553 located at a longer distance from the connection portion are more effective.

Operational Effects of Preferred Embodiment 4

In preferred embodiment 4, when a discharge tube 115 is supported on a relay connector 114 and a grounding member 150, the stopper 126 of the holder 120 and the stopper 155 of the grounding terminal 152 lock the ferrules 136 attached on the respective ends of the discharge tube 115. Therefore, the discharge tube 115 is secure from axial movement relative to the relay connector 114.

That is, if a force is applied to the discharge tube 115 so as to cause movement from the relay connector 114 side to the grounding member 150 side, the ferrule 136 attached on the end portion of the discharge tube 115 on the relay connector 114 side is caught by the stopper 126 of the holder 120 so that the movement of the discharge tube 115 to the grounding member 150 side is restricted. If a force is applied to the discharge tube 115 so as to cause movement from the grounding member 150 side to the relay connector 114 side, the ferrule 136 attached on the end portion of the discharge tube 115 on the grounding member 150 side is caught by the stopper 155 of the grounding terminal 152 so that the movement of the discharge tube 115 to the relay connector 114 side is restricted. Thus, the axial movement of the discharge tube 115 to either right or left is restricted, and therefore the tip of the outer lead 135 is prevented from hitting the wall of the container room 123 on the opposite side of the escape opening 125 or hitting the sidewall of the chassis 113.

The concave portion 156 is formed on the stopper 155 of a grounding terminal 152, so as to abut on the outer circumference of a glass tube 134 when the ferrule 136 is engaged with the stopper 155. Further, the pair of elastic pressing portions 154 capable of pressing the discharge tube 115 toward the concave portion 156 side are provided on the grounding terminal 152. Specifically, the pair of elastic pressing portions 154 press the discharge tube 115 toward the concave portion 156 side, obliquely from above and obliquely from below, i.e., vertically symmetrically. Thereby, the glass tube 134 is prevented from disengaging from the concave portion 156, and therefore the engagement of the ferrule 136 with the stopper 155 can be reliably maintained.

On the grounding member 150, the stoppers 155 are integrated with the respective grounding terminals 152 to provide a conductive connection to the ferrules 136. Thereby, the number of components can be reduced in preferred embodiment 4, compared to including stoppers provided as separate members from the grounding terminals.

Other Preferred Embodiments

The present invention is not limited to the preferred embodiments explained in the above description made with reference to the drawings. The following preferred embodiments may be included in the technical scope of the present invention, for example.

The discharge tube is not limited to a cold cathode fluorescent tube. A hot cathode fluorescent tube, a xenon tube or the like may be used instead.

The material for a ferrule is not limited to metal. A conductive resin or a conductive rubber may be used instead.

The outer leads, linearly projecting from a glass tube, are not limited to being arranged concentrically with the glass tube, but rather may be arranged radially eccentrically with respect to the axis of the glass tube.

The outer leads, linearly projecting from a glass tube, are not limited to being arranged parallel or substantially parallel to the axis of the glass tube, but rather may be arranged at an angle with the axis of the glass tube.

The outer leads are not limited to being formed linearly, but rather may be formed crookedly.

The conductive portion may be connected anteriorly to the tip of the outer lead, instead of being connected to the outer periphery of the outer lead.

A curved portion may be formed on the distal end portion of the conductive portion, so that the outer surface of the curve of the curved portion can be connected to the outer periphery of the outer lead, instead of connecting the distal end edge of the conductive portion to the outer periphery of the outer lead.

The valley formed on the distal end edge of a conductive portion may be eliminated, so that the straight distal end edge can be connected to the outer periphery of the outer lead.

The valley formed on the distal end edge of a conductive portion is not limited to being V-shaped, but rather may be U-shaped, rectangular-shaped or semicircular-shaped.

The conductive portion may have a constant width along its entire length.

The protector portions may be eliminated from a ferrule.

Instead of one conductive portion, a plurality of conductive portions may be provided. In this case, the plurality of conductive portions may be arranged at intervals along the circumferential direction, or alternatively, may be displaced along the axial direction (i.e., the direction parallel to the projecting direction of the outer lead) from one another.

The body of a ferrule is not limited to having a cylindrical shape, but rather may be ring-shaped or substantially C-shaped.

The contact portion of a ferrule is not limited to being formed of a circumferentially continuous rib, but rather may be formed of a plurality of protrusions which are arranged at intervals along the circumferential direction.

The contact portion of a ferrule is not limited to being formed of a rib-shaped protrusion. The outer circumferential surface of the body may be partially used as a contact portion without modification. Alternatively, an elastic portion, to be used as a contact portion, may be formed by making a cut in the body and lifting up that portion.

The number of elastic gripping portions is not limited to three or six, but rather may be two or less, or four, five, seven or more.

The elastic gripping portions are not limited to being formed of cantilevered portions extending anteriorly or posteriorly, but rather may be formed of two-point supported portions which are supported on the body at their anterior and posterior ends.

The plurality of elastic gripping portions may be arranged at unequally-spaced intervals, instead of being arranged at equally-spaced intervals along the circumferential direction.

In order to secure circumferential airspace between the outer circumference of a glass tube and the inner circumference of the body of a ferrule, one or a plurality of elastic gripping portions and one or a plurality of inelastic receiving portions (e.g., inwardly bulging portions formed by hammering the body in part) may be formed so as to abut on the outer circumference of the glass tube, instead of a plurality of elastic gripping portions capable of elastic contact with the outer circumference of the glass tube.

The large diameter portion may be eliminated from the body of a ferrule.

The contact portion and the large diameter portion of a ferrule may be arranged in proximity to each other, instead of being arranged spaced apart on the respective axial end portions of the body.

On the body, the axial positions may be switched between the anterior contact portion and the posterior large diameter portion.

The size and position of the wide portion, when the conductive portion is not forced into elastic deformation or is in a free state, may be set so that the axis (as an imaginary line) of the body penetrates the wide portion out of the cutout area corresponding to the valley. In this case, on a projection plane obtained when viewed along the axial direction of the body, the outer lead can partially or completely overlap with the wide portion.

The conductive portion may be indirectly connected to the outer lead by soldering or welding, instead of being directly connected to the outer lead. In this case, the elastic pressing force of the conductive portion applied to the outer lead can be eliminated.

In preferred embodiment 2, the elastic gripping portions are preferably arranged so as to abut on the outer circumference of the glass tube at two positions spaced along the axial direction of the body. However, elastic gripping portions may be provided so as to abut on the glass tube at axially-spaced three or more positions.

In preferred embodiment 2, two types of elastic gripping portions, which extend in reverse directions from each other, are preferably arranged so as to abut on the glass tube at axially-spaced two positions. However, alternatively, two types (or plural types) of elastic gripping portions, which extend in the same direction and are axially displaced from each other, may be provided.

The output terminal may be formed into a predetermined shape simply by punching a metallic material, without bending, for example.

The display panel of the display device is not limited to having TFTs as switching elements, but rather may include, as switching elements, elements other than TFTs such as MIM (Metal Insulator Metal) elements.

The display device is not limited to a liquid crystal display device. Various display devices requiring a lighting device on the back side of a display panel can be included.

The power source is not limited to a power board that includes electronic components mounted on a circuit board, but rather may be provided by connecting electronic components by wires without using a circuit board.

The device for bearing the body of a ferrule is not limited to a relay connector. The ferrule may be directly (i.e., without using a relay connector) fixed to a connector (e.g., an inverter connector) directly mounted on the power board. Alternatively, a dedicated bearing device, to which the ferrule is fixed, may be provided separately from the power supply path formed between the power source and the outer lead.

The on-board connectors may be eliminated from a circuit board, so that the relay connectors are connected to the power source (or power board) via cables.

In the above preferred embodiments, the conductive portion is preferably fixed to the outer lead by welding, for example. However, in the case of a conductive portion capable of elastic (or abutting) contact with the outer lead, the connection can be secured solely by the elastic force of the conductive portion without fixation such as welding.

The conductive connection between the cylindrical portion of the conductive portion and the outer lead may be achieved by soldering.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A discharge tube comprising:
   a glass tube;
   an outer lead projecting from an end portion of said glass tube and configured to receive electrical power; and
   a ferrule including:
      a body mounted to an outer circumference of said glass tube and configured to receive electrical power; and
      a cantilevered conductive portion extending from said body and including a planar portion, said planar portion extending along a projecting direction of said outer lead and being in contact with a side surface of said outer lead.

2. A discharge tube as in claim 1, wherein said ferrule is made of stainless steel.

3. A discharge tube as in claim 1, further comprising a plurality of elastic gripping portions provided on the body; wherein
   said glass tube has a substantially cylindrical shape;
   said body has a cylindrical shape substantially concentric with said glass tube;
   said plurality of elastic gripping portions are circumferentially spaced apart and in elastic contact with the outer circumference of said glass tube; and
   said ferrule is arranged such that a gap is provided between the outer circumference of said glass tube and an inner circumference of said body so as to extend over a substantially entire circumference of said glass tube.

4. A discharge tube as in claim 1, wherein said planar portion of said conductive portion is welded to at least a portion of said outer lead.

5. A discharge tube as in claim 1, wherein said planar portion of said conductive portion is crimped and welded to said outer lead.

6. A discharge tube as in claim 1, wherein said planar portion of said conductive portion is crimped to said at least a portion of said outer lead.

7. A discharge tube as in claim 1, wherein:
   the cantilevered conductive portion has a distal end located adjacent to a tip end portion of said outer lead; and
   said planar portion is located at said distal end of said cantilevered conductive portion.

8. A discharge tube as in claim 1, wherein said cantilevered conductive portion has a length measured along a projecting direction thereof larger than a width thereof measured along a direction perpendicular to the projecting direction.

* * * * *